Figure 22:
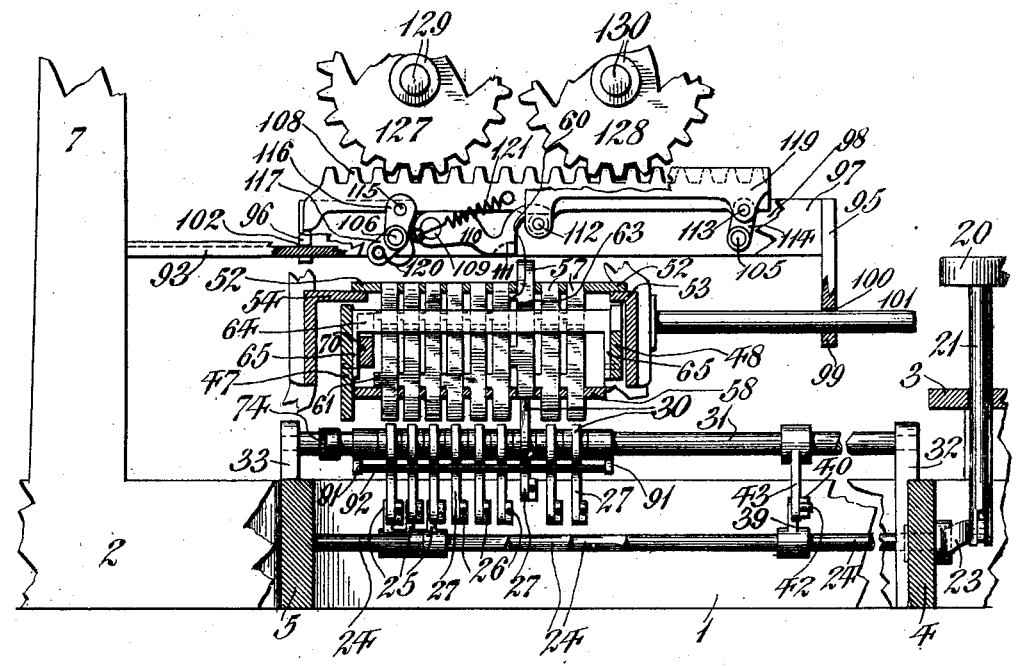

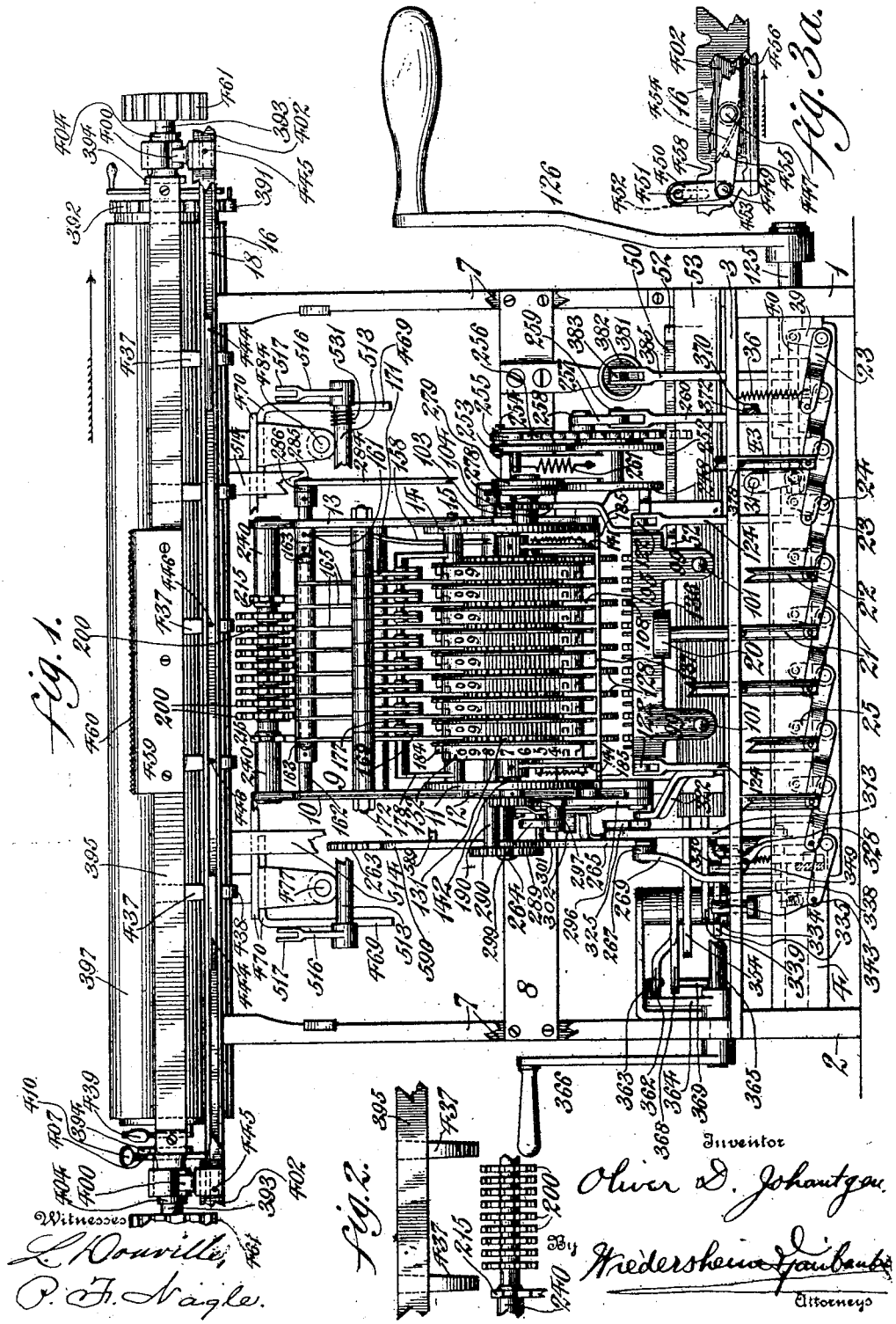

O. D. JOHANTGEN.
COMPUTING MACHINE.
APPLICATION FILED JAN. 19, 1906.
923,269.
Patented June 1, 1909.
32 SHEETS—SHEET 2.
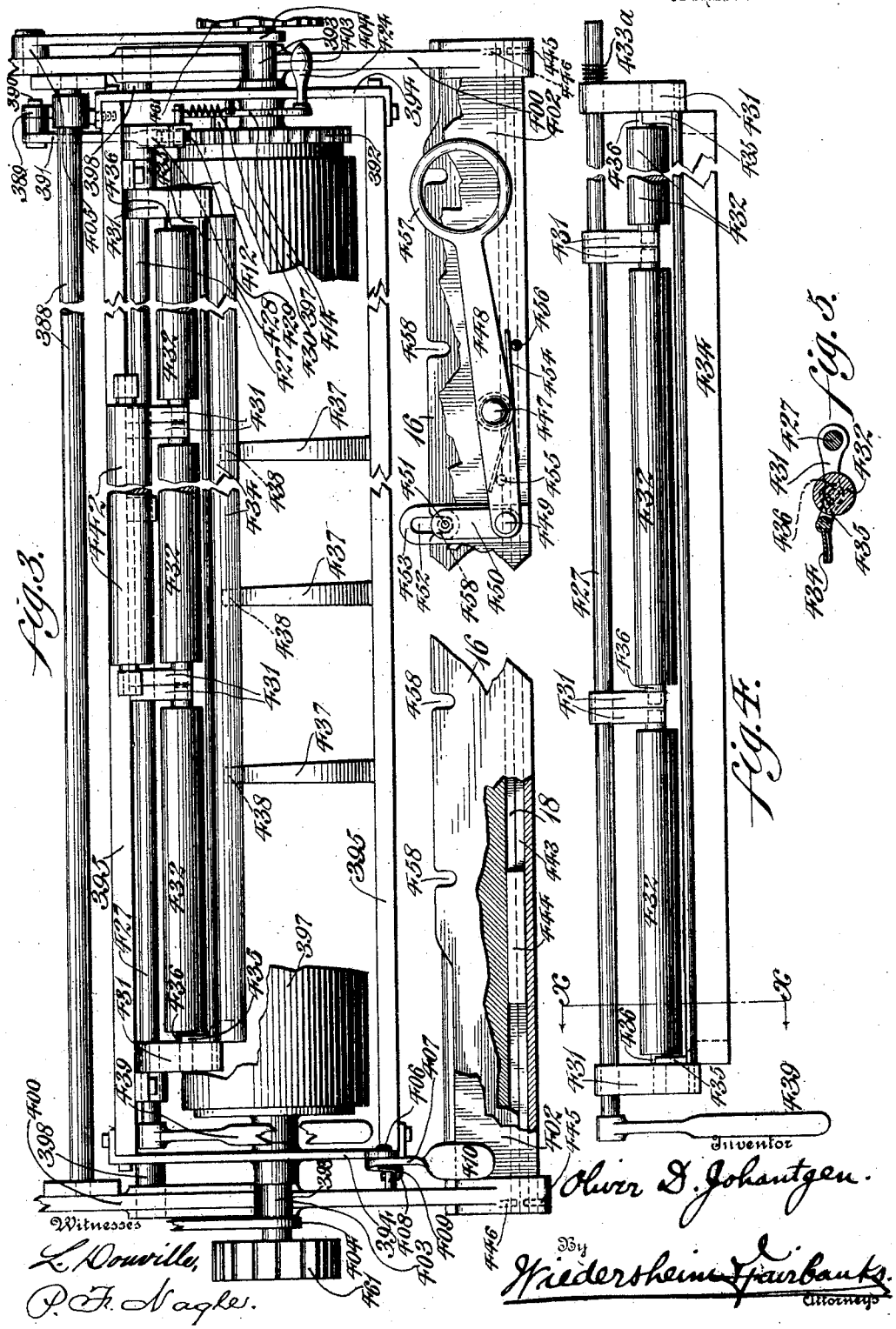

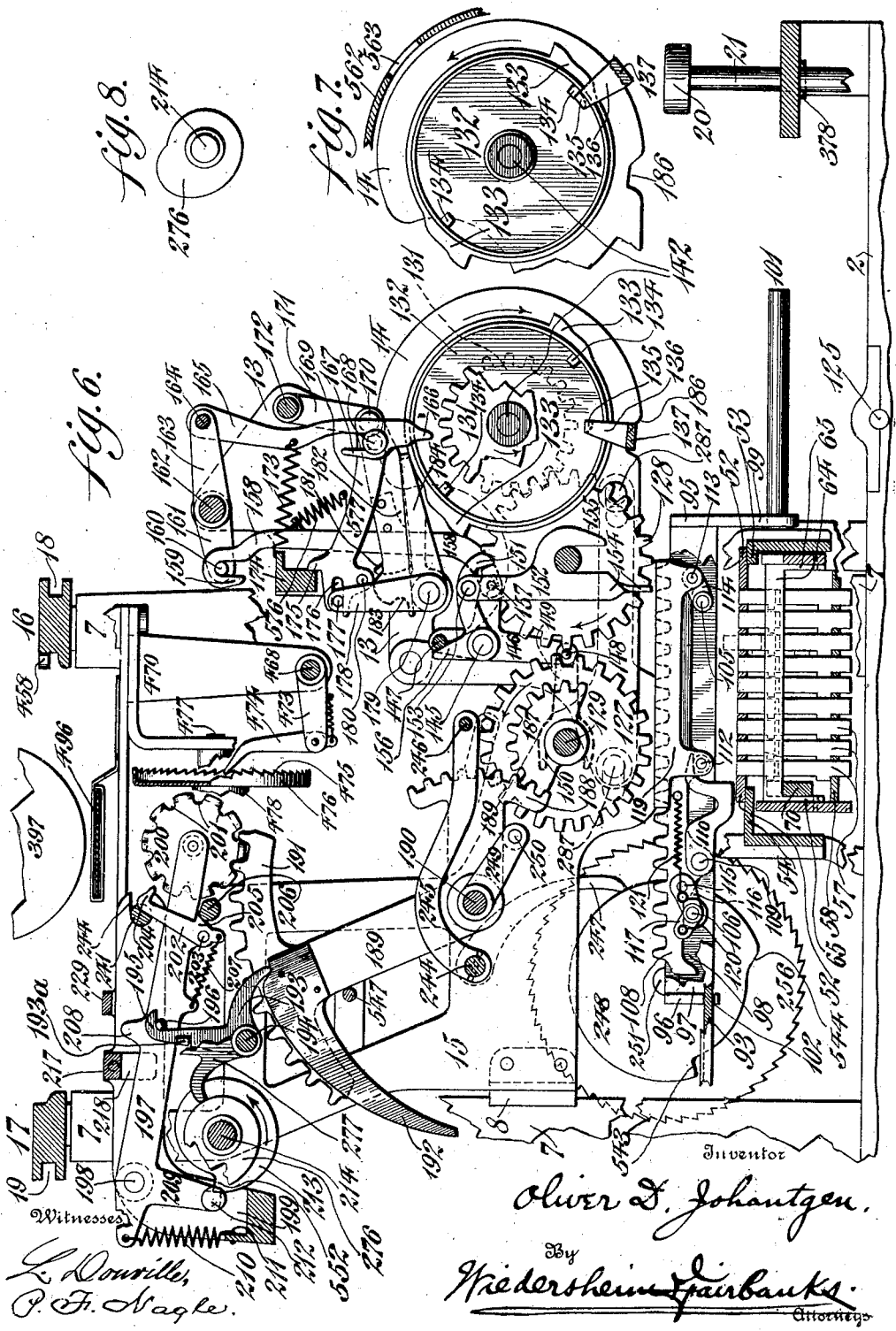

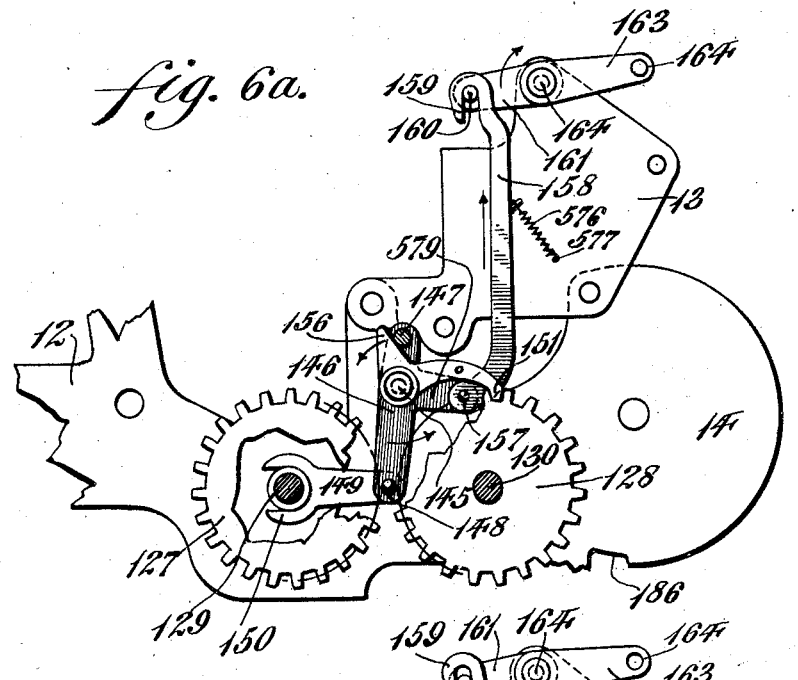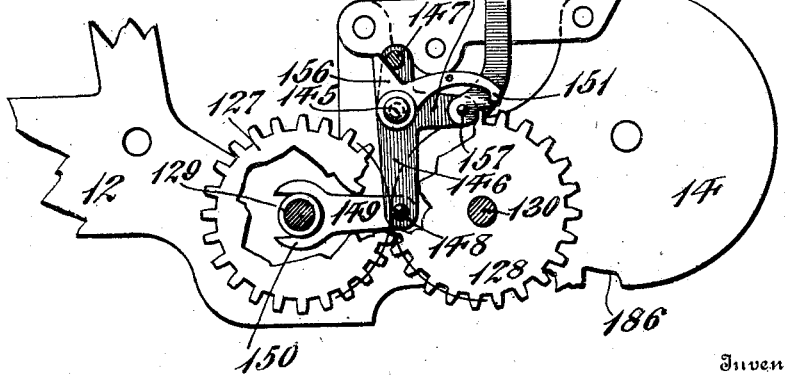

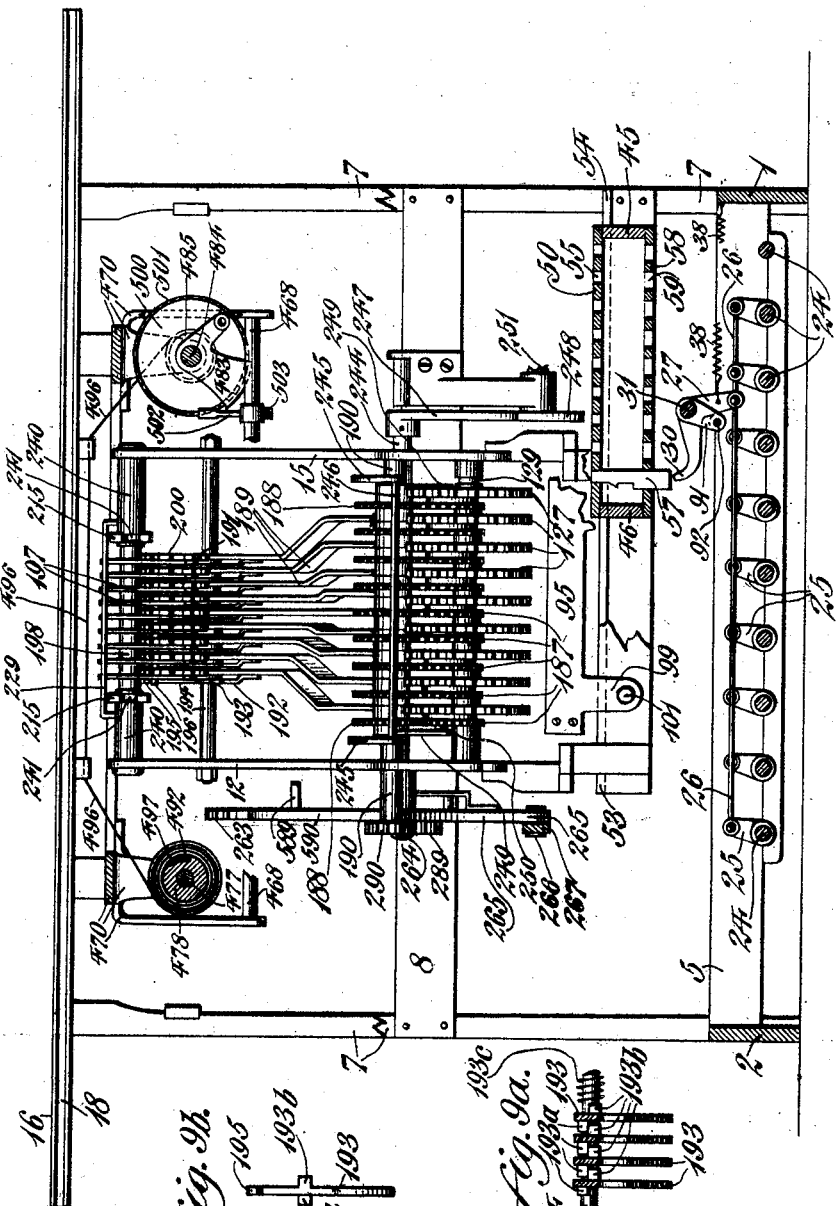

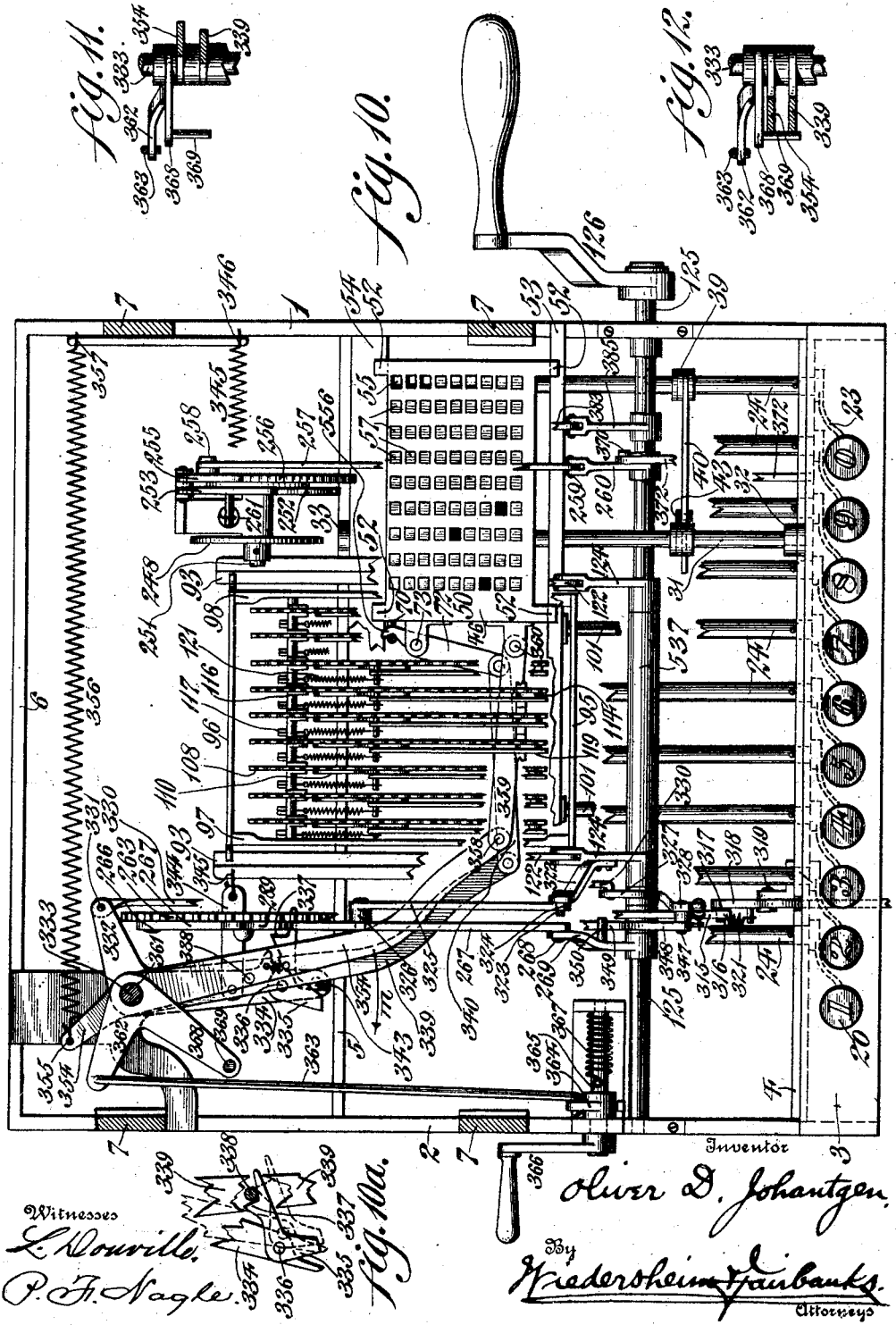

O. D. JOHANTGEN.
COMPUTING MACHINE.
APPLICATION FILED JAN. 19, 1906.
923,269.
Patented June 1, 1909.
32 SHEETS—SHEET 7.
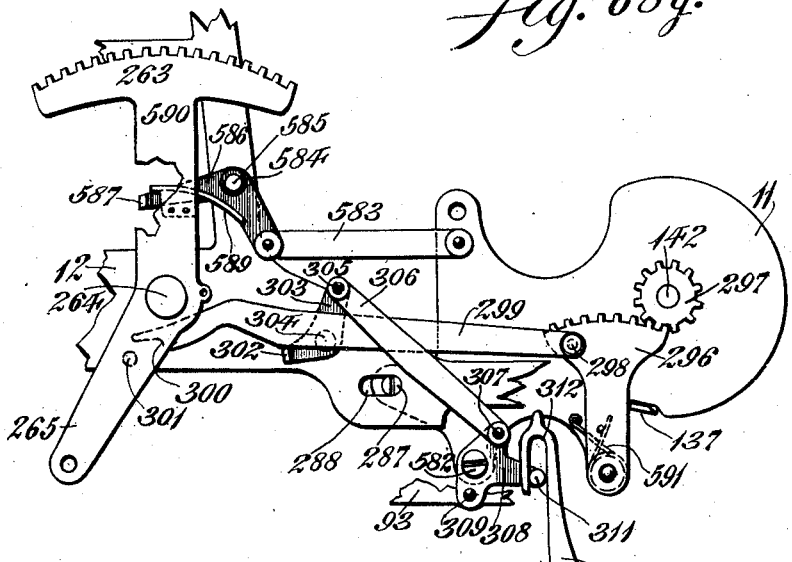
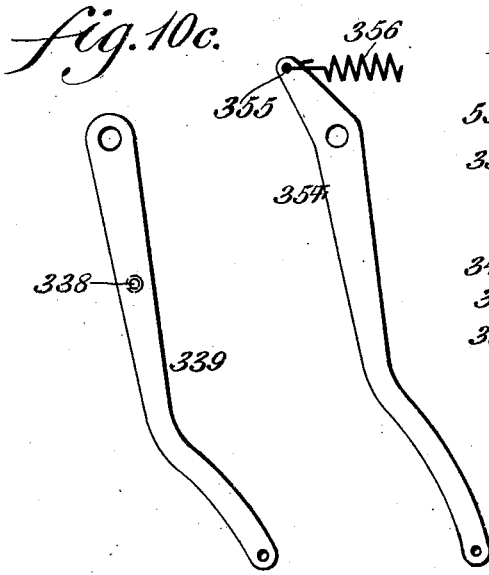
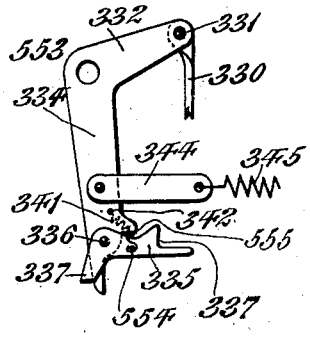
Witnesses
L. Douville,
O. F. Nagle.
Inventor
Oliver D. Johantgen
By Wiedersheim Fairbanks
Attorneys O. D. JOHANTGEN.
COMPUTING MACHINE.
APPLICATION FILED JAN. 19, 1906.
923,269.
Patented June 1, 1909.
32 SHEETS—SHEET 8.
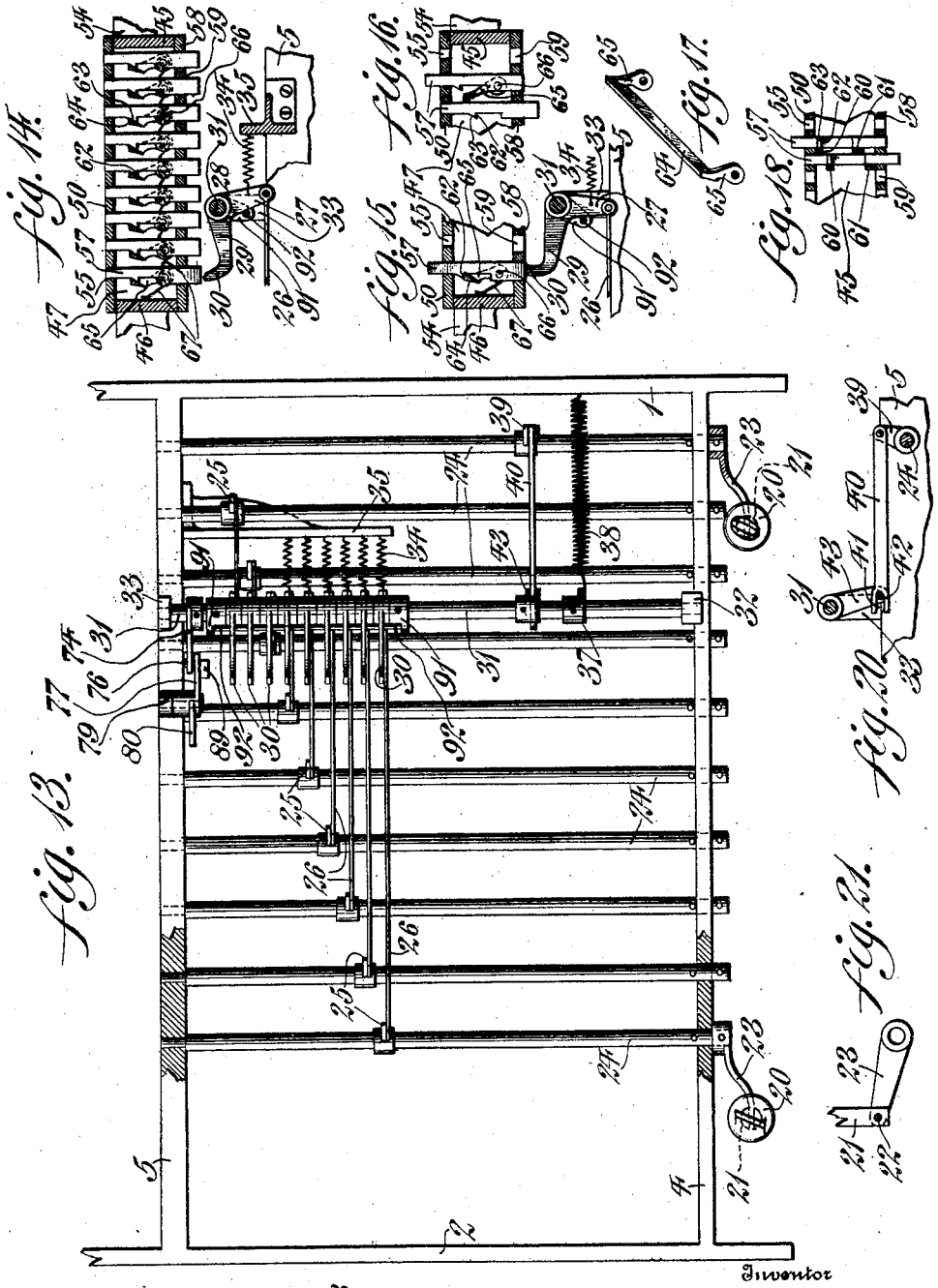
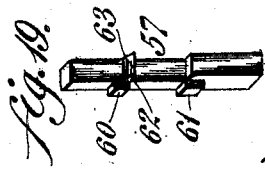

O. D. JOHANTGEN.
COMPUTING MACHINE.
APPLICATION FILED JAN. 19, 1906.

923,269.

Patented June 1, 1909.
32 SHEETS—SHEET 3.

Witnesses
L. Douville.
O. F. Nagle.

Inventor
Oliver D. Johantgen.
By
Wiedersheim Fairbanks
Attorneys

THE NORRIS PETERS CO., WASHINGTON, D. C.

O. D. JOHANTGEN.
COMPUTING MACHINE.
APPLICATION FILED JAN. 19, 1906.
923,269.
Patented June 1, 1909.
32 SHEETS—SHEET 10.
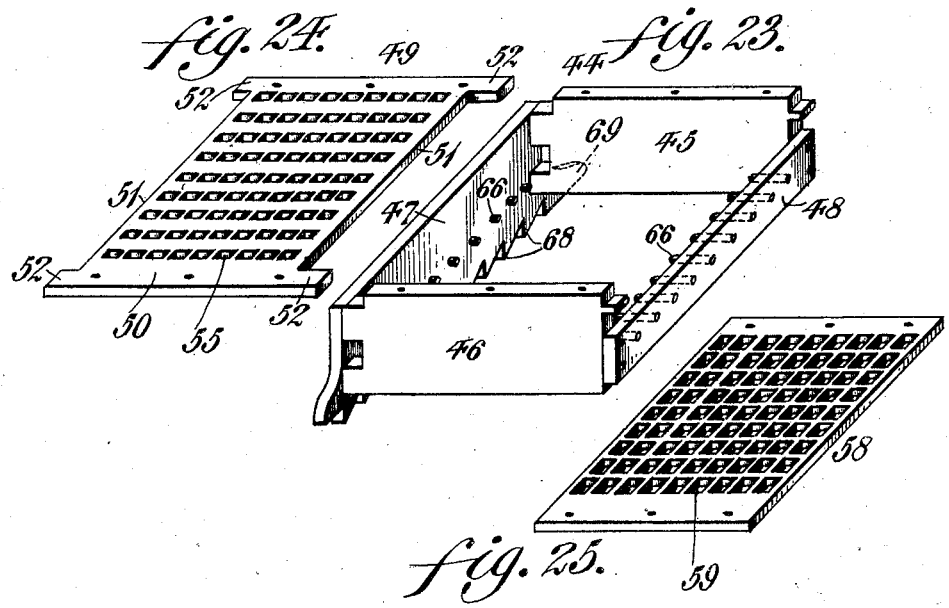
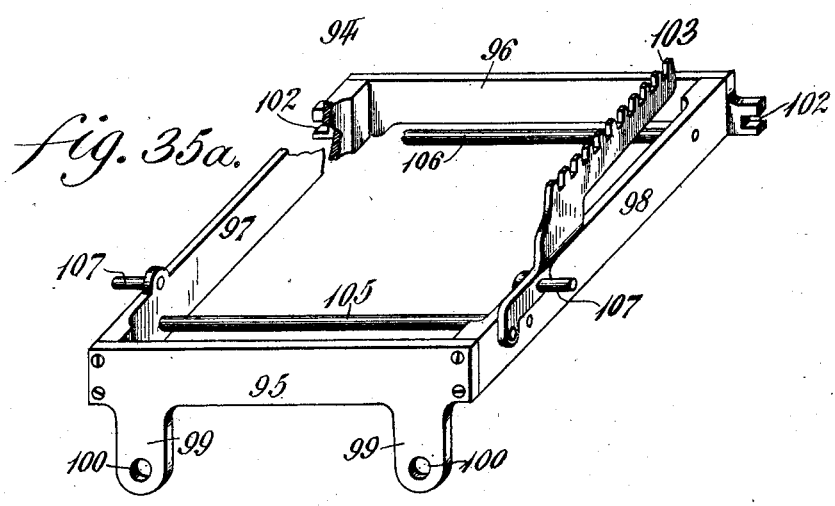
Witnesses
L. Douville,
P. F. Nagle.
Inventor
Oliver D. Johantgen.
By
Niedersheim Fairbanks
Attorneys

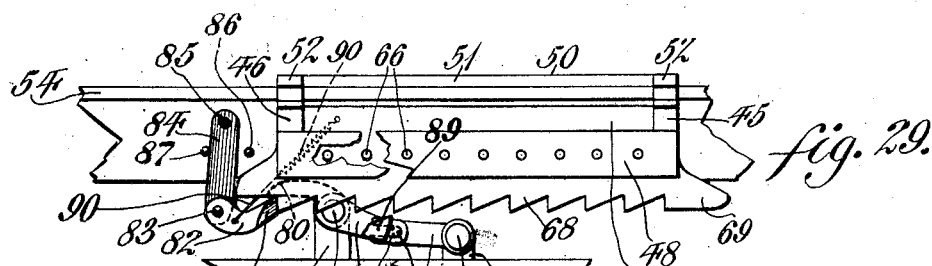
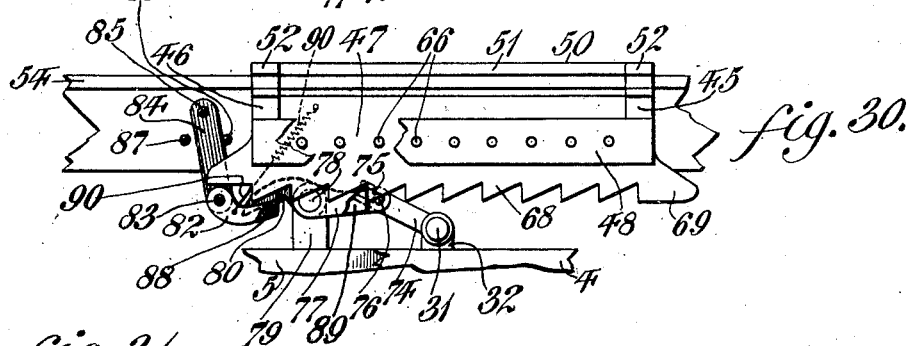
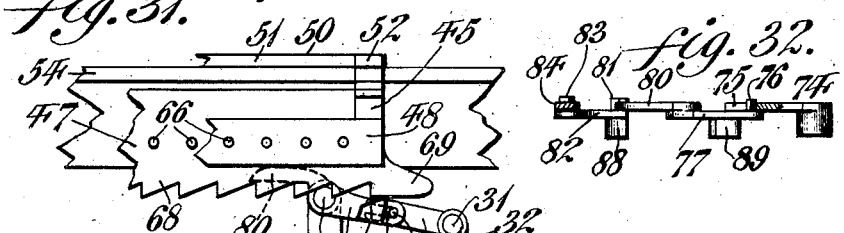
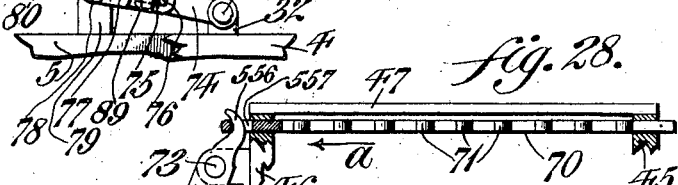
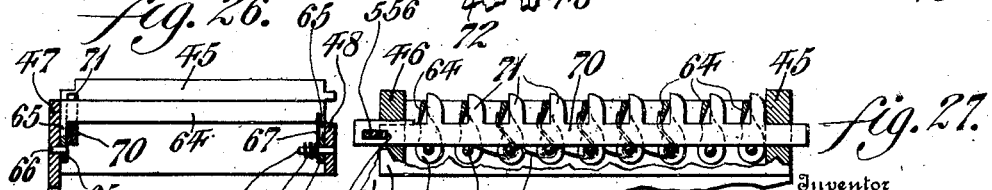

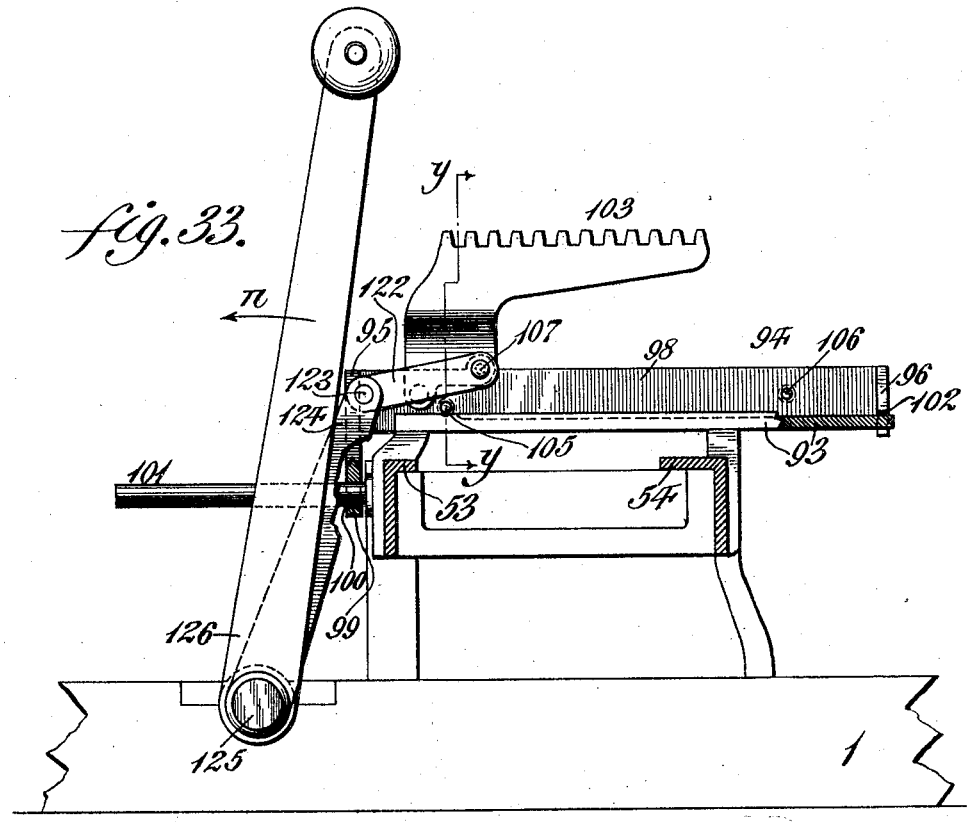

O. D. JOHANTGEN.
COMPUTING MACHINE.
APPLICATION FILED JAN. 19, 1906.
923,269.
Patented June 1, 1909.
32 SHEETS—SHEET 13.
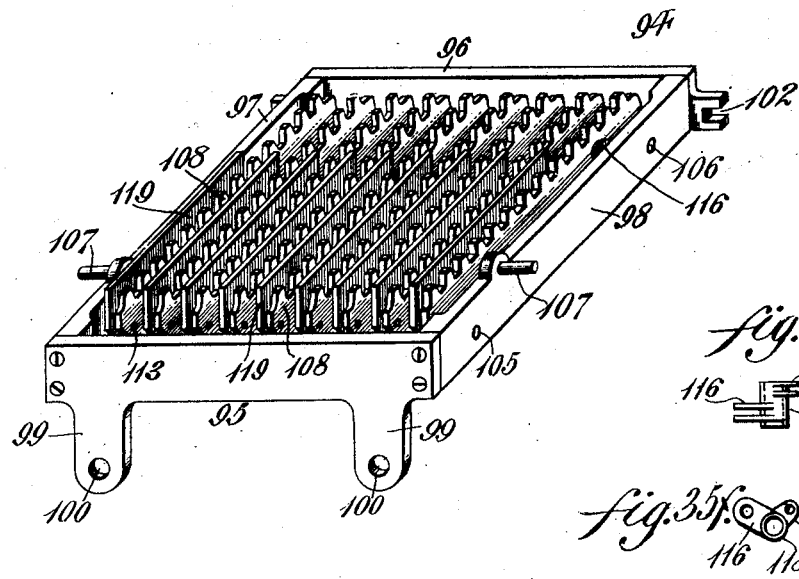
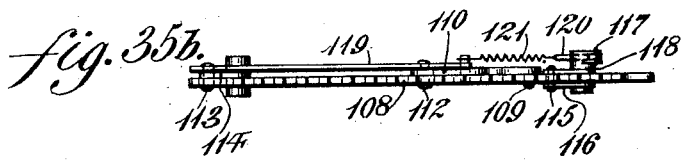
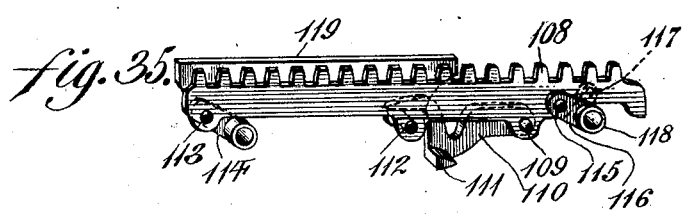

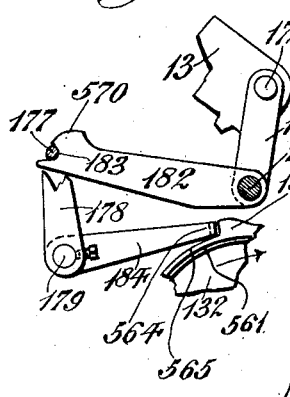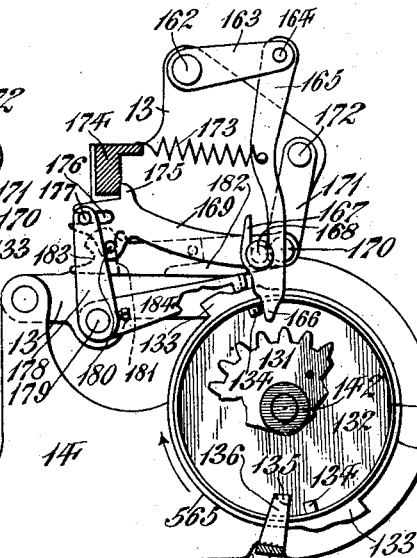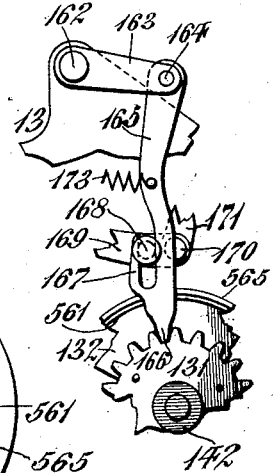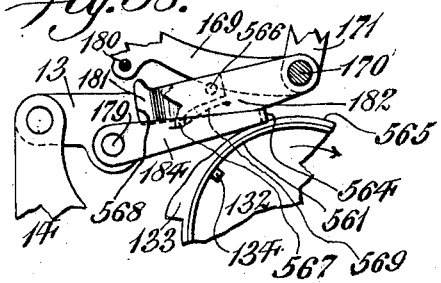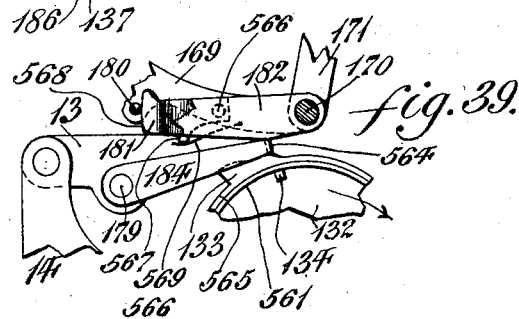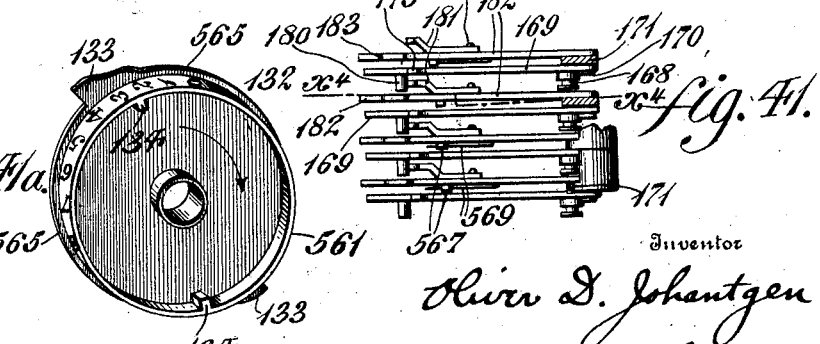

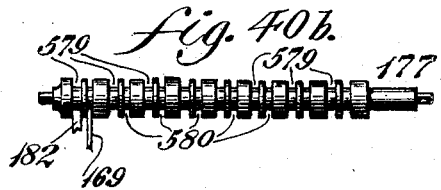
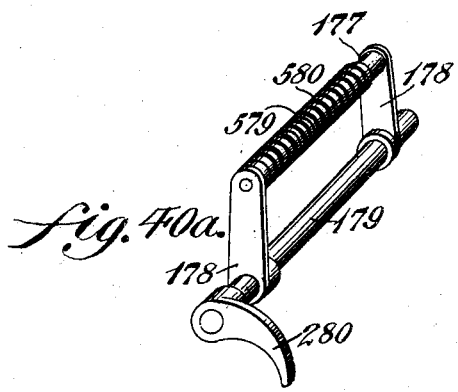
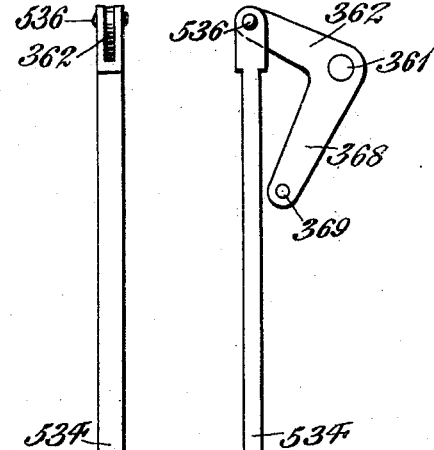
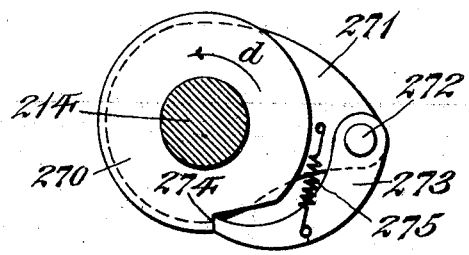

O. D. JOHANTGEN.
COMPUTING MACHINE.
APPLICATION FILED JAN. 19, 1906.
923,269.
Patented June 1, 1909.
32 SHEETS—SHEET 17.
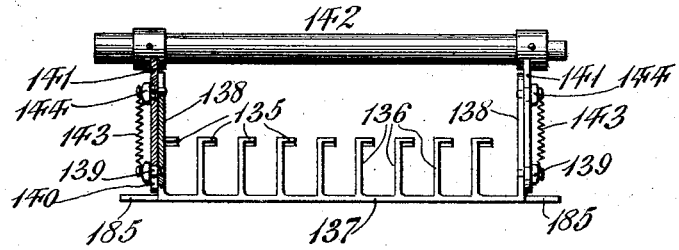
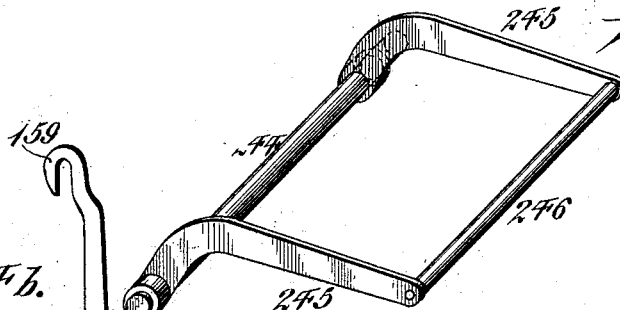
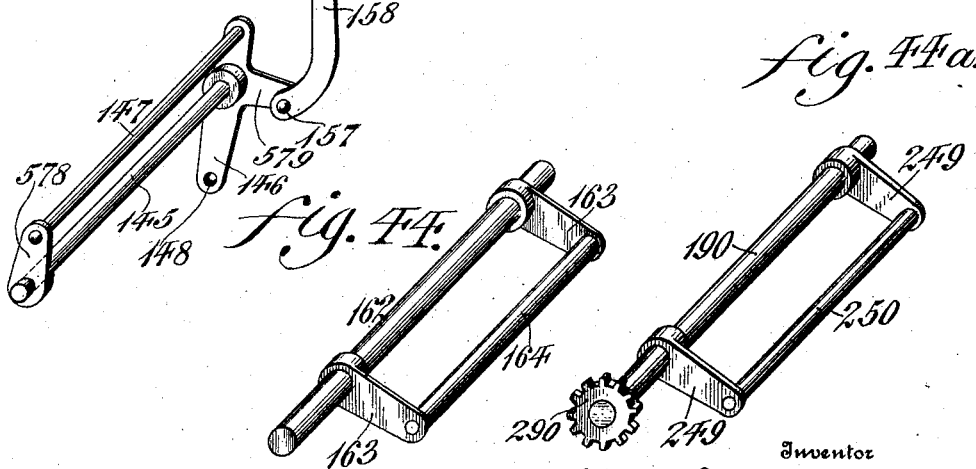
Witnesses
L. Couville,
P. F. Nagles.
Inventor
Oliver D. Johantgen.
By Wiedersheim & Fairbanks
Attorneys

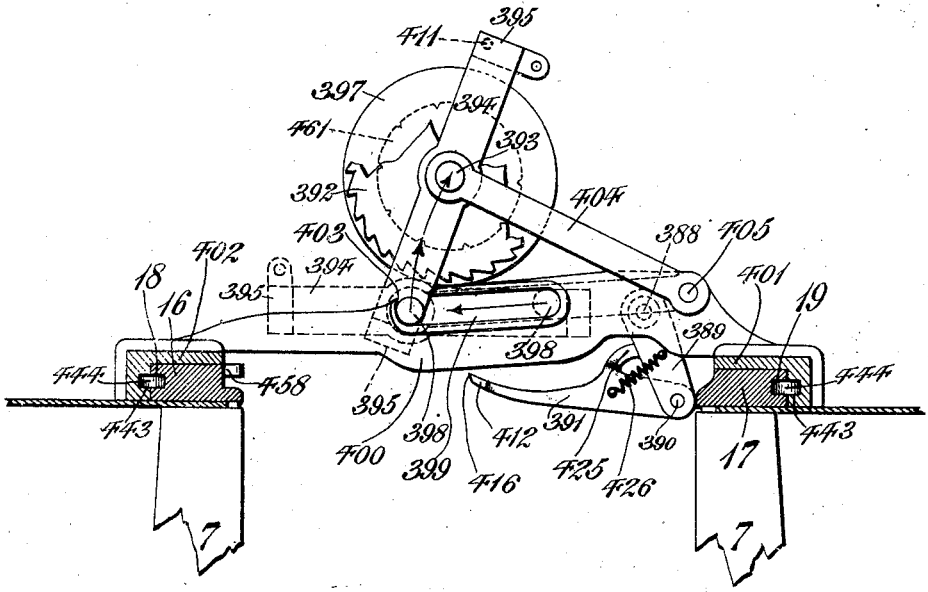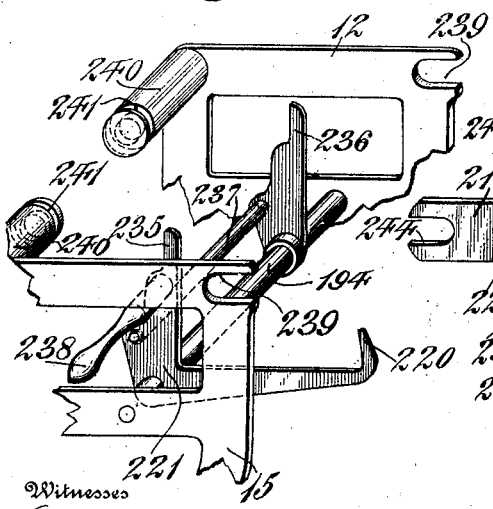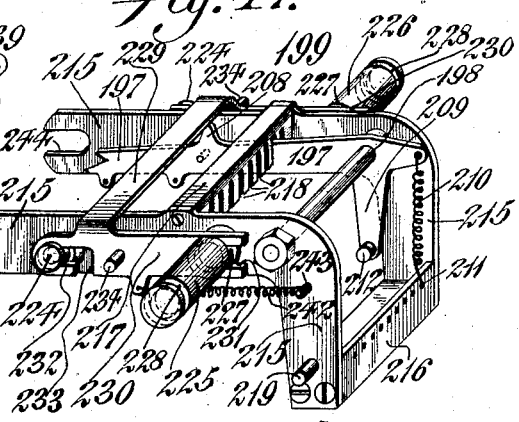

O. D. JOHANTGEN.
COMPUTING MACHINE.
APPLICATION FILED JAN. 19, 1906.
923,269.
Patented June 1, 1909.
32 SHEETS—SHEET 19.
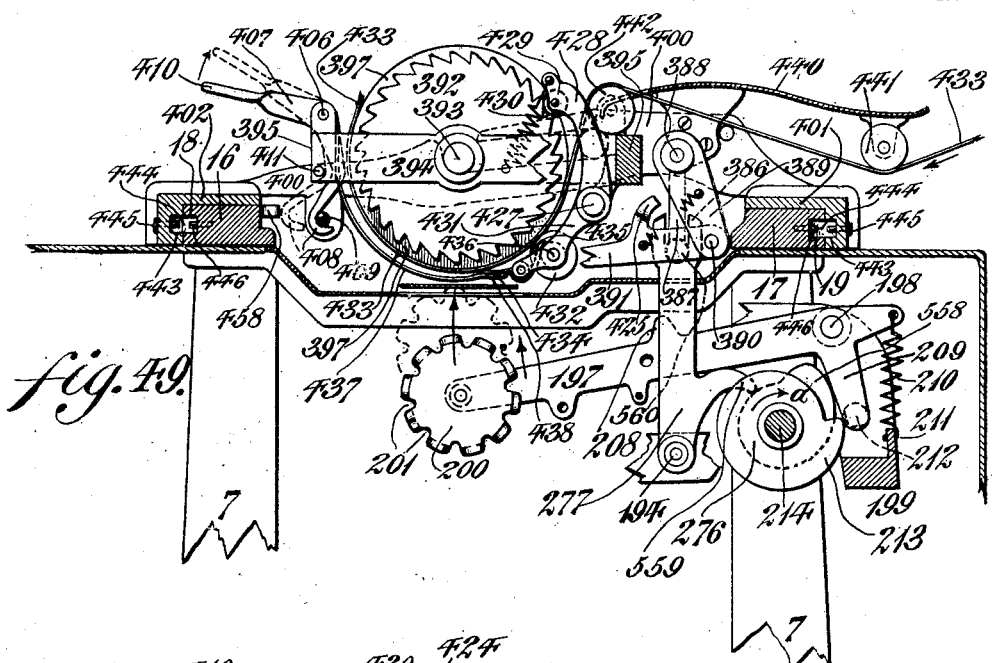
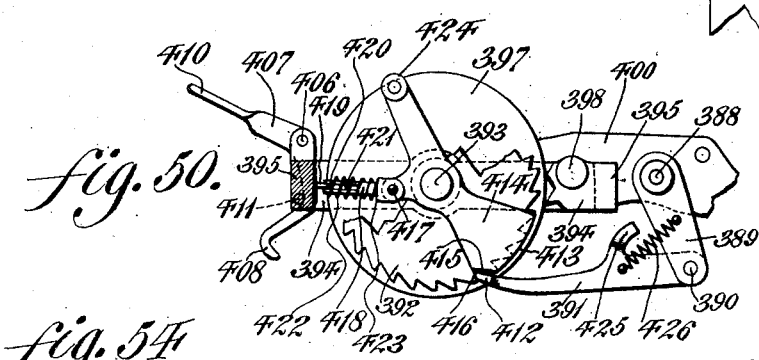
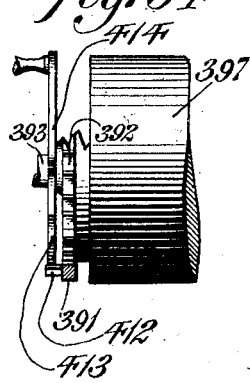
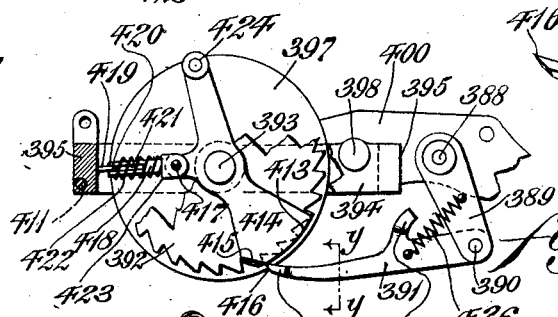
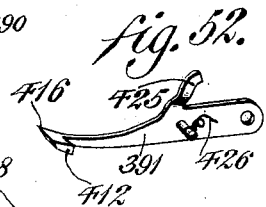

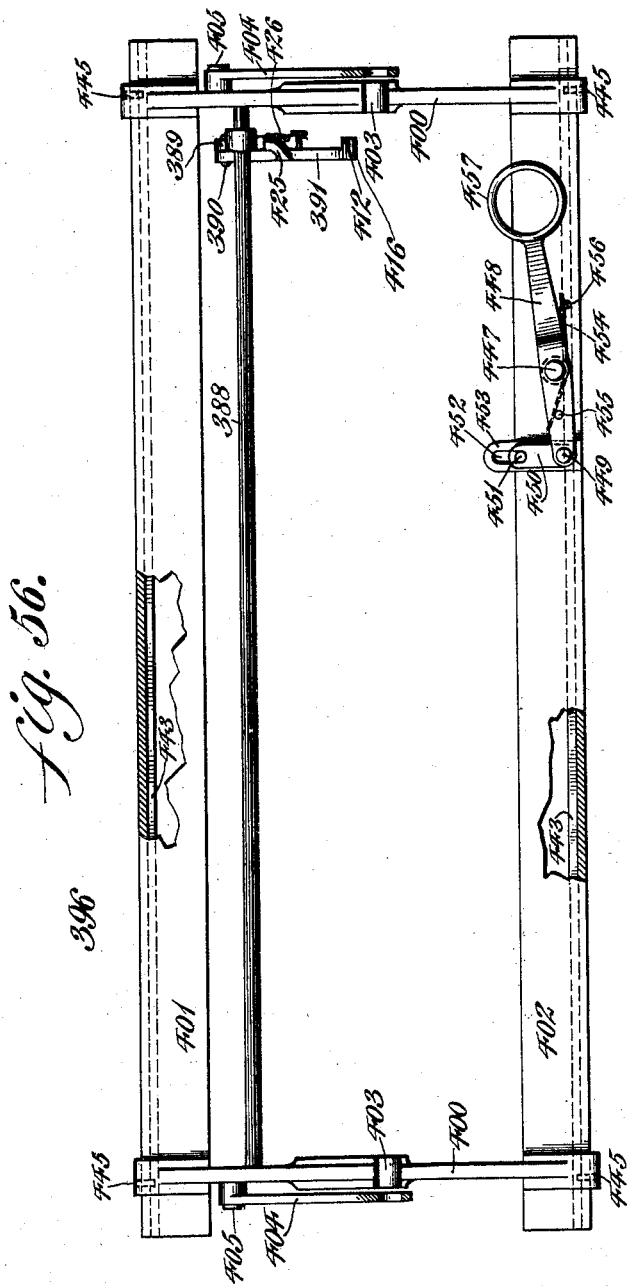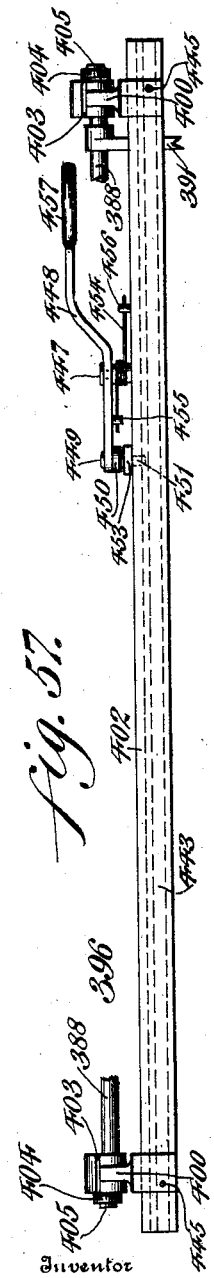

O. D. JOHANTGEN.
COMPUTING MACHINE.
APPLICATION FILED JAN. 19, 1906.
923,269.
Patented June 1, 1909.
32 SHEETS—SHEET 21.
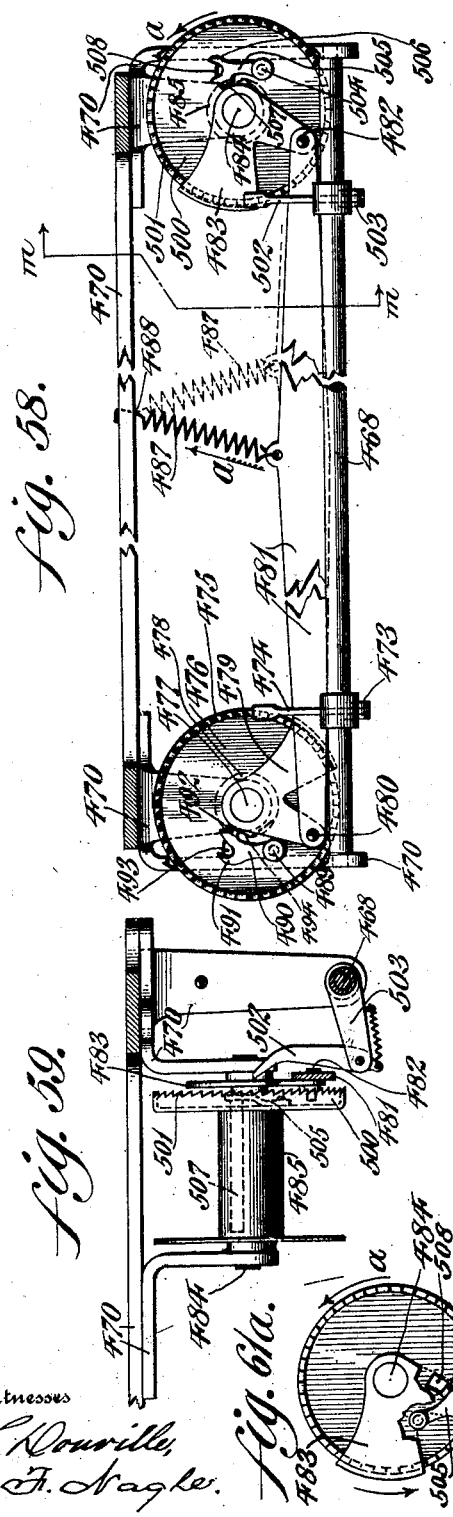
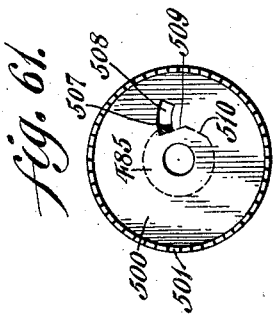
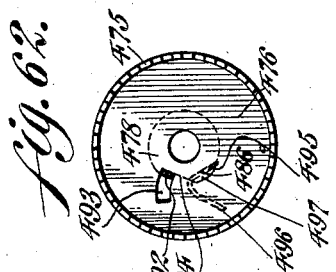
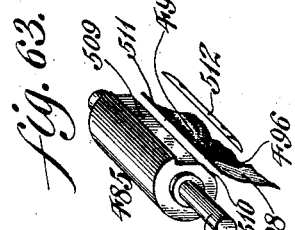
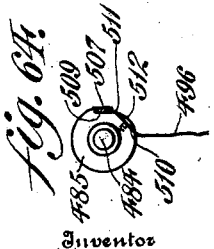

O. D. JOHANTGEN.
COMPUTING MACHINE.
APPLICATION FILED JAN. 19, 1906.
923,269.
Patented June 1, 1909.
32 SHEETS—SHEET 22.
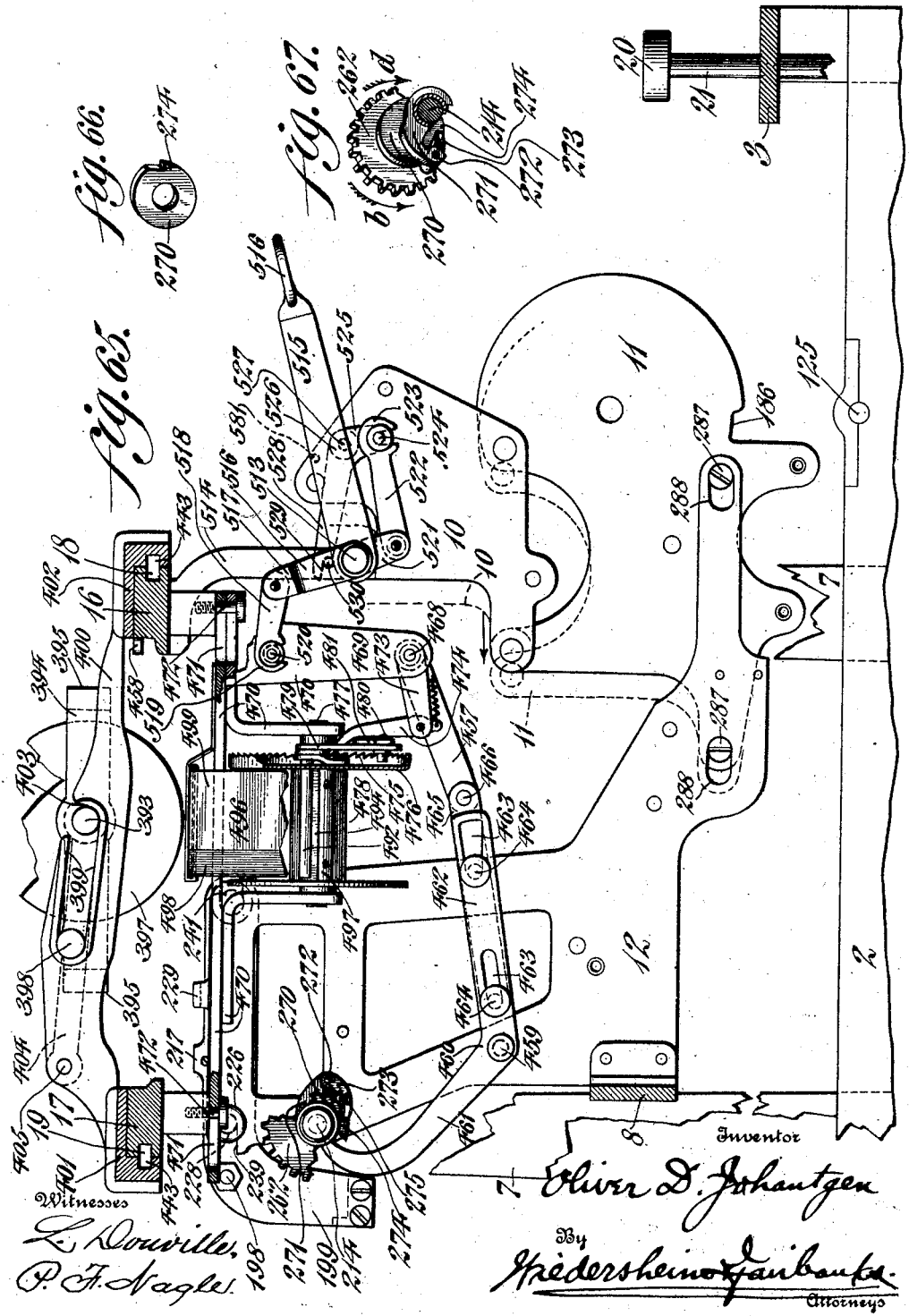

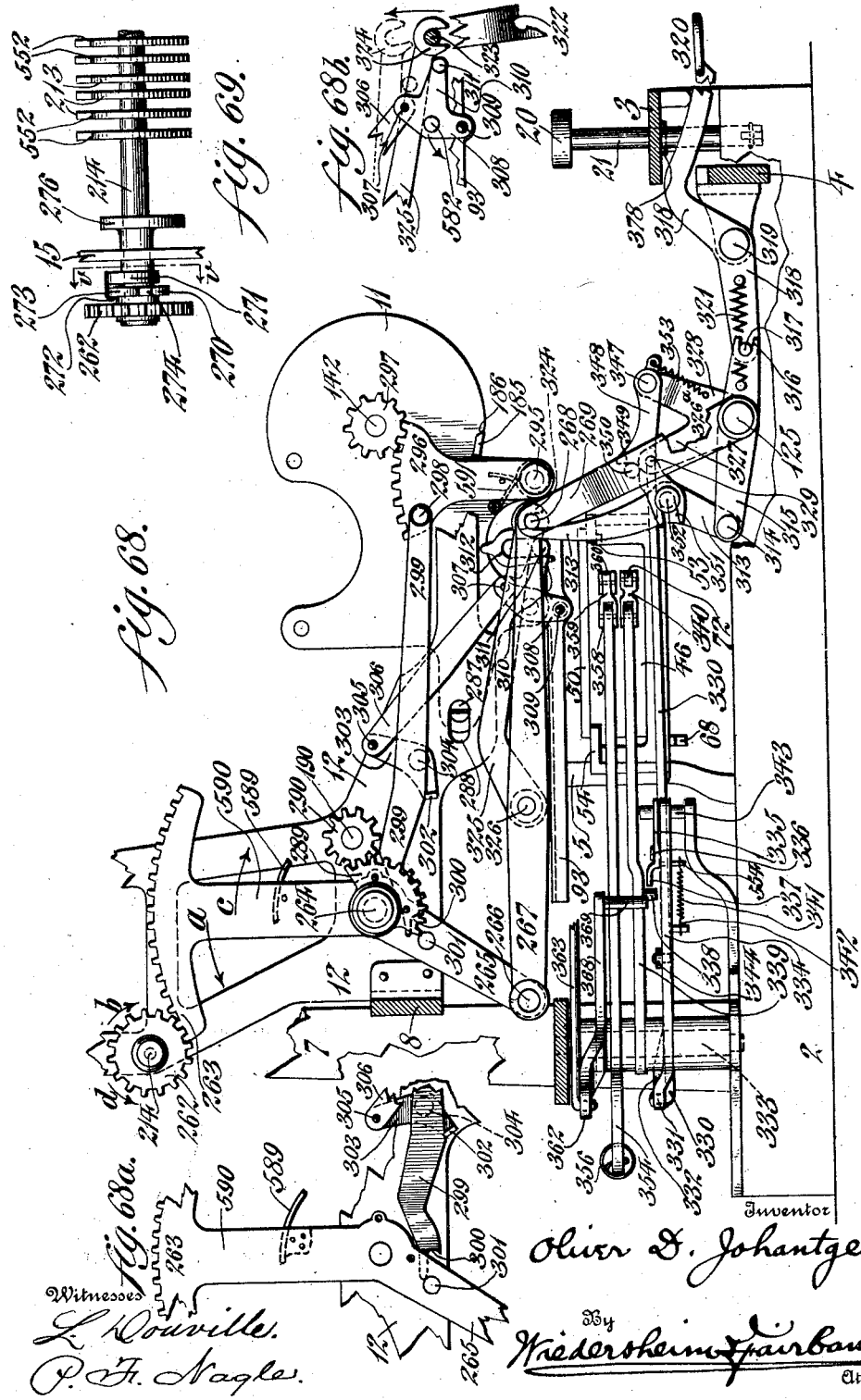

O. D. JOHANTGEN.
COMPUTING MACHINE.
APPLICATION FILED JAN. 19, 1906.
923,269.
Patented June 1, 1909.
32 SHEETS—SHEET 24.
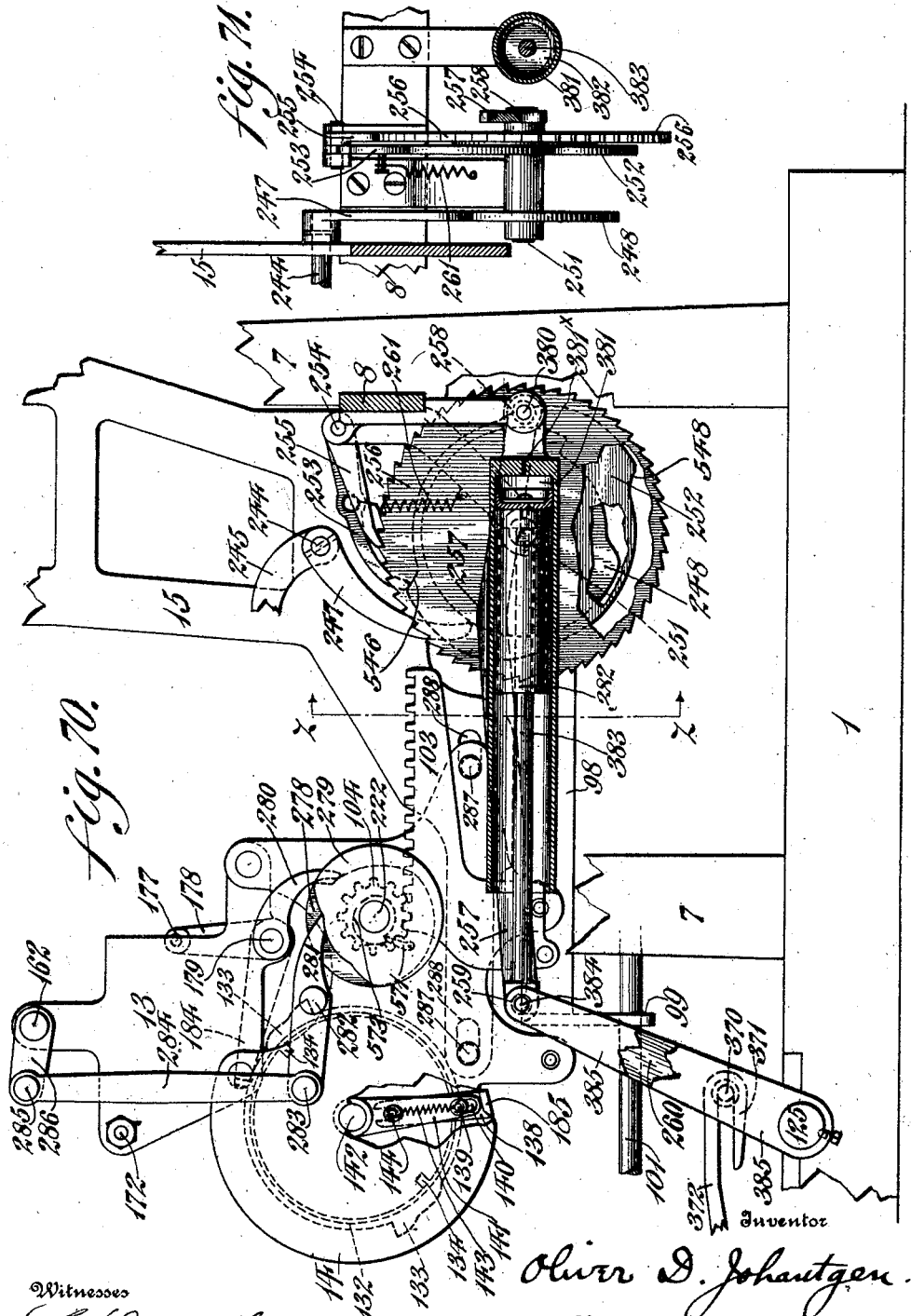

O. D. JOHANTGEN.
COMPUTING MACHINE.
APPLICATION FILED JAN. 19, 1906.
923,269.
Patented June 1, 1909.
32 SHEETS—SHEET 25.
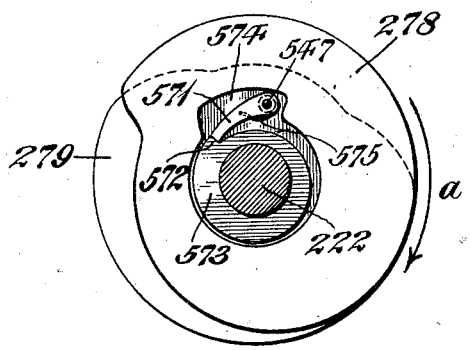
fig. 70a.
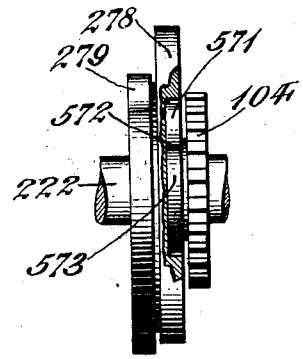
fig. 70d.
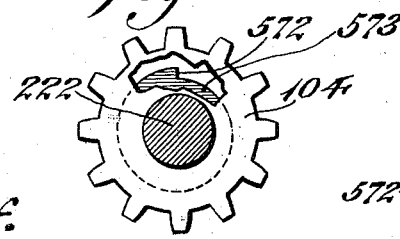
fig. 70b.
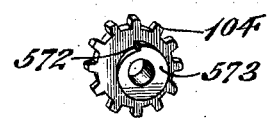
fig. 70g.
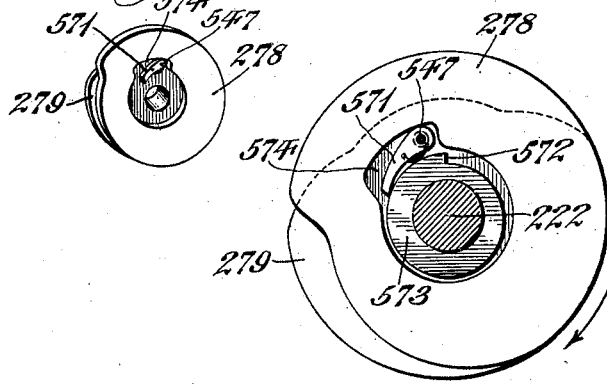
fig. 70f.
fig. 70c.
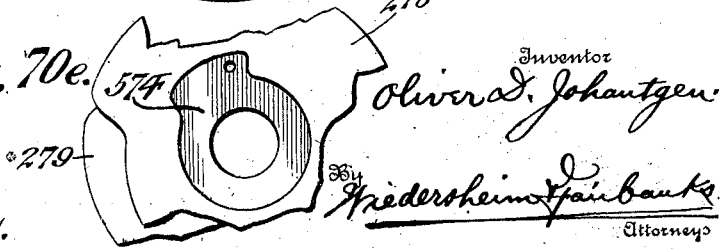
fig. 70e.
Witnesses
L. Couville,
P. F. Nagle.
Inventor
Oliver D. Johantgen.
By Wiedersheim Fairbanks
Attorneys

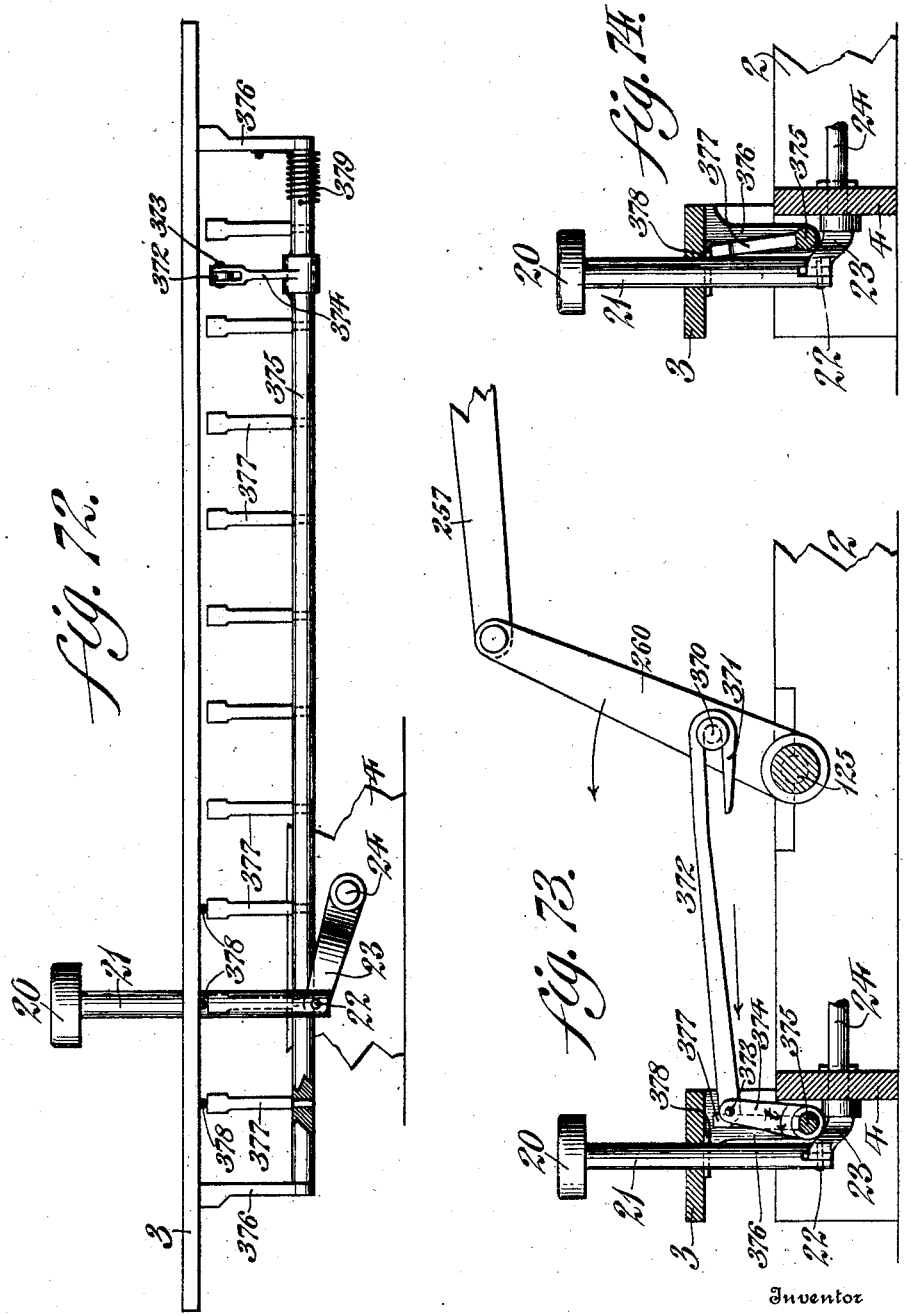

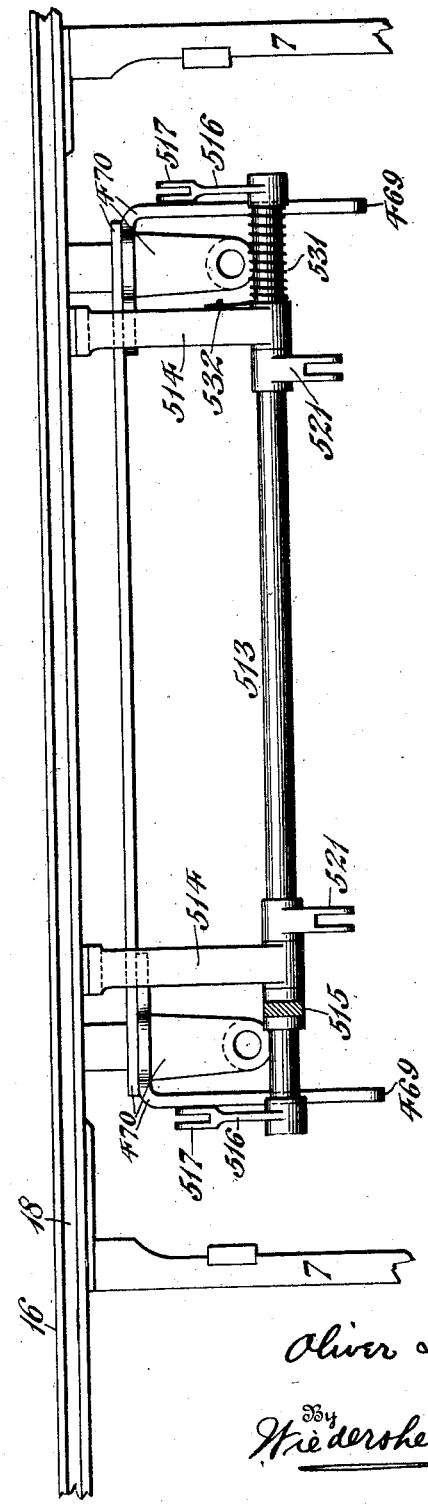

O. D. JOHANTGEN.
COMPUTING MACHINE.
APPLICATION FILED JAN. 19, 1906.

923,269.

Patented June 1, 1909.
32 SHEETS—SHEET 28.

Witnesses
P. F. Nagle.
L. Douville.

Inventor
Oliver D. Johantgen.
By Wiedersheim & Fairbanks
Attorneys

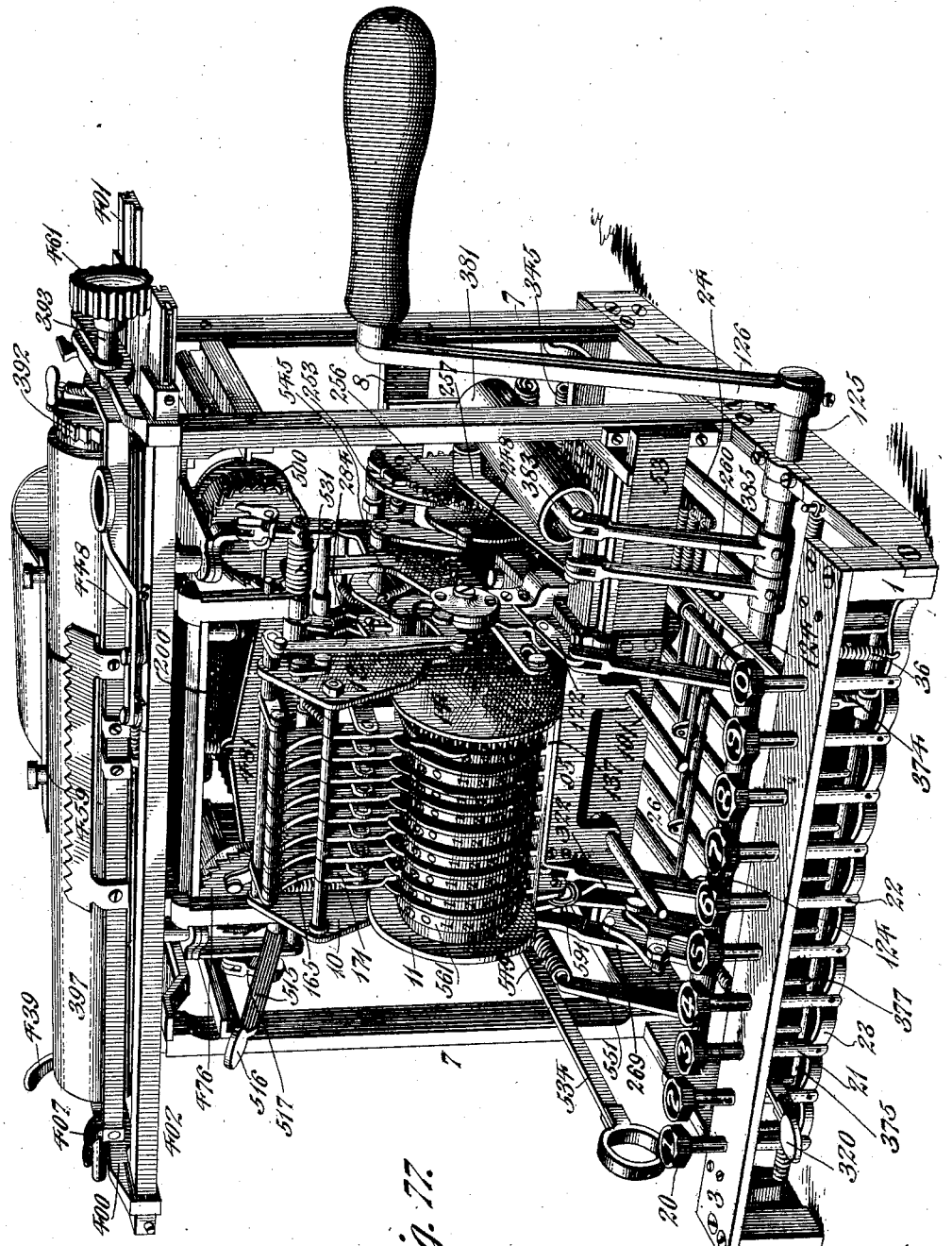

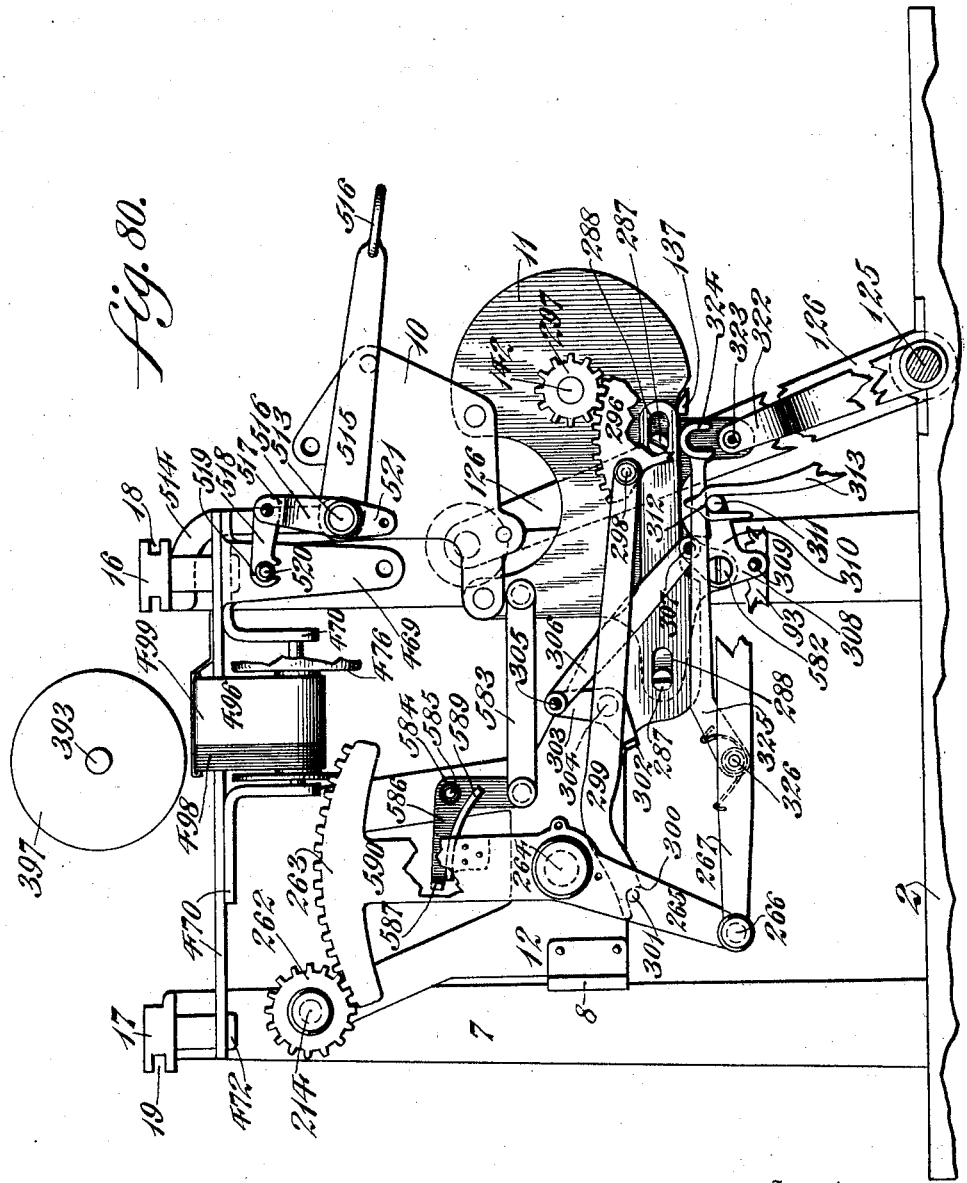

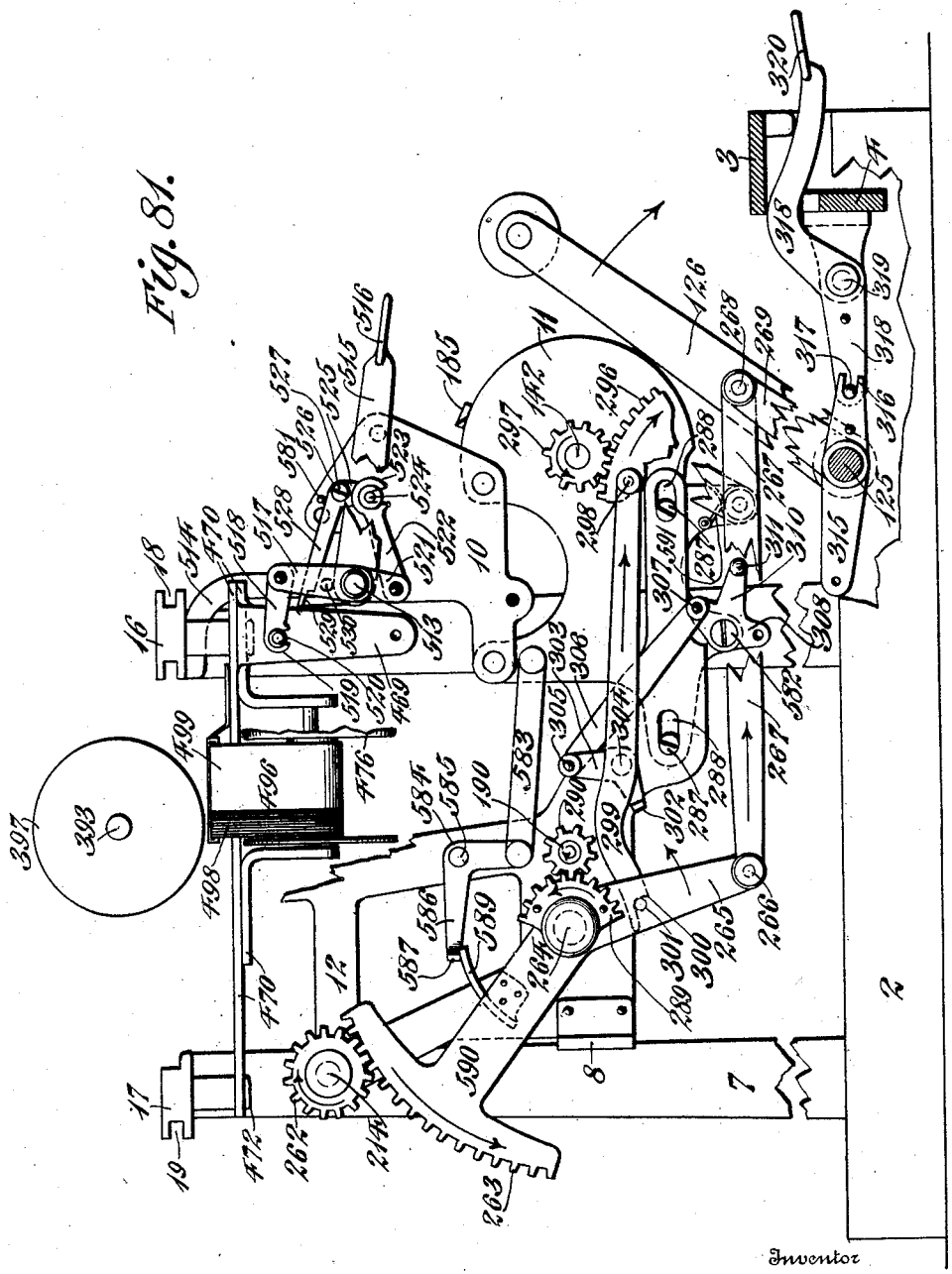

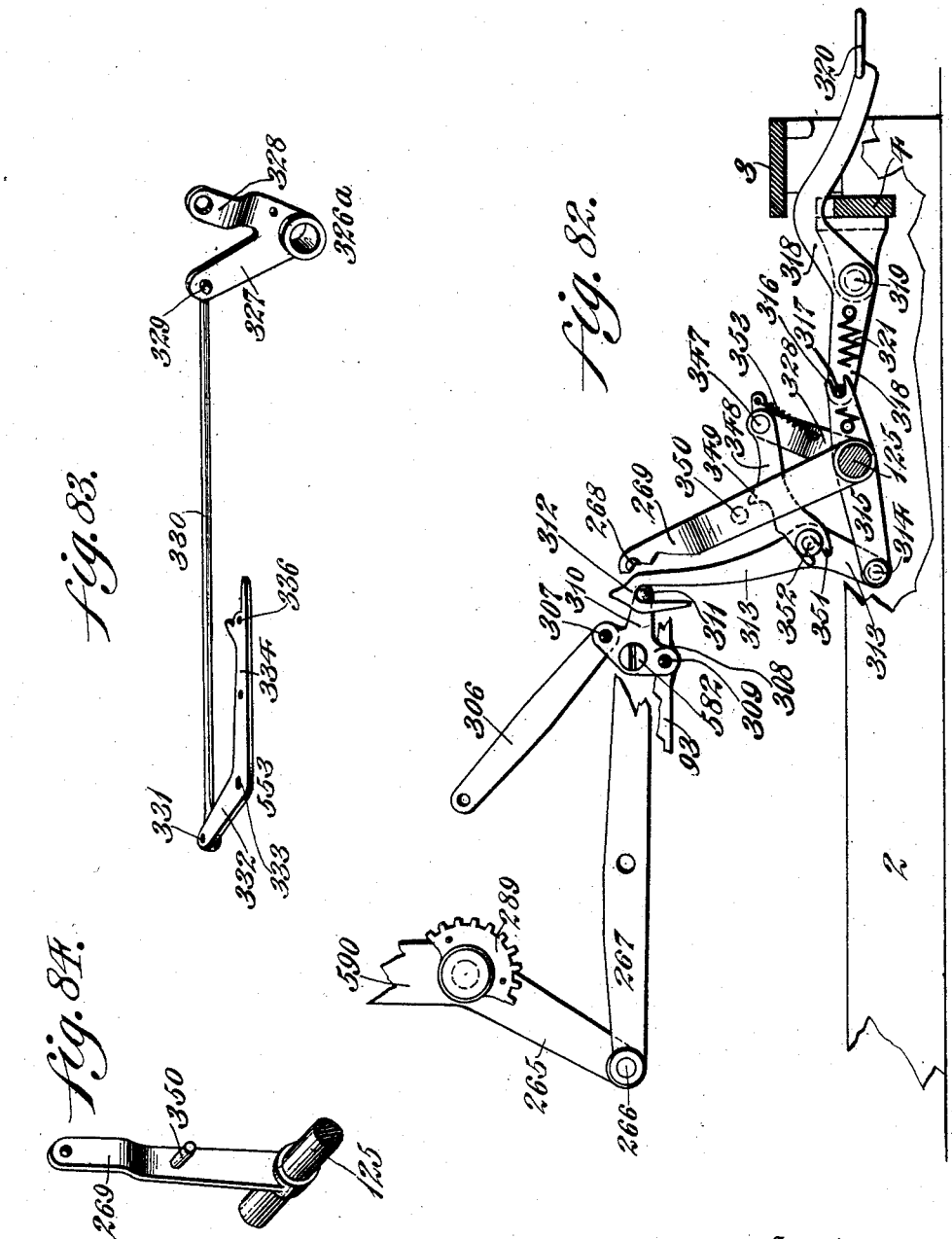

UNITED STATES PATENT OFFICE.

OLIVER D. JOHANTGEN, OF PHILADELPHIA, PENNSYLVANIA, ASSIGNOR OF ONE-FOURTH TO J. FRANK JOHANTGEN, ONE-FOURTH TO JOHN W. DUNTLEY, AND ONE-FOURTH TO WILLIAM O. DUNTLEY, OF CHICAGO, ILLINOIS.

COMPUTING-MACHINE.

No. 923,269.   Specification of Letters Patent.   Patented June 1, 1909.

Application filed January 19, 1906. Serial No. 296,880.

*To all whom it may concern:*

Be it known that I, OLIVER D. JOHANTGEN, a citizen of the United States, residing in the city and county of Philadelphia, State of Pennsylvania, have invented a new and useful Improvement in Computing-Machines, of which the following is a specification.

My invention relates to a novel construction of an adding or computing machine and comprises in its broad aspects a novel construction of setting mechanism, registering mechanism and recording or printing mechanism, so combined and correlated, that when certain keys corresponding to the number of the sum to be done, are actuated by the operator, the several mechanisms are thereby automatically so arranged that they can be properly set in motion by a manually operated device, such as a crank, lever or the like, and the registering and printing properly effected.

For the purpose of illustrating my invention, I have shown one form of machine, as this embodiment best illustrates the principle of my invention, although it is obvious that the principal instrumentalities of which my invention consists, can be variously arranged and organized and in the accompanying drawings, I have shown one embodiment thereof which I have found in practice to give satisfactory results, although it is to be understood that my invention is not limited to this specific arrangement and organization of these instrumentalities.

Further objects of my invention are to provide a computing machine, which cannot readily get out of order and which shall be neat and compact and occupy but a small space upon a desk and which can be operated in an extremely easy manner, few movements of the hand being required, and provision being further made, whereby the strip or slip sheet of paper upon which the figures and totals are printed and the numbers thereof are readily inspected and within easy reach, and to further provide a machine which will permit of a very rapid operation and will produce accurate and clear work, even when the keys are manipulated at a high speed, the keys and number of the working parts being reduced to a minimum.

In prior computing machines with which I am familiar, the movements have been largely dependent upon springs, which I have found to be a very objectionable feature, particularly in the adding and carrying devices and especially in the carrying devices, as there is nothing in the record printed to show whether the carrying device has operated or not. I have further found that if the carrying device or its equivalent is dependent upon a spring or springs for its operation, it may fail to act, thereby giving the wrong result. In my novel machine, this carrying operation is absolutely positive, and I employ but ten keys, which are the minimum in an adding machine and unlike other ten key machines with which I am familiar, no auxiliary keys are required to set the carriage.

A further object of my invention is the provision of novel means for printing totals in red, this being effected by the employment of a suitable black and red ribbon which is actuated by novel mechanism to be hereinafter referred to.

A further novel feature of my invention is the provision of means for returning the accumulator or adding wheels to zero and by the same operation bringing the printing mechanism to print the total, said printing mechanism being arranged so as to return the total to the accumulator wheels or leave them at zero, at the will of the operator.

My invention further consists of a novel construction of mechanism operated by the keys, which latter do not stand for any particular order, but are for one of each of the nine digits and one for naught, which is merely a spacing key for the carriage, each key being suitably connected with nine levers, which I term the setting levers, which stand for the nine digits, these being so arranged that their setting pins co-acting therewith, will be in one line, longitudinally of the machine, this line being hereinafter known as the setting line.

My invention further consists of a novel construction of a pin carriage, containing pins which are set in a novel manner to be hereinafter referred to, said carriage consisting of a number of pins in rows of nine each, to correspond to the nine digits and as many rows as there are columns to be added, which in the present machine are nine, although it will be apparent that these rows may be correspondingly increased or diminished according to requirements, said carriage further containing pawls, which are so constructed as to be common to any pin in a row and there being as many pawls as there are rows.

My novel construction of pin carriage further comprises a bar which is constructed to release said pawls, thereby allowing the pins to drop after the numbers have been added, said carriage having a position within the machine so that the first or left hand row of pins is directly over the setting line and at a distance equal to the distance from row to row to the right, of the right hand or unit rack, the racks employed being the same distance apart as the rows in the pin carriage and being acted on by these pins.

My invention further consists of a novel construction of adding mechanism, printing mechanism, and locking mechanism for the various parts, whereby the proper operation of the various mechanisms is automatically effected without requiring attention on the part of the operator.

It further consists of mechanisms for readily enabling any errors to be corrected caused by the operator inadvertently striking the wrong key, and of novel means for returning the various parts to initial position, after the setting, registering and recording mechanisms have performed their respective operations.

It further consists of other novel features of construction all as will be hereinafter fully set forth and particularly pointed out in the claims.

Figure 1 represents a front elevation of an adding machine embodying my invention, showing the cover or casing removed and certain parts being detached or omitted, for the sake of clearness of illustration. Fig. 2 represents a front elevation of a detached portion of the machine seen in Fig. 1, showing the type wheels in proper relation to the paper retaining springs. Fig. 3 represents a top plan view of a portion of Fig. 1, certain of the parts being omitted for the sake of clearness of illustration. Fig. 3ª represents a plan view of certain of the parts seen in Fig. 3 but in different positions, and on a reduced scale. Fig. 4 represents a plan view of the feed roller seen in Fig. 3, in detached position. Fig. 5 represents a section on line x—x Fig. 4. Fig. 6 represents a diagrammatic view or side elevation partly in section of Fig. 1, showing certain portions of the frame work removed or detached, for the sake of clearness of illustration. Fig. 6ª represents in detached position, a side elevation of the printing and accumulating idlers and their adjuncts in normal position. Fig. 6ᵇ represents a side elevation similar to Fig. 6ª, but showing the idlers in mesh and the accumulator idlers unlocked. Fig. 7 represents a side elevation of one of the register or accumulator wheels seen in Fig. 4 in detached position and showing also partly in section, the sweep bar for returning the parts to zero. Fig. 8 represents a side elevation of a cam seen in the upper left hand portion of Fig. 6, to be hereinafter referred to. Fig. 9 represents on a reduced scale, a front view of the machine partly in section corresponding in part to Fig. 1, but omitting certain of the elements seen in said figure, such as the adding racks, and showing particularly the pin actuating mechanism, type wheels and ribbon mechanism. Fig. 9ª is a horizontal section on line A, B, Fig. 9ᶜ. Fig. 9ᵇ is a front elevation of a locking lever employed to temporarily lock the type bars in position. Fig. 9ᶜ is a side elevation of the lever seen in Fig. 9ᵇ. Fig. 10 represents a plan view of the machine partly in section with certain parts omitted for the sake of clearness, showing especially the key board and pin carriage and connections common thereto, the rack carriage and the mechanism for actuating or returning said carriages, particularly the pin carriage. Fig. 10ª represents a detail view of certain levers and their adjuncts in a different position from that shown in Fig. 10. Fig. 10ᵇ represents a detail view of certain levers and their adjuncts in a different position from that shown in Fig. 10. Figs. 10ᶜ and 10ᵈ represent in detached position plan views of certain parts of the machine seen in Fig. 10. Figs. 11 and 12 represent sectional views, partly in elevation, of portions of the mechanism seen in the upper left hand portion of Fig. 10, said figures showing the levers in section and in the extreme positions they may assume. Fig. 13 represents a plan view of a portion of the key mechanism, showing the connection therefrom to the setting levers. Fig. 14 represents a sectional view of the pin carriage employed, showing the pins and their pawls therein and the setting means for said pins, said pins being shown in their normal position. Fig. 15 represents a sectional view of a portion of the machine seen in Fig. 14, but showing one of the pins in set-up or elevated position, and also the locking mechanism therefor. Fig. 16 represents a sectional view partly in elevation, of a portion of the apparatus seen in Fig. 14, showing a pair of pins, one being in normal position and the other in set-up or elevated position, with the locking device disengaged therefrom. Fig. 17 represents a perspective view of one pawl or locking device for a row of pins, in detached position. Fig. 18 represents a sectional view of a portion of the pin carriage viewed in a different direction from Figs. 14 to 16 and showing the stops or abutments on the pins, whereby the upward and downward movement of the same is limited. Fig. 19 represents on an enlarged scale, a perspective view of one of the pins seen in Figs.

Figure 45:
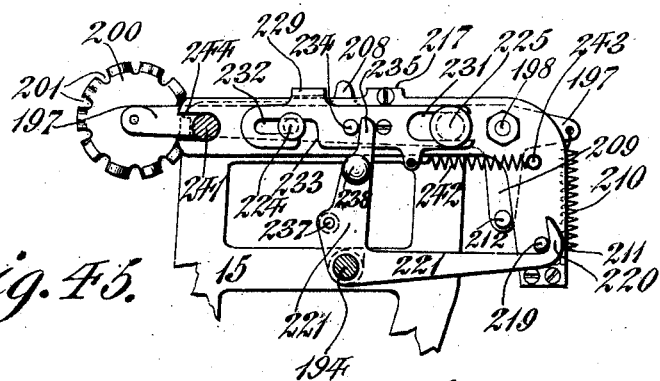
Figure 49A:
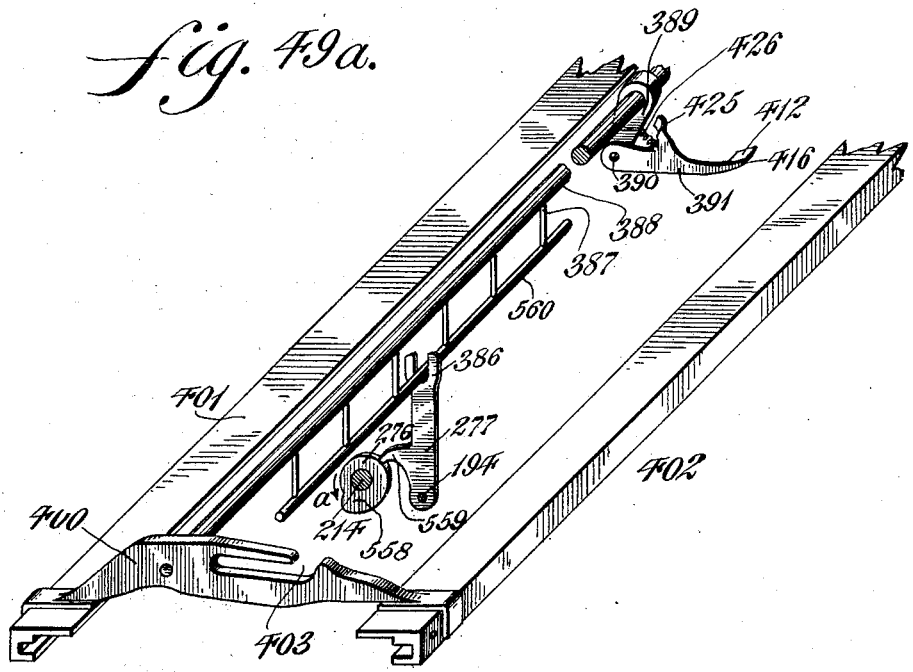
Figure 39B:
Figure 39C:
Figure 39A:
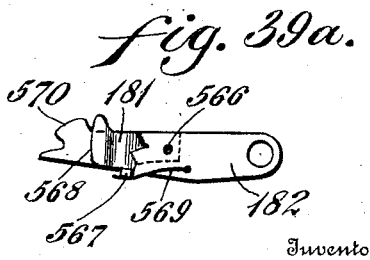
Figure 76:
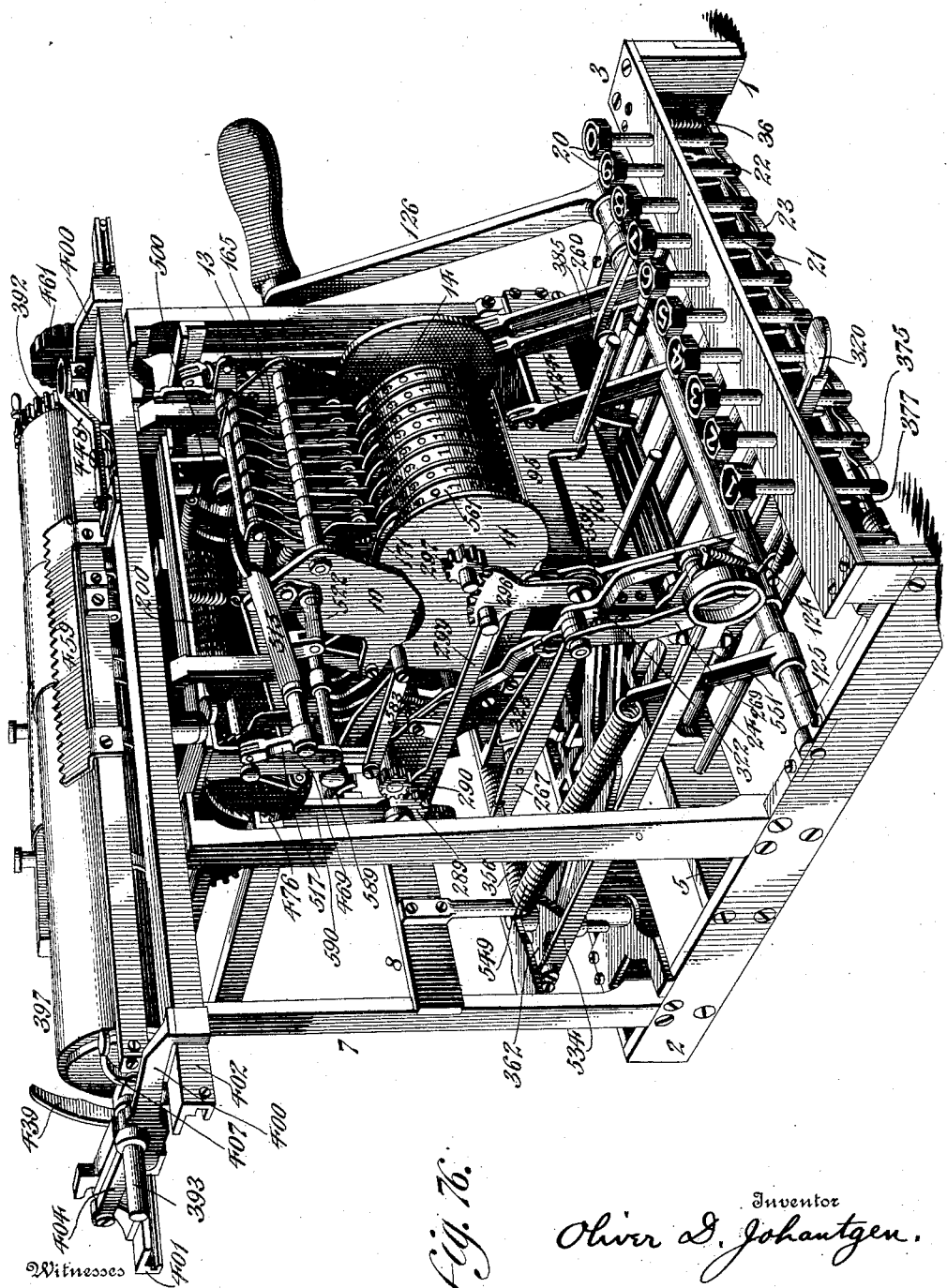

14 to 16 in detached position and showing particularly the stops on the side thereof and the shoulder which co-acts with the locking pawl. Fig. 20 represents a side elevation partly in section of a portion of the mechanism, seen at the right of Fig. 13, which is employed for spacing the pin carriage. Fig. 21 represents a side elevation of one of the key stems and its adjuncts seen in Fig. 13. Fig. 22 represents a side elevation, partly in section showing particularly the pin carriage, the pins therein, the means for setting up said pins and the rack mechanism adapted to co-act therewith. Fig. 23 represents a detached perspective view, of the frame of the pin carriage. Fig. 24 represents a perspective view of the top plate of the pin carriage, in detached position. Fig. 25 represents a perspective view of the bottom plate of the pin carriage in detached position. Fig. 26 represents a sectional view of the frame of the pin carriage seen in Fig. 23. Fig. 27 represents the pin carriage partly in section, showing in elevation, the unlocking bar and the relation of the locking pawls thereto, the latter being shown in section. Fig. 28 represents a plan view of a portion of the pin carriage shown in Fig. 27, showing also a plan view, partly in section of the unlocking bar and the means for actuating the same. Fig. 29 represents a side elevation of the pin carriage, showing also the escapement therefor co-acting therewith. Fig. 30 represents a side elevation of the pin carriage and the escapement therefor, similar to the construction seen in Fig. 29, but showing certain of the parts in different positions. Fig. 31 represents a side elevation of the pin carriage and a portion of the escapement device, showing also said pin carriage in its extreme left-hand position. Fig. 32 represents a plan view of the escapement device seen in Figs. 29 and 30. Fig. 33 represents a sectional view partly in elevation of the guide for the pin carriage, showing also the rack carriage in proximity thereto, and the guides for the rack carriage and the actuating mechanism therefor. Fig. 34 represents, in detached position, a front elevation of the adding racks, the gears co-acting therewith and the locking pawls intermediate said gears, the central one of said racks and pawls being shown in elevated position, and a portion of the frame being shown in section, on line $y$—$y$, Fig. 33. Fig. 35 represents a perspective view of one of the adding racks seen in the lower portion of Fig. 34 in detached position, showing also the means for unlocking the adding wheels. Fig. 35$^a$ represents a perspective view of the frame for the adding racks in detached position, showing also the rack employed for moving the carrying mechanism. Fig. 35$^b$ represents a plan view of the parts seen in Fig. 35. Figs. 35$^c$, 35$^d$, 35$^e$, 35$^f$, 35$^g$, and 35$^h$ represent detail views of certain of the parts seen in Fig. 35. Fig. 35$^i$ represents a perspective view of the frame seen in Fig. 35$^a$, and with its racks in position therein. Fig. 36 represents in detached position, a detailed view of a register wheel, the sweep bar co-acting therewith and the carrying mechanism and its adjuncts. Fig. 37 represents a side elevation of a portion of the mechanism seen in Fig. 36, showing the wheel and pawl seen in Fig. 36 in engaged position. Fig. 38 represents a side elevation of portions of the mechanism seen in Fig. 36, showing the register wheel in a slightly different position. Fig. 39 represents a side elevation of the mechanism seen in Fig. 38, showing the position the parts assume after the register wheel has rotated from the position seen in Fig. 38 toward the 9 point, or in passing from 8 to 9, the pivotal connection being shown in section on line $x^4$—$x^4$, Fig. 41. Figs. 39$^a$, 39$^b$ and 39$^c$ represent detail views of a pivoted latch and its adjuncts. Fig. 40 represents a side elevation of a portion of the mechanism seen in Figs. 36, 38 and 39, the register wheel being shown at the zero point or in the position it may assume after advancing from the position seen in Fig. 39. Figs. 40$^a$ and 40$^b$ represent perspective views of a side elevation of parts seen in Fig. 40. Fig. 40$^c$ represents a perspective view of one of the arms seen in Figs. 36 to 40. Fig. 41 represents a top elevation, partly in section, of a portion of the carrying mechanism seen in Fig. 36, in detached position. Fig. 41$^a$ represents a perspective view of one of the register or accumulator wheels in detached position. Fig. 42 represents in detached position, a front elevation partly in section, of the sweep bar or totaling bar for the register wheels, showing its connection to the shaft of the register wheels and their adjuncts. Fig. 43 represents a perspective view of the locking bar for the idlers for the printing device. Fig. 44 represents a perspective view of a rocking frame seen in Figs. 6, 36 and 37. Fig. 44$^a$ represents a perspective view of the sweep bar employed for returning the printing mechanism. Fig. 44$^b$ represents a perspective view of certain detached mechanism, seen in Figs. 6, 6$^a$ and 6$^b$. Fig. 45 represents a side elevation of the frame of a portion of the printing mechanism, showing also one of the printing wheels employed and the mechanism for unlocking the printing frame. Fig. 46 represents a perspective view of one of the printing wheels in detached position. Fig. 47 represents on an enlarged scale, a perspective view of a portion of the rear of the frame of the printing mechanism seen in Fig. 45 in detached position. Fig. 48 represents a perspective view of a portion of the mechanism seen in Fig. 45 in detached and disassembled position. Fig. 49 represents a side elevation, partly in section, of one of the printing wheels, showing the mechanism for actuating the same, showing also the ink ribbon and the roll for supporting the paper and their adjuncts. Fig. 49ª represents a perspective view of the sliding carriage for the platen. Fig. 50 represents a side elevation, partly in section, of the platen showing the ratchet and the actuating pawl therefor and their adjuncts, the parts being shown in a different position from that seen in Fig. 49. Fig. 51 represents a side elevation, partly in section, showing certain of the parts seen in Fig. 50, together with the shield for the pawl in a different position from that seen in Fig. 50. Fig. 52 represents a perspective view of the pawl seen in Figs. 50 and 51 in detached position. Fig. 53 represents a perspective view of the shield seen in Figs. 50 and 51, in detached position. Fig. 54 represents a section on line $y$—$y$, Fig. 51, showing the platen, shield and ratchet wheel in elevation and the pawl therefor in section. Fig. 55 represents a side elevation of the platen and its adjuncts in elevated or inoperative position. Fig. 56 represents a plan view of the sliding frame or carriage of the printing platen, seen in detached position from the mechanism seen in Fig. 3, a portion of said frame being also seen in Fig. 49ª. Fig. 57 represents a front elevation of the device seen in Fig. 56. Fig. 58 represents on an enlarged scale, a front elevation, partly in section, of the ink ribbon carrying and actuating mechanism, certain of the parts being omitted for the sake of clearness of illustration. Fig. 59 represents a vertical section on line $m$—$m$, Fig. 58, and viewed in the direction indicated by the arrows. Fig. 60 represents a perspective view in detached position of one of the reversing pawls seen in Fig. 58. Fig. 61 represents a front elevation of the ribbon carrying spool seen at the right of Fig. 58. Fig. 61ª represents a side elevation of a portion of the reversing mechanism. Fig. 62 represents an end view in detached position of the ribbon carrying spool seen at the left of Fig. 58. Fig. 63 represents a perspective view of the body of the spool seen in Fig. 59, showing also the means for securing the ink ribbon in place thereon. Fig. 64 represents an end view of the roll of the device seen in Fig. 63, showing the ribbon secured in position thereon and the pawl bar seen in Fig. 60 being in section. Fig. 65 represents a side elevation of the center frame and its adjuncts, showing particularly the inking mechanism, the means for printing totals in red, and also the mechanism for actuating the accumulator to take the total. Fig. 66 represents in detached position, a perspective view of a notched disk or ratchet wheel, a portion of which is seen in the upper left-hand portion of Fig. 65. Fig. 67 represents a perspective view, partly in section, on line $v$—$v$, in Fig. 69, of a portion of the gear wheel, ratchet mechanism and their adjuncts seen in the upper left-hand portion of Fig. 65. Fig. 67ª represents on an enlarged scale, a portion of the mechanism seen in Fig. 67. Fig. 68 represents a side elevation of the auxiliary parts, which are exterior to the center frame and are adapted to move the printing bars and their adjuncts, showing also the mechanism for obtaining the total and for repeating. Figs. 68ª, and 68ᵇ are side elevations of certain of the parts seen in Fig. 68 but in different positions from those in the latter figure. Fig. 68ᵍ represents a side elevation of certain detached portions of the machine. Fig. 69 represents a front elevation of the gear wheel and shaft seen in the upper left hand portions of Figs. 65 and 68, showing also the ratchet mechanism and the cams for actuating the printing bars, certain of the parts being omitted for the sake of clearness of illustration. Fig. 70 represents a side elevation partly in section, showing certain of the auxiliary parts of the side of the center frame opposite to the parts shown in Fig. 68, and showing particularly the mechanism for actuating the carrying device and showing also the ratchet mechanism which prevents improper movement of the main lever and also the cushioning device for taking up the shock of the recoil of the adding lever. Figs. 70ª, 70ᵇ, 70ᶜ and 70ᵉ represent front elevations of certain portions of the ratchet mechanism for operating the carrying device. Fig. 70ᵈ represents a rear elevation partly in section of certain of the parts seen in Figs. 70ª and 70ᵍ assembled. Fig. 70ᶠ is a perspective view of certain of the parts seen in Fig. 70ª on a reduced scale. Fig. 70ᵍ is a perspective view of certain of the parts seen in Fig. 70ᵇ, on a reduced scale. Fig. 71 represents a section on line $z$—$z$, Fig. 70, showing particularly the dash pot cylinder and its adjuncts and the ratchet mechanism last referred to. Fig. 72 represents in detached position, a front elevation of a portion of the key locking device. Fig. 73 represents a side view of a portion of the mechanism seen in Fig. 72, certain of the parts being shown in section. Fig. 74 represents a side elevation similar to Fig. 73 but omitting certain of the parts seen therein. Fig. 75 represents a front elevation of a portion of the frame of the machine with the ribbon mechanism frame placed therein, and with certain of the parts adapted to operate in conjunction with said ribbon mechanism frame, and also the tension device for holding the accumulator in normal position. Figs. 76 and 77 represent front perspective views of the machine viewed from different corners. Figs. 78 and 79 represent a plan view and side elevation of a modified construction of mechanism for returning the pin carriage and its adjuncts. Fig. 80 represents a side elevation of the machine, showing the position the parts assume when brought into position for totaling, upon the depression of the totaling lever. Fig. 81 represents a view similar to Fig. 80, showing the totaling lever still depressed, and the main operating lever near its extreme forward position, the machine being now in the act of taking a total. Fig. 82 represents a side elevation, partly in section of a portion of the repeating mechanism, in the position it assumes when repeating. Fig. 83 represents in detached position, a perspective view of a portion of the mechanism for returning the pin carriage. Fig. 84 represents a perspective view of a rock arm carried by the main shaft.

Similar numerals of reference indicate corresponding parts in the figures.

Referring to the drawings:—In the detailed description of my novel computing machine, it will be understood that I have shown but one embodiment of the broad principle of my invention, since it is apparent that the same may be carried out in various forms of mechanism or organizations without departing from the spirit or scope of the same.

The present invention in its broad aspects comprises several distinct sets of mechanisms which coöperate and are dependent upon each other to produce the ultimate objects or results sought for, and I will therefore describe each of the same in detail and in the natural or logical sequence in which they are thrown in operation in the act of adding. In these broad aspects, my novel machine embodies a suitable frame-work, upon or within which, is mounted or carried respectively the key board mechanism and the pin carriage, next the adding racks and the mechanism intermediate the pin carriage and the adding racks, then the inner frame which carries the accumulator, the printing mechanism and certain auxiliary parts, next the mechanism for carrying and actuating the inking ribbon and the platen and their adjuncts for effecting the travel and proper manipulation of the paper.

*The frame of the machine.*—While I prefer to use the form of frame shown, I do not desire to be limited to the same in every instance, as many forms or contours may be designed or used which will answer the purpose. In the present case, the frame consists of side pieces 1 and 2, which are joined together at their front portions by the transverse strip 3, which serves the double function of bracing the front portion of the frame and also as guides for the stems 21 of the keys 20, to be hereinafter referred to.

4 designates a front strip joining the side numbers 1 and 2, the same being located below the strip 3 and serving as a support for the key shafts 24, to be hereinafter referred to.

5 designates an internal tie piece extending transversely between the sides 1 and 2 and serving as a support for the rear journals of the key shafts 24. The rear portion of the side pieces 1 and 2 is tied together by means of the back strip 6.

7 designates four uprights located at substantially the four corners of the machine, which are adapted to support the paper and ribbon carrying mechanism, to be hereinafter referred to, the rear pair of supports being braced by the rear tie piece 8.

The foregoing elements comprise the outer frame work or body of the machine, within which is contained and supported the principal operating mechanism, as the center frame 9, said frame comprising sides, each composed of the members 10, 11, 12 on one side, as the left-hand side, as shown in Fig. 65, while on the other side the corresponding parts are indicated at 13, 14 and 15, as best seen in Fig. 70.

16 and 17 designate the front and rear top rails of the frame work, the same being supported on the uprights 7, and having the ways 18, 19 therein, in which the carriage for the platen to be hereinafter referred to is guided. It will, however, be obvious that the frame may be differently braced or tied together, and that the various shafts and operating mechanism may be supported in different ways from those shown, so that I do not care to be limited in every instance, to the exact structure shown.

*The key board and key operated mechanism.*—One of the principal objectionable features in prior machines with which I am familiar, arises from the extent of space occupied by the key board and the large number of keys employed in conjunction therewith, by reason of which the machine occupies a great deal of unnecessary space and the operation of the same is rendered unnecessarily complex by reason of the multiplicity of keys. Furthermore, where a great number of keys are employed, there is great liability of the levers, springs and actuating mechanism to readily get out of order, a very objectionable feature which I have wholly dispensed with in the present machine wherein I employ a single row of keys numbered consecutively from left to right as 1, 2, 3, 4, 5, 6, 7, 8, 9, 0, and it will be observed that I further arrange the row of keys in close proximity to the front of the machine so that the length of the machine is reduced to a minimum.

20 designates the key tops preferably numbered consecutively from left to right, as will be understood from Fig. 10. Each of said key tops is supported upon a stem 21, which is pivotally secured at the point 22 to the arm 23 which is secured to the front end of the rock or key shaft 24, the forward end of each of the latter having its bearing in the strip or tie piece 4, while the stems 21 have their bearing in the transverse strip 3. The rear extremities of each of the key shafts 24 have, in the present instance, their bearings in the internal tie piece 5, as will be best understood from Fig. 13. Inasmuch as the connection from each of the keys 20 to its respective shaft is made in substantially the same way, I have deemed it unnecessary to describe in further detail the connection of each key to its shaft.

25 designates rear rock arms secured to each of the rock or key shafts 24, as will be understood from Figs. 9 and 13, it being understood that said arms 25 are fastened on said shafts 24 and rock in unison therewith, as seen in said Figs. 9, 13 and 22.

26 designates links, each of which have one end pivotally secured to the rear rock arms 25, while their opposite extremity is secured to the member 27 of the elbow levers or pin setting devices 28, the latter being nine in number and each having the arm 29 which has the terminal or pin 30, as will be best understood from Figs. 9, 13, 14, 15 and 22, said pin setting devices being loosely mounted on the setting lever shaft 31, which has its bearings in the lugs 32 and 33, which are supported upon the strips or tie pieces 4 and 5 respectively.

34 designates a series of springs, each of which have one end secured to the arm 35 which, in the present instance, projects inwardly from the internal tie piece 5, although it will be apparent that said arm may be secured or supported in any suitable manner, other than that shown.

As will be understood from the Figs. 13, 14 and 15, each one of the members 27 of the nine pin setting devices has secured thereto, one end of said spring 34, the other end of the latter being secured to the arm 35, certain of said springs, however, being omitted from Fig. 13 for the sake of clearness of illustration. In the preferred construction, seen in Fig. 13, it will be seen that the key shafts 24, which co-act with the keys numbered 1 to 9 are each so assembled and correlated that the proper normal position of the same is assured by means of the springs 34. In the case of the extreme right hand shaft 24, which is actuated by the depression of the zero key, as will be understood from Fig. 13, I employ a spring 36, as best seen at the lower right-hand portion of Fig. 1, the lower end of said spring being secured to the co-acting arm 23, while its upper end is secured to a suitable fixed point, as the front rail or transverse strip 3. In order that the setting lever shaft 31 may normally assume the proper or desired position, I equip the same with an arm 37, to which one end of the spring 38 is attached, the other end of said spring being secured to the side piece 1, or other fixed point.

39 designates a rock arm mounted on the right hand key shaft of the zero key shaft 24, as will be best understood from Figs. 13 and 20, said arm having connected thereto one end of the link 40, the other end of said link being forked or bifurcated as indicated at 41, and adapted to engage the pin 42 on the arm 43, which is fast on the setting lever shaft 31 from which it will be seen that as the zero key is depressed and the extreme right hand shaft 24, seen in Fig. 13, operated, the setting lever shaft 31 will also operate in unison therewith.

It will be seen from Fig. 20 that by providing the end of the link 40 with a slot or bifurcation as indicated at 41, a certain amount of play is permitted to the setting lever shaft 31 independent of the extreme movement of the rock shaft 24.

*The pin carriage and pins.*—One of the principal novel features of my present invention whereby I am enabled to dispense with numerous pieces of mechanism heretofore employed, comprises a pin carriage and pins therefor, the latter being actuated by the setting devices 28, which have already been explained, and said pins in their elevated or set up position representing temporarily the members struck upon the key board, which it is desired to add. It will be evident that various embodiments of the broad principle of this feature of my invention may be designed, but the present organization, I have found, in practice, to give the best results, the preferred construction being seen in plan view in Fig. 10 and in section in Figs. 14, 15, 16, 18, 22, 23, 24 and 25. The detail of the construction of the pin carriage will be best understood from Figs. 23 to 27 inclusive, wherein 44 is the frame work or body of the carriage, the same consisting of end pieces 45 and 46, which have secured thereto the side pieces 47 and 48.

49 designates a top plate, the same consisting of a sheet of metal 50, having the recessed sides 51, whereby the four corner lugs 52 are formed, which serve to support the carriage proper, when the parts are assembled upon the guides 52 and 54, as best seen in Figs. 6 and 10.

It will be understood that in practice the top plate 50 is held in position upon the top of the frame 44, by any suitable means as screws, pins or other equivalent fastening devices.

It will be apparent that the parts which constitute the pin carriage may be readily assembled and disconnected and that the pin carriage itself may be sustained and actuated in other ways than that shown without departing from the spirit of my invention.

55 designates a series of square or other shaped slots or openings, which are arranged in lines parallel and at right angles with each other and which, in the present instance are eighty-one in number, said slots or openings serving as guides for the upper portion of the pins 57, the construction of which will be best understood from Figs. 14, 15, 16, 19 and 22.

It will be apparent that the slots 55 may be of other polygonal shape or round if desired, although I have found the construction shown to give excellent results in practice. As hereinbefore explained, in the present instance, I have shown the numbers of pins and slots or guides therefor, in the pin carriage as eighty-one in number, it being understood that I arrange in rows or series, nine pins in each row to correspond with each digit, and have as many rows as there are columns to be added, in the present instance, nine, as will hereinafter appear, although it will be understood that said rows may be increased or diminished according to requirements.

58 designates the bottom plate of the pin carriage, the same consisting in the present instance of the rectangular or other shaped sheet of metal having openings or guides 59 therein, it being understood that said bottom plate is secured to the underside of the frame of the pin carriage by any suitable means as pins, screws, or equivalent fastening devices, and it being further apparent that when the parts are in assembled position, the polygonal shaped slots or guides 59 will be in direct vertical alinement with the corresponding slots 55, whereby the pins 57 will be properly guided and directed under all conditions.

It will be apparent that while I have shown and described the preferred manner of constructing or assembling the pin carriage and its adjuncts, the same may be constructed in other equivalent ways and still be within the scope of my invention.

*The pins and their adjuncts.*—In Fig. 19 I have shown one of the pins 57 in detached position on an enlarged scale, the relative position of the pins to the pin carriage and its adjuncts when the parts are in assembled position, being understood from Figs. 14, 15, 16, 18 and 22 to which reference will now be had. Each of the eighty-one pins employed is, in the present instance, constructed substantially identical with each other, and is provided on its side with the upper and lower lugs 60 and 61, whose function will be readily apparent from Fig. 18, it being understood that the upper lug 60 determines the extent of upward movement of each pin by reason of its contact with the underside of the top plate 50, while the lower lug 61 acts as a stop, when the pins are in their lowermost position, by reason of its contact with the upper side of the lower plate 58, as will be understood from Figs. 18 and 22. Each of the pins 57 is provided with the shoulder 62, which preferably extends at substantially right angles from the body of the pin, the top wall or portion above said shoulder being beveled or inclined downwardly as indicated at 63. When the assembled pins are in their normal or lowest position, as indicated in Fig. 14, the pawls 64 are resting upon the inclined faces 63, as will be understood from Fig. 14, each of said pawls being mounted upon the arms 65, and said arms 65 being pivotally mounted upon the oppositely located pins 66, best seen in Figs. 23, 26 and 27. It will be evident that I employ as many pawls 64 or their equivalents, as there are rows of pins or their equivalents, and while I have shown the preferred manner of assembling the pawls and their adjuncts, the same may be assembled and constructed in different ways and still fall within the scope of my invention. The pawls 64 are normally retained in contact with the juxtaposed walls of the pins 57 through the medium of the springs 67, as will be best understood from Figs. 14, 15, 26 and 27, wherefrom it will be apparent that as one of the pins is set up or elevated from the position seen in Fig. 14, to the position seen in Fig. 15, the effect of the springs 67 will be to cause the pawl 64 to engage the shoulder 62, and thereby hold said pin in set up or elevated position for the period desired. It will thus be understood, that the pins 57 after being raised to the position seen in Fig. 15 are locked in set up or elevated position, by their appropriate pawl 64, until the latter is operated in the proper direction in the manner to be hereinafter described.

On the side piece 47 is a rack or series of teeth, 68 (see Figs. 23, 26, 27, 29, 30 and 31) said rack terminating in a tail piece 69, and said parts co-acting with an escapement device to be hereinafter described.

Guided in the end pieces 45 and 46 of the pin carriage frame 44 is an unlocking bar 70 provided with members 71, which project upwardly from said bar preferably as seen in Figs. 26, 27 and 28, and are in contact with the pawls 64, for the purpose of simultaneously actuating said pawls, so as to unlock the pins 57, whereby they can drop and assume their normal positions when desired. A sliding motion in the direction indicated by the arrow *a* in Fig. 28, is imparted to the unlocking bar 70, by a lever 72 (seen also in Fig. 10) which is fulcrumed at the point 73, the mechanism which operates said lever 72, being hereinafter described. A motion in a direction opposite to that indicated by the arrow *a* in Fig. 28, is imparted to the unlocking bar 70, by the springs 67 and pawls 64, in a manner hereinafter described.

*The escapement device for the pin carriage.*—In Figs. 13, 29, 30, 31 and 32, I show an escapement employed in connection with the rack 68, said escapement consisting of a lever 74 secured fast to the setting lever shaft 31, so as to turn therewith, it being noted that the free end of said lever 74 is forked at 75, so as to engage with a stud 76, which projects from the lever 77, so as to rock the latter as hereinafter described, it being noted that said lever 77 is fulcrumed at 78 in a lug 79, which rises from the internal tie piece 5. The forward end 80 of the lever 77 is in contact with a lug 81 (see more particularly Fig. 32) on the pawl 82 which is pivoted at 83 to the arm 84 which latter is pivoted at 85 to the guide bar 54, it being noted that said arm 84 is adapted to be swung in the space between the stops 86 and 87, the two latter serving to limit the throw of said arm 84 when moved to the right or to the left, by mechanism hereinafter described. The pawl 82 is provided with a lug or tooth 88, as seen in Fig. 32, which is adapted to engage with the teeth in the rack 68, said teeth being also engaged by the tooth or lug 89 which projects from the lever 77. The pawl 82 has secured thereto one end of a spring 90, whose opposite end is fastened to the guide bar 54, the purpose of which spring is to retain the pawl 82, normally in contact with the rack 68.

91 designates arms which are fast on the setting lever shaft 31 and between which arms are placed the pin setting device 28, see Figs. 13, 14 and 15, each of said arms 91 having secured thereto the rod 92, also seen in Fig. 22, which lies in the path of the members 27 of the pin setting devices 28, for the purpose of rocking the shaft 31.

The general description of the operation of the escapement device is as follows:—When the parts are in the position seen in Fig. 29, the lug 89 on the lever 77 is out of engagement with the rack 68, and the lug 88 on the pawl 82 is shown as being in engagement with a tooth of said rack. Now assuming the setting lever shaft 31 to be rocked in the proper direction, so as to raise the arm 74, the lug 89 on the lever 77 is lifted from the position seen in Fig. 29 to the position seen in Fig. 30 and comes into engagement with a tooth of said rack 68 and simultaneously with the foregoing action, the lug 88, on the pawl 82 moves downwardly from the position seen in Fig. 29 to the position seen in Fig. 30, where it is out of engagement of the rack 68, it being apparent that any improper movement of the arm 84 is prevented through the medium of the stops 86 and 87 as will be seen from the left-hand portion of Figs. 29 and 30. When the setting lever shaft 31 is again restored to its normal position by the spring 38 as shown in Fig. 13, the lug 89 drops from the position seen in Fig. 80 and by reason of the intermediate connections, the lug 88 will be caused to rise so as to engage the continuous tooth seen in Fig. 30, whereupon it will be apparent that the pin carriage has moved one notch to the left, it being understood that the pin carriage is drawn to the left by the spring 356 and other mechanism, to be hereinafter referred to. The connections between the arm 74, the lever 77, the forward end of said lever, the pawl 82 and the arm 84 will be clearly apparent from Fig. 32.

It will be apparent from the foregoing that after the carriage is moved one space to the left, it is temporarily locked, in which position another row of pins is over the setting line, so that any pin in the next line may be set up.

*The adding racks and their adjuncts.*—The function of the pins and their adjuncts, which has been heretofore described in detail, is to co-act with the mechanism, by which the adding and printing is effected, said adding being accomplished by means of mechanism which I term the adding racks and their co-acting parts, and which will now be described. Secured within the main frame of the machine are guide bars or ways 93 upon which the adding rack frame or carriage 94 is fitted and is moved to and fro in said ways by mechanism hereafter described. The rack carriage 94 consists of the end pieces 95 and 96 and the side pieces 97 and 98, it being noted that the end piece 95 is formed with the depending lugs 99, which have openings 100 therein, which are adapted to receive the guide rods 101, which project from the guide 53, as best seen in Figs. 1, 6, 10, 22, 33 and 70, it being apparent that said rods 101, which pass through the depending members 99, constitute the forward support for the carriage 94 and permit the latter to be moved to and fro. The rear end piece 96 is provided with ears having slots 102 at their ends, as seen in Figs. 34, 35$^a$ and 35$^i$, said slots being fitted upon the guide bars or ways 93 and thus supporting the rear portion of the adding rack carriage 94, which is provided with a rack 103 which meshes with the gear wheel 104 (seen in Fig. 70) for the purpose hereinafter described. The carriage 94 is provided with rods 105 and 106, (as seen in Fig. 35$^a$) and also with the outwardly projecting studs 107.

In Figs. 35 and 35$^b$, I illustrate an adding rack which consists of the toothed member or rack 108, which has pivoted thereto at 109, a pawl 110, which is provided with a lug 111, it being noted that the forward end of said pawl 110 rests upon a pin 112, which projects laterally from said rack 108. The forward end of the rack 108 has pivoted thereto at 113, one end of an arm 114, and at its rear end is pivoted at 115 the arm 116. An arm 117 projects from a base 118 which is common to both of said arms 116 and 117, so as to cause them to move in unison. The rack 108 has secured thereto a bar or plate 119 whose upper edge is substantially on a level with the tops of the teeth in the rack 108, (see Figs. 6, 34 and 35$^i$). In the present instance, each plate 119, is secured to its rack by the pins 112 and 113, it being apparent from Fig. 35ʰ that the pin 112 is shouldered, so that a space is formed between each plate 119 and its rack 108, within which space is located the free end of the pawl 110. The arm 116 has pivoted thereto one extremity of the link 120, as best seen in Figs. 6, 22, the opposite extremity of said link having secured thereto a spring 121. It is to be understood that in the present machine, the adding racks 108 and their adjuncts, as described, are nine in number, as are also the plates 119, and that these are fitted in the carriage 94, as best seen in Figs. 10 and 35ⁱ. It will, however, be understood that the number of adding racks may be increased or diminished, according to the capacity of the machine, the present machine being adapted for adding nine columns.

It will be apparent that while I have shown in Figs. 35, 35ᵉ, 35ᶠ, 35ᵍ and 35ʰ, one form of mechanism for permitting the necessary play of upward movement of the adding racks 108, other equivalent means may be employed without departing from my invention.

The carriage 94 has two links 122 pivoted thereto at 107, one of which is shown in Fig. 33, the opposite end of which link is pivoted at 123 to an arm 124, secured to a sleeve 537, which is loose on the main shaft 125, which latter is provided with an arm or main operating lever 126, for the purpose of rocking said shaft 125 when it is desired to operate the parts connected therewith (see also Figs. 1 and 10.)

The co-action between the pins 57, the pawls 110 and the adding racks 108, will be readily apparent from Figs. 6 and 22, said Fig. 6 showing the racks in their lower or inferior position, while in Fig. 22 one of the racks is shown in the elevated position it assumes after a pin, as 57, has been set up or elevated, and the rack carriage 94, moved forwardly until the pawl 110 has contacted with the pin in its path, whereupon, the movement of said pawl being arrested, while the rack carriage advances a slight distance, the appropriate rack now appears in its elevated position as in Fig. 22.

*The adding or registering wheels.*—The racks 108 are brought into engagement, at certain times with the idle gear wheels 127 and 128 (see Figs. 6, 9, 22 and 34) it being noted that the printing idlers or gear wheels 127 are nine in number and are loosely mounted on the shaft 129, the ends of which latter are secured in the side pieces 12 and 15 of the center frame. The accumulator idlers or gear wheels 128 are nine in number and are loosely mounted on the shaft 130, whose ends are secured in the side pieces 11 and 14 of the center frame. The accumulator idlers 128 are always in mesh with the gear wheels 131, which are also nine in number and each of which has connected therewith a register wheel 132 as best seen in Fig. 6. Each of the register wheels 132 is provided with a pair of oppositely located cams 133, (Figs. 6, 36, 38, 39, 40 and 41ᵃ) adapted to co-act with a system of levers hereinafter described. The periphery of each of said register wheels 132 has two sets of numbers thereon, which indicate the nine digits and a cipher or zero, as seen in Figs. 1 and 41ᵃ, it being understood that only a few of these numbers are shown, for the sake of clearness of illustration.

In the simplest embodiment of my machine, each register wheel 132 would have but a single cam and one series of numerals from 0 to 9, distributed over its entire periphery or circumference, and its contiguous gear 131, attached thereto, would in that case have but ten teeth. For mechanical convenience, however, I have found it preferable to provide each register or accumulator wheel 132 with two cams 133, diametrically opposite to each other and to arrange on the periphery of each wheel 132, two sets of numerals as follows: 0, 1, 2, 3, 4, 5, 6, 7, 8, 9, 0, 1, 2, 3, 4, 5, 6, 7, 8, 9, it being evident that in the present machine, under the above conditions, I give the gears 131 twenty teeth. If desired the register wheels may have three or four cams, in which case there would be three or four sets of numerals 0 to 9 on their periphery, and the teeth of the gears 131 would be either thirty or forty in number under these conditions. I do not therefore desire to be limited to any particular number of cams or arrangement of digits or specified teeth for the gears 131.

The register wheels 132 are each provided with a pair of lugs 134, best seen in Fig. 41ᵃ, which operate in conjunction with lugs 135, which are carried by the totaling bar 137, having the fingers or arms 136 (see Figs. 1, 6, 7, 42 and 70) and provided with the outer arms 138, which have pins 139 thereon that project through slots 140 in the arms 141, which latter are secured fast to the shaft 142, it being noted that said pins 139 each have one end of a spring 143 secured thereto, while its opposite end is secured to a fixed point 144 on the arms 141, there being two such arms, as best seen in Figs. 1, 42 and 70. It is apparent that the arms 138 and 141 are free to slide upon each other, while at the same time they are prevented from becoming detached, as will be seen from an inspection of the left-hand portion of Figs. 42 and 70. The totaling bar 137 has the projecting members or terminals 185, which normally occupy the recesses 186 in the side pieces 11 and 14 of the center frames.

145 designates a shaft fulcrumed in the center frame and having on one end the lever 146, whose upper end is joined by the bar 147 to the arm 578, while its lower end is pivoted at 148 to a link 149, whose free end is forked as at 150 to fit upon the shaft 129, as an abutment for said link, as is best seen in Figs. 6, 6ª, 6ᵇ and 42ᵇ. The lever 146 has pivoted thereto at 145 a pawl 151 which is normally in engagement with its respective gear wheel 128, as seen in Figs. 6 and 6ª, it being understood that there are nine pawls 151, one for each accumulator idler or gear wheel 128, which are likewise nine in number, as best seen in Fig. 34, it being noted that there are also nine bars 152, one of which is seen in Fig. 6, while the relative position of said bars to the co-acting plates 119 will be understood from Fig. 34. Each of the bars 152 is pivoted at 153 to its respective pawl 151, it being noted that the lower extremity of each of said bars is twisted or turned so as to form the terminal 154, so as to be readily engaged by the upper surfaces of the bars or plates 119, which are secured to their contiguous adding racks. The bars 152 are forked as at 155 so as to straddle the shaft 130 on the hubs of the idlers 128 and slide thereon, thereby properly guiding said bars in their up and down movements. The member 156 of each pawl 151 is in the path of the rod 147, which joins the lever 146 to the arm 578, so as to be turned upon the fulcrum 145, thereby when so desired, as will be understood from Figs. 6ª, 6ᵇ, and 44ᵇ.

*The carrying mechanism.*—Pivoted at 157 to an extension on the arm or lever 146 is a link 158 (see Figs. 6, 6ª, 6ᵇ and 44ᵇ) whose upper end is provided with a hook 159, which is in engagement with a stud 160 at one end of a lever 161 secured to a shaft 162 fitted in the side pieces 10 and 13 of the center frame, it being noted that said shaft 162 has the arms 163 secured thereon (see Fig. 44) whose outer ends have pivoted thereto, on the rod 164, the links 165, seen in Figs. 1, 76 and 77, which are eight in number, one for each gear wheel 131, except the right hand or units wheel, and whose lowermost or free ends 166 are adapted to engage with the gear wheels 131, for a purpose hereinafter described. The links 165 are each provided with a hook 167 in which is fitted a stud 168 which projects from a link 169, one end of which is pivoted at 170 to a link 171 loosely fitted on the shaft 172 carried by the side pieces 10 and 13 of the center frame, it being understood that the links 169 and 171 are each eight in number. Each link 165 has connected therewith one end of a spring 173 whose opposite end is secured to the bar 174 or other fixed point.

The free ends of the links 169 are each provided with a projection 175, adapted to abut against the bar 174 which is supported by the side pieces 10 and 13, and is also provided with a slot 176 in which is fitted a bar 177, which projects from each of the arms 178 which are fast on the shaft 179, as will be understood from Fig. 40ª, said shaft 179 being supported in the side pieces 10 and 13 of the center frame. The links 169 are each provided with a lug 180 against which abuts the pivoted member 181, seen in Figs. 39ª, 39ᵇ and 39ᶜ, carried by its respective link 182, which latter are eight in number and are pivoted at 170 to their respective links 171, it being noted that said links 182 are each provided with a recess 183 adapted to receive, at certain times, the bar 177, as seen in Fig. 40. The shaft 179 has loosely mounted thereon the arms 184 which are nine in number and are acted upon by their respective register wheels 132.

*Intermediate mechanism for the printing apparatus.*—The gear wheels or printing idlers 127 have each secured thereto, a toothed segment 187, which meshes with its respective rack 188, mounted on a bell crank lever 189 which is loose on the shaft 190 and whose upper portion is provided with a toothed segment 191 and a segmental bar or cam 192 (see Figs. 6 and 9). The parts numbered 187, 188, 189 and 191 are nine in number, there being seven of the cams 192. Each bar or cam 192 co-acts with its respective bell crank lever 193 loosely mounted on a shaft 194 carried by the side pieces 12 and 15 of the center frame. While I have shown in Fig. 9, nine levers 193 as being employed, in practice I prefer to omit the two right hand levers and employ but seven. The upper extremities of said levers 193 are each provided with a hook 195 which, normally, engages a stud 196 on its respective type wheel bar 197, which latter are nine in number and are loosely mounted on the shaft 198 carried by the type bar frame 199 which is supported in the center frame.

The detailed construction of the levers 193 will be best understood from Figs. 9ª, 9ᵇ and 9ᶜ, wherein it will be seen that I provide each lever with a lug 193ª and 193ᵇ, on opposite sides, said lugs being out of alinement, so that when said levers are assembled on the shaft 194, the lugs appear as seen in Fig. 9ª, so that as any lever 193 is rocked backwardly on the shaft 194, it will rock with it all the levers to the right of it. It will be apparent that it is necessary for the extreme right lever seen in Fig. 9ª to be held in its forward or depressed position, whereby all the other levers are held forward, which I effect by the spring 193ᶜ. The lower arms 189 carrying the racks or segments 188 are restored, at the proper periods, to the position seen in Fig. 6, by means of the rod or sweep bar 250, which is secured in the arms 249 mounted on the shaft 190, a will be understood from Figs. 6 and 44ª. Journaled in the side pieces 12 and 15 of the center frame is a shaft 244, which has secured thereon the arms 245, which carry a locking bar 246, see Figs. 6, 9 and 43, which is adapted to engage the teeth of the printing idler 127, at certain times as shown dotted in Fig. 6, and prevents them from rotating, for a purpose hereinafter described. The shaft 244 has secured thereto, an arm 247, whose free end is in contact with a cam 248 fast on a shaft 251 journaled in the main frame of the machine, and which actuates said arm so as to rock the shaft 244 and consequently the arms 245 and cause the locking bar 246 to either enter a space between the teeth in the wheels 127, and lock them against rotation, or else be removed therefrom as indicated in full lines in Fig. 6 to permit said wheels 127 to be rotated.

*The type bars and type wheels.*—Each type bar 197 carries a type wheel 200, in whose periphery are ten recesses 201, thus producing a gear wheel adapted to mesh with its respective toothed segment 191, for a purpose hereinafter described, said type bars and type wheels being nine in number. The faces of the type wheels 200 are each provided with type numerals in the following order:—1, 2, 3, 4, 5, 6, 7, 8, 9, 0. One of said type wheels 200, viz. the second one in the series of wheels, seen in Fig. 1 and counted from right to left has each of its numerals preceded by a decimal point, thus: .1, .2, .3, 4. .5, .6, .7, .8, .9, .0 (see also Fig. 46). The type bars 197 are each provided with a pawl 202 pivoted thereto at 203 and whose end 204 is adapted to enter one of the other of the recesses 201 when required, it being noted that said pawls 202 have a projection 205 thereon, which normally abuts against a rod 206 supported in the side pieces 12 and 15 of the center frame, so as to retain said pawls 202 out of engagement with their respective type wheels when the latter are in mesh with the toothed segments 191. When the pawls 202 are removed from contact with the rod 206 they are caused to engage the type wheels 200 by the tension of their springs 207, one end of each of which is connected to its type bar 197, while its opposite end is secured to a suitable fixed point on said bar 197. The type bars are each provided with a lug 208 and a member 209 for a purpose hereinafter described. Each type bar 197 has secured thereto, one end of a spring 210 whose opposite end is fastened to a suitable fixed point as at 211 in the type bar frame 199. The member 209 of each type bar 197 is provided with a lug 212, which is in contact with its respective cam 213, secured to a shaft 214, which is journaled in the side pieces 12 and 15 of the center frame. The cams 213 are nine in number, one for each type bar.

*The type bar frame and its adjuncts.*—As it is essential that the type bar frame 199 should be readily placed in position in the center frame and be easily removed therefrom, for instance, when the type wheels are to be cleaned, or certain of the parts oiled, etc., I have constructed said frame in a manner to fully meet these requirements.

Reference being now had to Figs. 45, 47 and 48, it will be seen that the frame 199 consists of the side pieces 215 (see more particularly Fig. 47) which are connected by cross bars 216 and 217, the latter having slots 218 therein which serve as guides for the type bars 197, said bar 217 also acting as a stop to limit their upward movement, due to the pull of the springs 210. One of the side pieces 215 has a lug 219 thereon, which is adapted to be engaged by the hook 220 of a bell crank lever 221, which latter is secured to the rod 194 before mentioned, which is pivoted in the side pieces 12 and 15 of the center frame as seen in Figs. 45 and 48. The side pieces 215 support the rod 198 on which the type bars 197 are loosely mounted as before explained. Projecting from the sides 215 are studs 224, 225 and 226, which two latter have the necks 227 and 228 thereon, for a purpose hereinafter described. The frame 199 is provided with a bridge bar consisting of a cross piece 229 from which depend the two side pieces 230 which are provided with slots 231 and 232, the latter having their openings 233 at substantially a right angle to the remaining portions thereof. The side pieces 230 are each provided with a stud 234 against one of which abuts the upper end 235 of the bell crank lever 221 while the upper end of an arm 236, which is secured to the rod 194, abuts against the other stud 234 when the parts are assembled as in Fig. 45. The bell crank lever 221 and the arm 236 are connected by a rod 237 to insure their moving in unison. The lever 221 is provided with a handle 238 whereby said lever may be conveniently operated. The side pieces 12 and 15 of the center frame have slots 239 therein and inwardly projecting studs 240, which latter have the necks 241, for a purpose hereinafter described. The side pieces 230 have each connected therewith, one end of a spring 242 whose opposite end is connected to some fixed point, as at 243 in the side pieces 215. The forward end of the side pieces 215 has slots 244 therein, which are adapted to receive the necks 241 in the studs 240, while the slots 239 also engage the necks 228, as will be apparent from an inspection of Figs. 45, 47 and 48.

*Safety device for insuring proper actuation of the main shaft.*—The shaft 251 has secured thereon, a cam 252 as best seen in Figs. 70 and 71, which coacts with a pawl 253 secured to a pin 254, which has secured thereto a check pawl 255, which engages the teeth of a ratchet wheel 256 secured to the shaft 251, it being noted that motion is imparted to said ratchet wheel 256 by a link 257, which has one of its ends pivoted at 258 to said ratchet wheel, while its opposite end is pivoted at 259 to an arm 260 secured to the main shaft 125, so that motion is imparted to said parts when the arm 126 is operated. The pawl 253 is held in contact with the cam 252 by a spring 261, the cams 248, 252 and the ratchet wheel 256 being fast on the shaft 251.

*The tripping mechanism for the type wheel bars.*—The shaft 214 has loosely mounted thereon, a gear wheel 262, see Figs. 65, 67, 68, 69, 80 and 81, which meshes with a toothed segment 263 fulcrumed at 264 in the side piece 12 of the center frame. The member or depending arm 265 of said segment has pivoted thereto at 266, a link 267 whose opposite end is pivoted at 268 to an arm 269, which is secured to the main shaft 125.

The gear wheel 262 has connected therewith, a toothed disk or ratchet wheel 270, seen in detached position in Figs. 66 and 67$^a$, which is adapted to impart motion to a cam 271 secured to the shaft 214, it being noted that said cam 271 has pivoted thereto at 272, a pawl 273 which engages the tooth 274 in the disk 270, so as to be rotated thereby. The pawl 273 is held in contact with the disk 270 by a spring 275, seen in Figs. 65 and 67$^a$. The gear wheel 262, when rotated by the segment 263 turns first in one direction and when said segment is moving in the direction indicated by the arrow $a$ in Fig. 68 and this direction of the revolution of said gear wheel is indicated by the arrow $b$ in Figs. 67 and 68, it being apparent that when the disk 270 is turning in this direction, its tooth 274 moves away from the pawl 273 and imparts no motion to the shaft 214. The two opposite positions the segment 263 and the gear 262 may assume, will be understood from Figs. 80 and 81.

It will be noted that the parts seen in Fig. 67 are in a reverse direction to their corresponding parts in Figs. 65 and 68, and this is due to the fact that said Fig. 67 is assumed to be viewed from a position opposite to that from which similar parts, in Figs 65 and 68, are viewed. When, however, the segment 263 is moving in the direction indicated by the arrow $c$ in Fig. 68, the gear wheel 262 is caused to rotate in the direction indicated by the arrows $d$ in Figs. 67 and 68, whereupon it is seen that said disk 270, by reason of the engagement of its tooth 274 with the pawl 273 imparts motion to said cam 271, causing it to turn in the direction indicated by the arrows $d$ in Figs. 67, 67$^a$ and 68, and thus impart motion to the shaft 214 with which it is connected.

The shaft 214 has fast thereon nine cams 213 of the contour seen in Figs. 6 and 49, whose working faces contact with the lugs 212 of the type wheel bars 197, so that it will be apparent that as the shaft 214 is intermittently rotated in the proper direction, the type wheel bars 197 will be rocked at the proper intervals, so as to momentarily bring the type wheels up into the position seen dotted in Fig. 49.

278 and 279 designate cams loosely mounted on a stud 222, best seen in Figs. 1, 70, 70$^a$, 70$^b$, 70$^c$, 70$^d$ and 70$^f$, said cams being secured together so as to rotate in unison. The cam 278 actuates an arm 280 fast on the shaft 179, as will be understood from Fig. 40$^a$. The cam 279 operates a lever 281 fulcrumed at 282 in the side piece 13 of the center frame, it being noted that said lever 281 has pivoted thereto at 283, one end of a link 284, whose opposite end is pivoted at 285, to an arm 286 secured to the shaft 162.

The side pieces 11 and 14 have studs 287 thereon that engage slots 288 in the side pieces 12 and 15, so as to permit the frame, consisting of the sides 11 and 14 and all the parts carried thereby, such as the register wheels 132, the idlers 128 and their co-acting parts, as will be apparent from Fig. 6, to be moved relatively to the frame consisting of the sides 12 and 15, (see also Fig. 65) for a purpose hereinafter described.

The segment 263 has secured thereto a toothed segment 289 which meshes with a gear wheel 290 secured to the shaft 190 so as to rotate the latter.

Pivoted at 295 on the side piece 11 is a toothed segment 296, which meshes with a gear wheel 297, secured to the register wheel shaft 142 at the front of the machine, so as to rotate the latter. The segment 296 has pivoted thereto at 298 a bar 299 whose free end is provided with a recess 300, adapted to engage, at certain times, a stud 301 on the member 265 of the segment 263, it being noted that said bar 299 is supported by the member 302 of a lever 303 which is fulcrumed at 304 in the side piece 12 and has pivoted thereto, at 305, a link 306, whose opposite end is pivoted at 307 to a lever 308, which is pivoted at 309 to one of the guide bars 93 and is provided with a member 310, from which projects a stud 311 which is engaged by a hook 312 in the upper portion of a link 313, which is pivoted at 314 to a lever 315 fulcrumed on the main shaft 125 and provided with a recess 316, which engages a stud 317 that projects from the lever 318 fulcrumed at 319 and provided with a button or finger piece 320, whereby said lever 318 and its adjuncts may be readily operated when it is desired to add the same set of figures a plurality of times without resetting the pins, as will be explained.

The levers 315 and 318 have each, one end of a spring 321 connected thereto, which holds said levers in either of the two positions into which they may be placed, it being evident that said spring 321 yields when said levers are changing positions, so as to hold the finger piece 320 always in an elevated or depressed position. One of the levers, or arms 124 (see Fig. 1) is provided with an arm 322 from which projects a stud 323 with which engages, at certain times, a hook 324 on the forward end of a link 325 pivoted at 326 to the link 267, as seen in Figs. 68, 68ᵇ and 80; it being noted that the stud 311 is in contact with the underside of said link 325 and is adapted to throw the back 324 out of engagement with the stud 323 when desired.

Loosely mounted on the main shaft 125 is a bell crank lever 326ᵃ which consists of the members 327 and 328 (see Figs. 10, 68 and 83) the former of which has secured thereto, as at 329, the rod 330 whose opposite end is secured at 331, to the member 332 of a bell crank lever 553 fulcrumed at 333, in the frame of the machine (see Fig. 10) and whose remaining member 334 has a pawl 325 pivoted at 336 thereon (see Fig. 106) and provided with a shoulder 337 adapted to engage a stud 338 carried by the lever 339, also fulcrumed at 333, it being noted that said lever 339 has one end of a link 340 pivoted thereto, while the opposite end of said link is pivoted to the lever 72. The pawl 335 has secured thereto a pin 554 which has attached thereto one end of a spring 341, whose opposite end is secured, as at 342, to a fixed point in the lever 334, for a purpose hereinafter described, it being noted that the forward end of the lever 334, as likewise a portion of the pawl 335 abut against the stationary stud 343, which acts as a stop to limit the movement of said bar and pawl at a certain period of their travel. The lever 334 has pivoted thereto one end of a link 344, whose opposite end has connected therewith one end of a spring 345, whose opposite end is fastened to some fixed point, as at 346, in the frame of the machine.

The member 328 of the bell crank lever 326ᵃ has pivoted thereto, at 347, a link 348 with a projection 349 which at times is engaged by a stud 350 on the lever 269, the opposite end of said link 348 being provided with a slot 351 through which passes a stud 352 carried by the link 313 for a purpose hereinafter described. (See Fig. 82.) The link 348 has secured thereto one end of a spring 353 whose opposite end is secured to the member 328 of the bell crank lever 326ᵃ.

Fulcrumed as at 333 is a lever 354, which has connected therewith at 355, one end of a spring 356, whose opposite end is secured to a fixed point 357 on the frame of the machine. The opposite end of the lever 354 has pivoted thereto, at 358, one end of a link 359 whose opposite end is pivoted thereto, at 360, to the end piece 46 of the pin carriage.

Fulcrumed at 333 is a bell crank lever 361 whose member 362 has connected therewith one end of a rod 363, whose opposite end is connected to a rock arm 364, secured to the shaft 365, journaled in the frame of the machine and provided with a crank handle 366, it being noted that said shaft 365 has a spring 367 thereon and which is adapted to return said shaft 365 and its adjuncts to their normal positions after the handle 366 has been brought into action for a purpose hereinafter described.

The member 368 of the lever 361 is provided with a finger 369 adapted to be brought in contact at times with the levers 339 and 354, when it is desired to return the pin carriage to its normal position, as when the operator has inadvertently struck a wrong key.

In Figs. 76, 77, 78 and 79, I have shown another form of mechanism for returning the pin carriage, which will be hereinafter described.

*The key locking device.*—The arm 260 (see Figs. 72, 73 and 74) has a stud 370 thereon, which engages the hook 371 in a link 372, which is pivoted at 373 to a lever 374 secured to a shaft 375, which is journaled in hangers 376 that depend from the strip 3, said shaft 375 having fingers 377 which are adapted to be brought, at certain times, in the path of the pins 378, that project from the stems 21, so as to lock said stems in their normal positions during the forward and backward throw of the arm 260 and prevent the depression of the keys 20 until said lever, the main shaft 125 and the lever 126, are in their extreme rearward or normal positions. The shaft 375 is provided with a spring 379 adapted to turn the shaft 375 and the fingers 377 thereon to position, to lock the keys and prevent their depression, as indicated in Fig. 74, said shaft turning in the direction indicated by the arrow in Fig. 73, so as to oscillate said fingers 377 and move them from their normal positions into their operative ones. The normal position of one of said fingers 377 is illustrated in Fig. 73, while its position, when a key is locked, is seen in Fig. 74.

*The cushioning device for the main shaft and its adjuncts.*—Pivoted in the frame of the machine, at 380, is a cylinder 381, having a port 381ˣ in the end thereof, in which cylinder is fitted a plunger 382 whose rod 383 is pivoted at 384 to an arm 385, which is secured to the main shaft 125, said parts constituting a dash pot or cushioning device adapted to prevent jarring of the machine when the main operating lever 126 is released prior to its return movement, after having been turned in the direction indicated by the arrow *n* in Fig. 33. It will be evident that I may employ a liquid as the cushioning medium instead of air and that the cylinder 381 may stand in a vertical or inclined position without departing from the spirit of my invention.

*Paper feeding mechanism.*—The shaft 214 has secured thereon a cam 276 which actuates a lever 277 fulcrumed at 194, see more particularly Figs. 6 and 49, in the side pieces 12 of the center frame. It will be noted on referring to Figs. 49 and 49ᵃ that the upper portion of the lever 277 is forked at 386, so as to engage the rod 560, which is joined by the bars 387 to the shaft 388, so as to rock said rod 560 and consequently the shaft 388, as seen in Fig. 49ᵃ and impart motion to an arm 389, which in its turn and by reason of its pivotal connection, at 390, with a dog 391, causes the latter to impart an intermittent rotary motion to the ratchet wheel 392 with the teeth of which it engages. The ratchet wheel 392 is secured to the platen 397, which is fast on a shaft 393, whose ends are journaled in the end bars 394, which latter with the front and the rear bars 395 constitute a carriage or frame, which is supported in the carriage or frame 396, seen in Figs. 56 and 57.

*Means for operating and locking the carriage that supports the platen, and its adjuncts, in its operative position.*—Projecting from each of the end bars 394 is a stud 398, which has its bearing in its respective slot 399 in the bridge bars 400 secured to the bars 401 and 402, of the carriage or frame 396, it being noted that both slots 399 have each an opening 403 therein to permit the insertion of these studs 398 into said slots. The bridge bars 400 are each provided with a link 404, it being noted that one end of each of said links is pivoted at 405 in said bridge bars, while their opposite ends are loosely fitted on the shaft 393, as best seen in Fig. 55. Pivoted at 406 in one of the end bars 394 is a bell crank lever 407 in whose lower end is a hook 408 adapted to engage a stud 409 that projects from one of the bridge bars 400, as best seen in Fig. 49. The opposite end of said lever 407 has a handle 410 thereon. The end bar 394, on which is pivoted the lever 407, has a stud 411 projecting therefrom and located below the pivotal point 406 and serves as a stop to limit the throw of said lever.

*The adjustment of the paper feed.*—The dog 391 is provided, at its forward end, with a laterally projecting member 412, which is in contact with the periphery 413 of a shield 414, which is loosely fitted on the shaft 393 and has the inclined face 415 thereon to permit the point 416 of said dog to engage the teeth in the ratchet wheel 392. The shield 414 has pivoted thereto at 417, a sleeve 418, the free end of which is fitted on a pin 419 that projects from the front bar 395. The pin 419 has lateral projections 420, which pass through the slots 421 in the sleeve 418, and serve as an abutment for the forward end of the spring 422 which encircles said sleeve, it being noted that the opposite end of said spring abuts against a shoulder 423. The shield 414 has a handle 424 thereon, whereby said shield may be readily operated, it being understood that in practice I provide a suitable stop or stops for limiting the movement of said shield. I have omitted these stops from the drawings, for the sake of clearness of illustration, as their function and manner of application will be apparent to those skilled in the art, the object being to cause the dog 412 to engage each tooth or every other tooth in succession.

The dog 391 has a projecting member 425 thereon which acts as a stop to limit the upward movement of said dog, when the platen 397 is placed in the position seen in Fig. 55, it being noted that said projection 425 then abuts against the arm 389. The dog 391 has one end of a spring 426 connected thereto, while its opposite end is connected to the arm 389, it being apparent that said spring retains the projecting member 412 of the dog 391 in contact with the periphery of the shield 414 and at certain times causes the point 416 of said dog to engage a tooth in the ratchet wheel 392.

Loosely fitted on a shaft 427 is a check pawl 428, which has a roller 429 journaled therein, and which engages the teeth in the ratchet wheel 392, so as to prevent improper rotation of the latter, as seen in Fig. 49. The check pawl 428 is held in contact with the ratchet wheel 392 by a spring 430, one end of which is secured to said pawl, while its opposite end is secured to some convenient fixed point in one of the end bars 394. The shaft 427 has rigidly secured thereon the arms 431, which have journaled therein the feed rollers 432 which bear against the paper 433, on which the calculations are recorded, by reason of the tension of the spring 433ᵃ and hold the same in contact with the platen 397, as seen in Figs. 3 and 4. Pivoted to the two outer arms 431 is a clamping strip 434 whose outer edge is adapted to bear against the paper 433 to retain it in position against the platen.

The clamping strip 434 is provided with the members 435 whose free ends are adapted to rest upon any suitable support or abutment as, for instance, the shafts 436 of the outer rollers 432 as seen in Figs. 3, 4, 5 and 49.

Secured to the front bar 395 are springs 437 whose free ends bear against the underside of the clamping strip 434 and retain it normally against the paper 433. The shaft 427 has secured thereto a lever or handle 439, whereby said shaft and the arms 431 thereon may be rocked, for a purpose hereinafter described. Supported by the bridge bars 400 is a shield 440 over which the paper 433 may be passed before reaching the platen 397, it being noted that a guide roller 441, for the paper 433, is journaled on the underside of said shield 440. The bar 395 has secured thereto a plate 459ˣ provided with a serrated upper edge 460ˣ, which serves as a cutter for the paper 433. The shaft 393 is provided with knobs 461, whereby the platen 397 may be rotated by hand, as desired.

*Means for locating the platen carriage in various positions and also for locking the same therein.*—The bars 401 and 402 of the frame or carriage 396 (see more particularly Figs. 3 and 56) are each provided with a groove 443, which, when said carriage 396 is in position in the machine, are in alinement with the grooves 18 and 19, as seen in Fig. 65 and together form an inclosed space in which are fitted the blocks 444 (as seen in Fig. 3) which project partly into the grooves 18 and 19 and partly into the grooves 443, it being noted that said bars 401 and 402 are provided with the pins 445, while the bars 16 and 17 are both provided with pins 446, as best seen in Fig. 49. Fulcrumed at 447, in the bar 402, is a lever 448 which has pivoted thereto, at 449, a link 450 from which depends a stud 451, which is guided in a slot 452 in a strip 453 secured to the bar 402. The lever 448 is retained normally in the position seen in Figs. 3 and 56, by a spring 454, one end of which bears against a stud 455 on the lever 448 while its opposite end bears against a stud 456 on the bar 402. The lever 448 is provided with a ring 457 which serves as handle or finger-piece, whereby said lever may be readily operated. The bar 16 has recesses 458 therein which are adapted to receive the stud 451, for a purpose hereinafter described.

*The ribbon mechanism.*—Fulcrumed at 459, (see more particularly Fig. 65) in the side piece 12 is a bell crank lever 460 whose member 461 is in contact with the cam 271, while its other member 462 is provided with slots 463 through which are passed the studs 464 that are secured in a link 465, which has pivoted thereto at 466 one end of an arm 467 whose opposite end is secured to a shaft 468 journaled in the hangers 469 that depend from the ribbon frame, which latter is fitted in the frame 1 so as to be capable of sliding therein, and in the present instance the connection between the main frame and the ribbon frame 470 consists in providing the latter with slots 471, through which are passed the screws or bolts 472 that are screwed into the main frame, it being noted that the heads of said screws or bolts 472 support the ribbon frame 470 in position in the main frame.

Secured to the shaft 468 are arms 473 and 503 whose outer ends have pivoted thereto, dogs 474 and 502, which are adapted to engage, at certain times, with the teeth 475 in the ratchet wheel 476, or with the teeth 501 of the ratchet wheel 500 (see Figs. 58 and 59). The wheel 476 is secured to the shaft 477 that carries the ribbon spool 478, as best seen in Fig. 65. The shaft 477 has loosely fitted thereon a shield 479 (see also Fig. 58) that is adapted, at certain times, to be brought in the path of the dog 474, so as to prevent the latter from coming in contact with the teeth 475. The shield 479 has pivoted thereto, at 480, one end of a link 481, whose opposite end is pivoted at 482, to a shield 483 that is loosely fitted on the shaft 484 of a ribbon spool 485 journaled in the ribbon frame 470.

The link 481 has secured thereto one end of a spring 487 whose opposite end is secured to some fixed point as at 488 in the ribbon frame 470, it being noted that when the several parts are in the positions seen in Fig. 58, the spring 487 exerts a pull on the link 481 in the direction indicated by the arrow $a$, and for a purpose hereinafter described.

The ratchet wheel 476 has pivoted thereon at 489 an arm 490, provided with a hook 491 and a bar 492, it being noted that said ratchet wheel 476 has an opening 493 therein through which the bar 492 may be passed. The bar 492 is adapted to fit in a recess 494 in the spool 476, as best seen in Figs. 62 and 65.

The spool 476 has a flattened portion 486 thereon, see Fig. 62, upon which is placed one end 495 of the inking ribbon 496, after which a strip 497 is placed upon said end 495 and secured in position on the spool 476 by screws or their equivalents.

The inking ribbon 496 is provided preferably with two colors of ink, viz: red, as indicated at 498, and black or other suitable color, as indicated at 499 (see Figs. 63, 65, 80 and 81) whereby the printing may be done in two colors, one of which may be applied to individual items and the other, as the red, to the totals or sub totals.

Secured to the shaft 484 is a ratchet wheel 500 with whose teeth 501 is adapted to engage, at certain times, the dog 502 that is pivoted in an arm 503 fast on the shaft 468. The ratchet wheel 500 has pivoted thereon, at 504, an arm 505, provided with a hook 506 and a bar 507 (see also Fig. 60) it being noted that said ratchet wheel 500 has an opening 508 therein through which may be passed the bar 507. The ribbon spool is provided with a recess 509, (see more particularly Fig. 63) adapted to receive the bar 507 carried by the arm 505. The spool 485 has a flattened portion 510 thereon upon which is placed the end portion 511 of the ribbon 496, said end portion 511 being held in position on the spool 485 by a bar 512, secured in any suitable manner to said spool 485. It will be apparent from the foregoing that the manner of attaching the ribbon to each spool is substantially the same and I have provided convenient means for securing and detaching the ribbon from its support.

*Totaling mechanism.*—Referring now to Figs. 1, 65, 75, 80 and 81, 513 designates a shaft rotatably mounted in the depending bearings 514 which are suitably supported from the frame work of the machine, said shaft having projecting forwardly therefrom the operating lever 515, which is provided with the finger or thumb piece 516, said lever being integral with or fast upon said shaft so that said lever and shaft will rock or be actuated in unison.

At or near the extremities of the shaft 513 are secured the upwardly extending rock arms 516 (see Fig. 75) which are in the present instance bifurcated or forked at their extremities 517, each of which are adapted to receive one end of the links 518 which are pivotally connected thereto, the opposite extremity of each of said links being provided with a hook 519, as seen in Fig. 65 and also in Figs. 80 and 81, said hook being adapted to drop over and engage the pin 520, it being apparent that said pin or stud 520 is carried by the depending member 469 of the inking ribbon frame 470, so that when the parts are in their normal position they will appear substantially as seen in Fig. 65 but upon a depression of the lever 515 the inking ribbon frame will be moved forwardly into the position seen in Figs. 80 and 81.

521 designates rock arms which are integral with or fast on the shaft 513, said rock arms having pivoted thereto one end of the forwardly extending links 522, the forward end of which is provided with a hook 523 which is adapted to drop over and engage the pin 524, as will be understood from Fig. 65. The pin 524 is mounted upon the member 525 of the elbow lever 526, seen dotted in Fig. 65, which is fulcrumed upon the pin 527, the other member 528 of said elbow lever being recessed at 529 so as to engage the stationary pin or stud 530, shown dotted in said Fig. 65. (See also Fig. 81). It will be understood that there are two of the links 528 and two pins 530, whereby the proper movement of the accumulator and the ribbon mechanism is assured.

531 designates a spring which I have located in the present instance at the right hand extremity of the shaft 513 (see Fig. 75) said spring having one extremity secured to the adjacent arm 516 and the other extremity secured to a suitable fixed point on the bearing 514, as indicated at 532, whereby, by reason of the tension of the spring, the ribbon mechanism will normally be retained in its extreme rearmost position and the frame containing the registering wheels and their adjuncts or the accumulator mechanism will be normally retained in their extreme forward position.

At the left hand portions of Figs. 1 and 10, I have shown one form of mechanism for actuating the bell crank 361, which carries the pin 369, the rod 363 and the handle 365 and its adjuncts, but in lieu thereof I may employ the bar 534, which I term the "error bar", the latter terminating in the eye or finger piece 535, which is located, in the present instance, at the left hand front of the machine, the opposite end of said error bar being pivoted at 536 to the bell crank 361, seen at the upper left hand portion of Fig. 10. Either the device seen at the left of Fig. 10 or the construction seen in Figs. 76, 77, 78 and 79 may be employed, but I prefer in some instances, the device seen in Figs. 76, 77, 78 and 79, since only a forward pull upon the bar 534 is necessary to impart the proper movement to the bell crank 361 and the pin 369 carried thereby.

*The operation of the machine.*—In the detailed description of my novel machine, I have described the instrumentalities employed in substantially the sequence in which the various parts operate or are thrown into operation and in the detailed description of the operation, I shall employ as far as possible, the same method of description, referring in order to the key board and key operated mechanism, the pin carriage and pins, the pin mechanisms and their adjuncts, the escapement device for the pin carriage, the adding racks and their adjuncts, the adding or registering wheels, the carrying device, the type bars and the type wheels, the type bar frame and its adjuncts, the key locking device, the cushioning device for the main shaft, the paper feeding mechanism, the means for operating and locking the carriage that supports the platen, the adjustment of the paper feed, the means for locating and locking the platen carriage and its various positions, the ribbon mechanism and the operation of the totaling, repeating and other mechanisms. Assuming that it is desired to add the numbers 305.20 and 64.80 and that all the parts of the machine are in their initial or normal position, the operator depresses the key numbered "3" and simultaneously actuates the arm 23 and the shaft 24 connected thereto. By the oscillation of the appropriate shaft 24, the arm 25 carried thereby is rocked and a pull exerted on the link 26 connected therewith, whereby the bell crank 28 is rocked, the latter being loose on the shaft 31. The pins 59 are now all in their normal position in the pin carriage, as indicated in Figs. 9 and 14. By the pull on the link 26, the bell crank 28 is rocked and the arm 29 and its terminal are raised from the position indicated in Fig. 14, to the position seen in Figs. 15 and 22. As the pin under consideration was elevated, the shoulder 63 passed upwardly over the contiguous pawl 64, the latter being carried by the arms 65, mounted on their journals 66, as indicated in Figs. 26 and 27, and through the medium of the springs 67, the pawl 64 is caused to assume the position seen in Fig. 15, where it is in engagement with the shoulder 62 and the pin is thus retained for the desired period in elevated position, the stop 60 on the pin preventing the latter from improper upward movement, as will be understood from Figs. 18 and 22, it being understood that the elevated or set up pin in said Fig. 62 corresponds to the pin actuated by the "3" key. Simultaneously with the elevation of the terminal 30, the arm 27 is rocked into engagement with the rod 92, as will be understood from Figs. 9, 13, 14 and 22, and since said rod is rigidly mounted on the setting lever shaft 31, through the arms 91 fast thereon, it will be apparent that each time an arm 27 is rocked, a simultaneous movement will be imparted to said rod 92 and shaft 31.

Referring now to Figs. 29 and 30, it will be understood that before the "3" key was depressed, the parts appeared as shown in said Fig. 29, the lug 89 on the pawl 77 being out of engagement with the rack teeth 68, while the lug 88 on the pawl 82 is in engagement with said teeth, said pawls, levers and their adjuncts appearing as seen in Fig. 29. By the depression of the "3" key and the actuation of the intermediate parts 23, 24, 25, 26, 27, 92 and 91, the shaft 31 and its adjuncts are rocked from the position seen in Fig. 29 to the position seen in Fig. 30, wherein the lug 89 is shown as being in engagement with the contiguous rack teeth, while the lug 88 has been moved out of engagement therewith. The stops 86 and 87 prevent any improper movement of the lugs, pawls and their adjuncts, since they limit the movement of the lever 84, as is evident.

It will be understood from the foregoing that the No. "3" key is still depressed. On the removal of the operator's finger therefrom, the tension of the spring 34 on the arm 27, pulls the latter from the position seen in Fig. 15 to the position seen in Fig. 14 and by reason of the connections from said arm 27 to the key 20, the latter is raised again into normal position, any improper movement of the key shaft in an upward direction being prevented by the contact of the pin 378 with the underside of the transverse strip 3. The setting lever shaft, its arms 91 and the rod 92 are restored to normal position simultaneously with the elevation of the key, through the tension of the spring 38 acting on the arm 37 fast to said shaft 31, as will be understood from Figs. 9 and 13, said spring 38 being omitted from Fig. 1 for the sake of clearness of illustration. Simultaneously with the upward movement of the key shaft 21 and key 20, as above described, the lug 89, seen in Figs. 29, 30 and 32 is moved from the position seen in Fig. 30, whereupon the pin carriage 44 moves one notch toward the left through the medium of the tension of the spring 356 acting on the lever 354, whereby a pull is imparted to the link 359, which is attached to the pin carriage at 360, as will be understood from Fig. 10.

It will be understood that the lug 88 springs into engagement with its co-acting tooth at about the period that the lug 89 is disengaged from its contiguous tooth. It will be understood from the foregoing that before beginning to operate the machine, the pin carriage and its pins are at the extreme right hand of the machine, as indicated in Figs. 9 and 10, and the extreme left hand row of pins, seen in Fig. 10 is directly over the terminals 30, seen in Fig. 13, said terminals extending in a line which I term the "setting line," which line is one tooth of the rack 68 to the right of the units adding rack, hereafter referred to, as seen in Fig. 10. After each step by step movement of the pin carriage to the left, it will be apparent that a row of pins is always in vertical alinement over the terminals 30, seen in Fig. 13.

The "3" key having been depressed and restored to its initial position, as explained, the operator now in setting up the numbers 305.20 strikes the zero key, which in the present instance is shown at the extreme right of Fig. 13, although it is apparent that the same may occupy other positions if desired.

The depression of the "0" key rocks its arm 23 and shaft 24, seen at the extreme right of Figs. 10, 13 and 20. By the rocking of the shaft the arm 39 is rocked to the left and the link 40 also moves to the left of the position seen in Fig. 20, moving with it the arm 43 by reason of the pin and slot connection therewith, whereby the setting lever shaft 3 is also directly actuated to the desired extent, sufficient to permit the step by step movement of the pin carriage, as already explained in connection with Figs. 29, 30 and 32. It will be observed that the depression of the "0" key does not set up any pin but merely permits the movement of the pin carriage, a distance equal to one tooth 66 to the left. The operator now strikes the "5" key, then the "2", then the "0" key, whereupon the operations heretofore described, with respect to the pin carriage and pins, take place, as is evident. It will be further apparent that in setting up the number 305.20, the pin carriage has moved a distance equal to five teeth 68, to the left of the position seen in Fig. 10 and that the pins indicated in solid black in said figure are now set up, no pins having been set up by the depression of the "0" key, as already explained.

*The operation of the main shaft and its adjuncts.*—I have heretofore described in detail the operations which result or follow from the depressions and elevations of the keys, said various operations insuring the elevating of the pins and the temporary retention for the desired period, of the pins and pin carriage in the proper relation to their co-acting parts, now to be referred to. Passing now to another set of coöperating mechanism and having reference particularly to Figs. 6, 22, 33, 34 and 35, there will be seen a series of elements which are actuated at the proper intervals by the rocking of the main shaft 125 by the main lever 126.

The first operation in sequence which follows the rocking of the main shaft 125 is the forward movement of the adding rack carriage which will now be particularly described.

Referring more particularly to Figs. 10, 76 and 77, it will be apparent that when the arm 126 is pulled toward the operator, the main shaft 125 is rocked in unison therewith and at the same time the rock arm 269, which is fast on the main shaft is rocked, in the present instance toward the operator, thereby pulling the link 267 forwardly and the link 325 attached thereto. The forward end of the link 325 can at times engage with the pin or stud 323, attached to the arm 322, see Fig. 80, the latter and the left hand arm 124 being attached to the sleeve 537 which is loose on the main shaft 125 and carries at its right hand end another arm 124, which is fast to said sleeve and projects upwardly in line with said first mentioned arm 124 for connection with the rack carriage.

*The operation of the adding racks.*—Through the medium of the links 122 which connect each of the arms 124 with the rack carriage, as will be understood from Figs. 10, 33 and 77, it will be clear that the rack carriage is moved forwardly at the same time the handle 126 is pulled toward the operator. When the link 325 is in engagement with its pin 323, as seen in Fig. 10, it being apparent that if said link 325 is raised or disengaged from its pin 323 (as is necessary in taking totals, as will be hereinafter explained) the rack carriage will remain stationary when the main shaft is rocked, since said main shaft is loose within said sleeve 537. The rack carriage is guided in its reciprocations in a simple and efficient manner by the rods 101, which pass through the holes 100 and the engagement of the slotted lugs 102 with the ways 93, as will be apparent from Fig. 33. As the rack carriage 94 moves forward, it carries with it the series of adding racks 108, seen in Fig. 35¹, it being understood that when the rack carriage begins its forward movement, all of said adding racks are in their lowest position and out of engagement with the printing and accumulator idlers 127 and 128, as indicated in Fig. 6.

Referring now to Fig. 22, it will be seen that one of the pins 57 is set up, or elevated, it being remembered that this is the pin actuated by the "3" key as already explained. The rack carriage 94 being still in the act of being drawn forwardly toward the operator, it will be apparent that the contact of the lug 111 carried by the pawl 110 with the pin 57 (which is the pin set up by the "3" key, seen in Fig. 22) will cause the forward movement of the pawl to stop until said pawl and the rack attached thereto have been raised to the position seen in Fig. 22, wherein the teeth of the appropriate adding rack are seen in mesh with the corresponding idlers 127 and 128, it being understood that while the adding racks were arrested in their forward movement, they are raised by the rack carriage 94 continuing its forward movement, said rack remaining in its elevated position until the carriage 94 reaches the forward limit of its travel. The adding rack or racks which have been raised, are retained in their elevated position and in mesh with the idlers 127 and 128, partly by the tension of the spring 121 and partly by the friction between the teeth of the rack and idlers, occasioned by the backward pull of said idlers on their corresponding rack. As the adding rack 108 rises, it carries with it the plate 119 attached thereto, it being apparent that the series of plates 119 are directly under the terminals 154 of the depending bars 152, said bars being shown in their lowermost position in Fig. 6 and one of said bars being shown in its elevated position in Fig. 34, such elevation being caused by the contact of the plate 119 therewith, which was raised in unison with its rack 108. Before the raising of the rack 108 and its plate 119, the pawl 151, seen in Figs. 6, 6ª and 6ᵇ was in engagement with the contiguous tooth of the accumulator idler 128, as seen in Fig. 6, but upon the raising of the bar 152, which is caused by the raising of the rack 108 and its plate 119, it will be seen that the pawl 151 connected with said bar 152 also raises into the position seen at the upper central portion of Fig. 34. It will be apparent that the adding rack carriage 94 must in each instance travel a certain determinate distance and that the racks therein after being raised travel a certain distance according to whichever pin has been set up into their path. For example, in Fig. 22 I have shown the pin 57 actuated by the depression of the "3" key as being up, in which case the co-acting adding rack travels a space after being raised, equal to three rack teeth or as I term it, equal to three points. The pawl 151 having been disengaged from the idler 128, seen in Fig. 6, by the elevation of the rack and plate 119, it will be seen that the continued forward movement of the rack carriage and the elevated rack will cause rotation of the idlers 127 and 128 and the latter will rotate the gear 131 and its register wheel 132 from left to right, in the direction of the arrow, as seen in Fig. 6 and in the direction indicated by the arrows, in Figs. 38 and 39. It will be understood that each of the register wheels 132 has a gear 131 attached thereto, so as to rotate in unison therewith, as will be understood from Figs. 1 and 77, so that whichever gear 131 is being rotated by its idler 128, will rotate the proper register wheel 132.

The foregoing comprises the explanation of the forward movement of the rack carriage, the lifting of an adding rack 108 and its plate 119, the unlocking of the pawl 151, which permits the rotation of the idlers 127 and 128, which are loose on their shafts and the operation of the gears 131 and the register wheels 132.

*The operation of rotating the printing wheels into position to print.*—Referring now to Fig. 6, it will be understood that the segment 187 is secured to the idler 127 so as to rotate in unison therewith. The rotation of the idler 127, which is effected after its rack is raised and advanced, as already explained, will therefore cause a partial rotation of the segment 187, which meshes with its rack 188, which is on the end of the bell crank lever 189, fulcrumed loosely on the shaft 190, wherefrom it will be seen that the rocking of the bell crank lever will cause the proper movement to be imparted to the toothed segment 191, whereby the appropriate type wheel will be rotated into the proper position to print the digit desired. As the segment 191 moves to the right of the position seen in Fig. 6, the bell crank lever or pawl 193 is rocked, since it is loose on the shaft 194, thereby moving the hook 195 to the left of the pin 196. The pawls 193 are preferably seven in number and the upright portion of each below its hook is provided with two offset lugs, the lugs of each contiguous pawl contacting with each other, as seen in Fig. 9ª, whereby all the hooks 195 are held in their normal or forward position through the medium of the spring 193°, which has one end attached to the shaft 194, while the other end bears against the outer lug of the extreme right hand pawl 193, as seen in Fig. 9ª. It will consequently be seen from the foregoing, assuming that the operator is facing the machine, that the rearward movement of any pawl 193 will move rearwardly in unison with it, all the pawls to the right thereof.

It will be apparent from the upper left hand portion of Fig. 6, that the type bar 197 is held in its normal position by two things, to wit:—the engagement of the hook 195 with its pin 196 and second by the contact of the lug 212 with the contiguous face of the cam 213, it being understood that the two right hand type bars 197 are preferably not provided with pawls 193 nor hooks 195 or pins 196, although said pawls, hooks or pins may be used, as I have shown in Fig. 9. The segment 191 may now be supposed to be at the right of the position seen in Fig. 6, and the hook 195 disengaged from its pin 196 on the bars which are to be used in printing the numbers desired, but the type bar 197 is still locked in the position shown by the cam 213 contacting with the lug 212. It will be understood that prior to the downward movement of the segment 188 seen in Fig. 6, as has been explained, the sweep bar 250, which joins the arms 249, which are two in number and are fast to the shaft 190, has been rocked downwardly or to the left of the position shown in Fig. 6 by the gear 290 and the segment 289 (see Fig. 68) which will be referred to in greater detail (see Fig. 44ª). It will be apparent that the segment 289 is secured to the arms 265 and 590, which are loosely mounted on the stud 264, as will be seen in Fig. 68. It will be understood that the printing and accumulator idlers 127 and 128 have rotated to a certain determinate point during the forward movement of the rack carriage and the elevated rack or racks, during which period the cam 248, seen in Figs. 6, 70 and 71, has rotated toward the operator from the position seen in Fig. 6, so as to bring the face 543 up to the point now occupied by the end of the arm 247, which latter can then drop or move to the left of the position seen in Fig. 6, said arm being fast on the shaft 244, as are also the arms 245, wherefrom it will be apparent that said latter arms and the lock bar 246 will be pulled downwardly from the position seen in full lines to the position seen dotted in Fig. 6, said downward movement being effected by the spring 545, as seen in Fig. 77. It will be apparent that the cam face 543 reaches the end of the arm 247 to permit the same to drop at substantially the same time the rack carriage and its racks reach their extreme forward position, so that the printing idlers 127 are locked by the engagement of the bar 246 therewith.

During the forward movement of the link 267, best seen in Figs. 68, 80 and 81, to which I have already referred, the arm 265 is pulled toward the operator carrying with it the segment 289, which moves in unison therewith and being in mesh with the pinion 290, which is fast on the shaft 190, it will be apparent that said shaft, arms 249 fast thereon and the sweep bar 250 will rock downwardly or to the left of the position seen in Fig. 6. When the sweep bar 250 is rocked into the position seen in Fig. 6, it actuates the lower arms 189 which are nine in number, so that they assume the initial position seen in Fig. 6, the rod 547 acting as a stop.

Referring again to Fig. 68, it will be apparent that during the forward movement of the link 267 just referred to, the segment 263 is moving to the left of the position seen in Fig. 68 and in the direction of the arrow *a* into the position seen in Fig. 81, thereby actuating the pinion 262 which is loose on the shaft 214, in the direction indicated by the arrow *b* in Fig. 68. When the operator starts to pull the lever 126 forwardly, the pawl 273 is in the position seen in Figs. 65 and 67ª, and the pinion 262 and the disk 270 loose on the shaft 214 and secured to said pinion 262 make one complete revolution, during the entire forward movement of the lever 126, so that the parts just described are now in the position seen in Figs. 65 and 67ª.

*Safety device for main operating lever.*—It will be apparent that the cam 248 is operated by the arm 260, which is fast on the main shaft 125, and has the link 257 connected thereto, the rear end of said link being connected to and operating the ratchet wheel 256, which is fast on the shaft 251 on which the cam 248 is also fast. The shaft 251 also has fast thereon, the cam 252, against which bears the arm 253, said cam having the inclined face 546 against which the end of the arm 253 is bearing, as seen in Fig. 70. As the operator imparts the initial forward pull to the main operating lever 126, said arm imparts, by reason of the tension of the spring 261, a slight forward rotation to the cam 252, by reason of the push against the cam face 546, which carries the cam 252, the ratchet wheel 256 and their adjuncts over the dead center, which would otherwise exist, it being understood that the cam face 548 performs a function similar to 546 when the operating lever 126 is in its extreme forward position. It will be apparent that the function of the ratchet wheel 256 and the pawl 255 is to prevent any improper backward rotation of the shaft 251 on any backward movement of the link 257 and arm 260, until the main operating lever 126 and the main shaft 125 and their adjuncts have completed their full forward movement toward the operator.

*The operation of the key locking mechanism.*—Referring now to Figs. 72 and 74 and remembering that certain keys have been depressed and then raised to their normal positions, by the mechanism already described, it will be apparent that provision must be made for preventing the operator from inadvertently depressing any of the keys during the period that the operating lever 126 and the main shaft 125 are being turned toward the operator. It will be further understood that in practice, the operator frequently lets go of the handle of the lever 126, at the period when he thinks it has assumed its extreme forward position and relies solely upon the tension of certain springs or of their equivalents to pull the operating lever 126 and the main shaft 125 to their initial or extreme rearward position. By my present invention, by the provision of the ratchet mechanism last described and its adjuncts, seen in Figs. 70 and 71, it will be clear that the lever 126 cannot spring or be moved rearwardly until it has completed its extreme forward movement and further provision has been made for rendering the mechanism absolutely positive under all conditions through the medium of the key locking devices now to be described.

Each one of the key stems 21, as has already been explained, is provided with pins 378, which project a short distance forward of the key stems and serve a double function, one being to act as a stop to prevent the key stems from improper upward movement and the other function being in conjunction with the shaft 375 and the fingers 377, to insure the locking keys, when the lever 126 is in the act of making its extreme forward movement. As the lever 126 is drawn toward the operator, it will be apparent that the arm 260, as has already been explained, will also move toward the operator, since the same is fast on the shaft 125, as will be seen from Fig. 73, whereupon the link 372 and the lever 374 will be moved in the direction of the arrow, seen in Fig. 73, thus permitting the shaft 375 to turn by reason of the tension of the spring 379, best seen in Fig. 72. The effect of the tension of the spring 379, after the arm 260 starts to move in the direction indicated by the arrow in Fig. 73, will be to cause the fingers 377 to turn into the position seen in Fig. 74, whereupon the contiguous extremity of the pin 378 of each key stem 21 will be retained between the upper extremity of the fingers 377 and the bottom of the transverse strip 3, as indicated in Fig. 74, the parts remaining in the position seen in said figure until the main lever 126 and the arm 260 have fully completed their forward stroke and have assumed their extreme rearward position, thereupon the pin or stud 370 will engage the link 372 and thus by the intermediate connections turn the fingers 377 and their adjuncts into the position seen in Fig. 73 again. The proper keys can now be depressed, as is evident.

In addition to the foregoing mechanism for locking the keys, I provide an additional safeguard which indicates when the operator has struck the keys to the full capacity of the machine, as will be understood from Figs. 31 and 32. As has heretofore been explained, the pin carriage moves one notch to the left of its initial position, each time a key is depressed, and has been explained with reference to Figs. 29 to 31. When however, the pin carriage reaches its extreme left hand position the tail piece 69 assumes the relative position indicated in Fig. 31 and if a key more than the capacity of the machine is struck, the parts will assume the position seen in Fig. 31, whereupon the lug 89 of the lever 77 will contact with the underside of said tail piece and no movement of the pin carriage or its adjuncts will occur. The operator will further be notified that the maximum capacity of the machine has been reached, since it will be impossible to depress, to any extent, any one of the key stems, as will be evident from Fig. 31, and by following out the mechanisms operated by the key setting shaft 31, which have already been explained in detail.

During the forward movement of the main operating lever 126, it will be understood that the parts at the extreme upper left hand of Fig. 10 are shown as in their normal or initial positions, but as the lever 126 moves forward, the arm 327, which is fast on the main shaft 125, will move forwardly, thereby exerting a pull on the link 330, which is shown as broken in Fig. 10 and having the forward end attached to the said arm 327 and its rear end attached to the member 332 of the bell crank lever which is loosely mounted on the shaft 333, whose other member 334 has pivoted thereon at 336, a pawl 335, seen also in Figs. 10$^a$ and 10$^b$, it being understood that the foregoing parts 334 and 335 are moved from the left of the position seen in the upper left hand portion of Fig. 10 against the tension of the spring 345 which has one end attached to the member 344 and its other end attached to a suitable fixed point as 346, said spring 345 being broken away in Fig. 10 for the sake of clearness of illustration, but being shown in the lower right hand portion of Fig. 77.

*The operation during the return movement of the main lever 126 and the main shaft 125.*—The foregoing description has referred particularly to the movement of the various elements which occur during, or are occasioned by the forward movement of the main lever 126, as the operator pulls it toward him and all operations and the sequence in which they occur during the return movement of the main operating lever will now be described, reference being had first to the operation of the adding racks which are best seen in Figs. 6, 22 and 34, it being understood that the return movement of the main lever 126 and the main shaft 125 is caused by the tension of the spring 549, which has one end attached to a suitable fixed point as 550 and its other end attached to the extremity of the arm 551, which is fast on the main shaft 125, as will be understood from Fig. 76.

When the rack carriage is in its extreme forward position, a rack or racks is in engagement with the printing and accumulator idlers 127 and 128, as indicated in Fig. 22, it being remembered that said idlers are locked by the locking bar 246. As the rack carriage begins its rearward movement, which occurs as soon as the operator lets go of the main lever 126, the adding rack or racks which are elevated drop from the position seen in Fig. 22 to the position seen in Fig. 6 where they are out of mesh with the idlers 127 and 128, the falling of said adding rack or racks being occasioned by reason of the pivotal supporting of each of said racks upon the rods 105 and 106, as will be understood from Figs. 6, 35 and 35$^a$, said racks being prevented from any rearward movement while in elevated position, by their engagement with the locked idlers 127. When the rearward movement of the rack carriage and the racks begins, it will be understood that the parts 151 and 152 are in the positions seen in Figs. 6 and 6$^a$.

Referring now to Figs. 68 and 80, it will be understood that the rack 263 is at the left of the position seen therein or in the position seen in Fig. 81, and as the operator lets go of the lever 126, said rack begins to move toward the operator or in the direction of the arrow $c$ seen in Fig. 68. The movement of the rack 263 in the direction of the arrow $c$ causes the pinion 262 and the disk 270 (see Fig. 67$^a$) to move in the direction of the arrow $d$. The cam 271 being fast on the shaft 214, it will be seen that as the disk 270 and the gear 262 rotate in the direction of the arrow $d$, the engagement of the pawl 273 with the shoulder or tooth 274 will cause said pawl and cam 271, to which it is attached, to also rotate in the direction of the arrow $d$ seen in Figs. 68 and 67$^a$ and the shaft 214 will also rotate temporarily in the same direction.

Referring now to the upper left hand portion of Fig. 6 and remembering that the shaft 214 is now being caused to rotate in the direction of the arrow seen in said Fig. 6, it will be seen that the cams 213, which are nine in number (see also Fig. 69) and are fast on the shaft 214, will also rotate so that the shoulder 552 of the cam 213 under consideration will leave the lug 212, whereupon the tension of the spring 210 will rock the type bar 197 on the shaft 198 and the type wheel 200 will rise toward the ribbon 496, it being remembered that the hook or catch 195 is disengaged from the pin 196, as previously explained, of such type bars from whose wheels it is desired to print. During about half the return stroke of the lever 126, the locking bar 246 is in the position seen dotted in Fig. 6 so that no movement of the parts 127, 189 and 191 can take place.

Still referring to the upper left hand portion of Fig. 6 and remembering that the desired type wheels 200 have been set by the segment 191, so that the desired digit is uppermost or juxtaposed to the ribbon 496, it will be apparent that as the desired type bar 197 rocks on its shaft 198, so as to move its type wheel 200 toward the ribbon, provision must be made for automatically locking the said wheels 200, so as to prevent the same from improper rotation. This can be done in various ways, but I prefer to employ the mechanism seen in Fig. 6, wherein the pawl 202 is shown as provided with a projection or shoulder 205 which is in contact with the rod 206, when the parts are in the position seen in Fig. 6. As soon, however, as the desired type wheel is rocked toward the ribbon, it will be apparent that the pawl 202 will simultaneously move upwardly and the instant the shoulder 205 leaves the rod 206, the tension of the spring 207 will cause the end or nose 204 of the pawl 202 to snap into the contiguous recess 201, thereby locking the desired type wheel or wheels in the position in which they are set, by the segment 191 during their upward movement and during the act of printing. As the main operating lever 126 continues its backward movement, already referred to, it will be apparent that by reason of the pawl and ratchet mechanism seen in Figs. 65, 67 and 67$^a$, the shaft 214 is still rotating in the same direction, that is, toward the operator and the cams 213 are also rotating in the same direction, so that before the main lever 126 reaches its initial or normal rearward position, the parts assume the position seen in Fig. 6 again, whereupon the type wheels 200 are brought into mesh with the segments 191 and the pawls 202 are unlocked from the type wheels 200, leaving the latter free to be rotated in the proper position at the proper periods. It will be apparent that the type wheels 200 must be depressed into their lowermost position, seen in Fig. 6, at a short period before the unlocking bar 246 moves from the position seen dotted in Fig. 6 into the position seen in full lines therein.

During the period that the locking bar 246 is engaged with the printing idlers 127, as indicated in dotted lines in Fig. 6, it will be understood that the sweep bar 250 is located at a considerable distance to the left of the position seen in Fig. 6 and that the racks 188 may have been moved downwardly from the position seen in said figure.

During the time that the handle 126 of the lever on the main shaft 125 has been brought to its forward position, the sweep bar 250 on the arms 249 will be moved to a rearward position, about twice the amount of the throw of the lower arm 189, in bringing the type wheels 200 in position to point 9. This would of course be the greatest movement that said racks would be required to make. As the bar 250 is again brought toward the position shown in Fig. 6, it will move about one-half the distance above mentioned, before it strikes a lower arm 189, thereby allowing time enough for the type wheel 200 to get in mesh with the rack 191 and the bar 246 on the arm 245 to be raised and unlock the printing idler 127.

*The operation of returning the pin carriage to its right hand or normal position.*—As I have already explained, each time a key is depressed the pin carriage moves one point or step to the left of the position seen in Fig. 10, and in the operation of setting up the number 305.20, it will be understood that the pin carriage will have moved five points to the left of the position seen in Fig. 10 and the forward ends of the levers 339 and 354, seen in Figs. 10 and 10$^b$ and 10$^d$ have also moved to the left of the position seen in Fig. 10, and in the direction of the arrow $m$, said pin carriage having been moved to the left by the tension of the spring 356 upon the lever 354. During the forward movement of the lever 126, the arm 332 of the bell crank lever 553 (see Fig. 10$^b$) is rocked or pulled toward the operator, by the pull on the link 330, so that the arm 334 and the pawl 335 are in the left of the position seen in Fig. 10, to a distance slightly greater than the levers 339 and 354 would move, in traveling to the left, a distance equal to nine steps or points.

During the left hand movement of the member 334 and the pawl 335, the latter is held in proper position by the tension of the spring 341, best seen in Figs. 10$^b$ and 68. The pin 554 depends in the present instance from the pawl 335 and has a double function, one being to serve as an attaching point for the spring 341, and its other function being to serve as a stop to limit the movement of the pawl 335 by its contact with the shoulder 555, as will be apparent from Fig. 10$^b$, it being understood that when the pawl 335 and member 334 are moved to the left of the position seen in Fig. 10, the pin 554 is in contact with the shoulder 555. After the handle 126 begins its movement rearward or away from the operator, the tension of the spring 345 exerts a pull upon the link 344, thereby rocking the arm 334 of the bell crank lever 553.

The lever 339 has a stud 338 projecting downwardly therefrom, as seen in Figs. 68 and 10$^a$, and as the member 334 moves toward the position seen in Fig. 10, the shoulder 337 engages said stud 338, as seen in Fig. 10$^a$, whereby the lever 339 is moved toward the right of the machine, carrying with it the link 340, lever 72 and the pin carriage.

Referring now to Figs. 10, 27 and 28, it will be seen that the end of the lever 72 is pivoted at 73 in a lug attached to the end piece 46 of the pin carriage 44, said lever terminating in the hook 556, which engages the slot 557, as seen in Figs. 27 and 28. Before the pin carriage and its adjuncts commence to move toward the right, into the position shown in Fig. 10, it will be apparent that the lever 72 has been rocked on its fulcrum 73, so as to exert a pull on the unlocking bar 70, seen in Figs. 27 and 28, in the direction of the arrow $a$ till said unlocking bar reaches the limit of its travel. As the unlocking bar 70 moves to the left of the position seen in Fig. 27, the members 71 pull the pawls 64 to the left of the position seen in Figs. 14 and 27, so that said pawls appear as seen in Fig. 16 and out of engagement with the shoulders 62 of the pins 57, whereupon the pins fall into their initial position seen in Fig. 14, this downward movement of said pins being occasioned by gravity or their own weight, in the present instance, although it will be apparent that I may employ springs for accelerating said downward movement of said pins, if desired. It will be apparent that the movement of the unlocking bar 70 to the left of the position seen in Fig. 27 may be arrested or determined either by the contact of the extreme left hand pawl 64, seen in Fig. 27, coming in contact with the inner face of the end piece 46 or the lever 72 may be caused to abut at the proper period upon a suitable stop or lug (not shown) carried in the end piece 46. As the pin carriage is drawn into its initial or right hand position by the tension of the spring 345 on the arm 334, as has been explained, the link 359 and its lever 354 are also drawn toward the position seen in Fig. 10. It will be understood that it is necessary for the pin carriage to move slightly beyond its extreme right hand or initial position, so as to enable the lug 88 to pass over the extreme left hand tooth 68, after which the carriage can spring into the position seen in Figs. 10 and 29.

Referring again to the pawl 335, which I have described as being in the act of moving toward the right into its initial position seen in Fig. 10, and carrying with it the lever 339, by reason of its engagement with the stud 338, it will be seen that as said pawl nears its extreme right hand position, its extremity will hit the pin 343, as seen in Figs. 10, whereupon the pawl 335 will rock into substantially the position seen in said Figs. 10 and 10$^b$. As soon as the pawl 335 is rocked into the position seen in Fig. 10 (and 10$^a$ in dotted lines) the pin carriage would be pulled to the left of the position seen in Fig. 10 by the spring 356, if it were not for the action of the lug 88 snapping into the position seen in Fig. 29, as has already been explained.

*The operation of the means for restoring the pin carriage to initial position in case a wrong key has been depressed.*—In case the operator inadvertently depresses the wrong key or keys, it will be understood that a certain pin or pins will be set up in the pin carriage and that if the operation of registering and printing were to be completed in the manner heretofore described, by pulling the main lever 126 toward the operator, an error would result. It will be apparent, however, that this error caused by setting up a wrong pin or pins can be readily corrected while the main lever 126 is in its extreme rearward position, provided means are present for restoring the pin carriage and pins to their extreme right hand position, prior to any actuation of the main lever. This can be effected in various ways, as it is evident that any mechanism, which will move the lever 339 and its adjuncts toward the right, will do this and in the present instance I have devised two simple forms of mechanism which will effectually do this and which are best seen in Figs. 10, 68, 76, 77, 78 and 79.

Referring first to Fig. 10, it will be seen that any pull exerted upon the rod 363 will cause the arm 368 and pin 369 thereon to move to the right of the position seen in Fig. 10 and thereby co-act with the levers 70 339 and 354, thereby moving said levers and pin carriage and the connecting mechanism to the right into the position seen in Fig. 10. It is essential when a moving key has been depressed, and it is desired to move the pin carriage, from its left hand position toward the right or into the position seen in Fig. 10, that the unlocking bar 70 be first actuated which I effect by so locating the levers 339 and 354, that the lever 339 is slightly to the left of the lever 354, so that the first act of the pin 369 will be to actuate the levers 339 and 72, so that the pawls 64 will be unlocked before the pin 343 strikes the lever 354.

In Fig. 10 I have shown the means for exerting a pull on the rod 363 as comprising the handle 364, which on being turned toward the operator will impart the necessary pull to the rod 363. In the alternative construction seen in Figs. 76, 77, 78 and 79, I have shown in lieu of the rod 363 a bar 534, which I term the "error" bar and which has its inner or rearmost end pivotally connected to the arm 362, wherefrom it will be apparent that the operator can readily insert his finger in the eye 535 and draw the bar 534 toward him thereby imparting the necessary actuation to the pin 369.

It will be apparent that in place of the devices shown, I may employ other equivalent means without departing from the spirit of my invention.

*The operation of the paper feeding mechanism.*—During the movement of the main lever 126 rearwardly or away from the operator, it will be remembered that the shaft 214 has been caused to make one complete revolution in the direction indicated by the arrow $a$ seen in the lower right hand portion of Fig. 49. The cam 276 being fast on this shaft 214 rotates in unison therewith and it will be apparent that when the thick part 558 has revolved against the nose 559 of the lever 277, the latter will be rocked to the left of the position seen in Fig. 49 and will actuate the lower rod 560 and the upper rod 388, as will be understood from Figs. 49 and 49$^a$. The oscillation of the shaft 388 and the arm 389 will cause the necessary intermittent rotation to be imparted to the ratchet wheel 392 by the pawl 391. The shield 414 can be set so as to permit the point 416 to engage one or two teeth as desired, during its forward movement and can be locked in the desired position by any suitable means, as will be familiar to those skilled in the art. As shown in Fig. 51, it will be apparent that the device is set for one tooth to be engaged by the point 416 and in Fig. 50 for two teeth to be so engaged, during one rearward movement of the main lever 126.

*The ink ribbon feeding mechanism.*—Referring now to Figs. 58, 59 and 65, it will be seen from the latter figure that as the cam 271 (see also Fig. 67) which is fast on the shaft 214 rotates with the latter, a rocking movement is imparted to the lever 461, which through the medium of the intermediate connections imparts a rocking movement to the shaft 468, whereby the pawls 474 and 502 will be rocked and when the parts are in the position seen in Fig. 58, the pawl 474 will intermittently engage the teeth 475, while the pawl 502 will slide freely on the shield 483, in which case the ribbon is being wound from the spool seen at the right of Fig. 58, upon the spool at the left of said figure.

*The mechanism for automatically reversing the ribbon feed.*—It will be seen from Figs. 61, 62 and 64, that the bar 492 rests against a flattened spot on the spool 478, while the bar 507 rests against a similar spot on the opposite side spool 485, as seen also in Figs. 63 and 64, the length of said bar being apparent from Fig. 59. Each bar is provided with an arm 490 and 505 respectively and said bars are inserted in position through the slots 493 and 508 and are held in position by the ribbon 496, being wound around them. When one of the spools, as 485, is unwound or nearly unwound, the bar 507 will move to the right of the position seen in Figs. 58 and 64, since it is unsupported by the ribbon being unwound therefrom and the arm 505 will also move on its pivot 504 by reason of its own weight, so that the hook 506 will hang in the position seen in Fig. 61ª and since the ratchet wheel 500 is turning in the direction of the arrow $a$ (Fig. 58) it will be apparent that the hook 506 will hit the inner end of the pin 482, as seen in Fig. 61ª, thereby shifting the link 481 and its adjuncts to the right of the position seen in Fig. 58, so that said link and spring 487 will appear as seen dotted in said figure and the shield 483 will now appear as seen at the right of Fig. 9, whereupon the pawl 502 is now operative and the pawl 474 will be inoperative, because the shield 479 will have been moved to the right of the position seen in Fig. 58. I have omitted the arm 505 from the upper right hand portion of Fig. 9, for the sake of clearness of illustration.

*The operation of adding and carrying.*—In the present organization, I have provided carrying devices arranged so that when a register wheel stands at 9, its carrying device is locked in front of the one to the right, so as to be operated thereby, in case the latter has been moved to or past the 0 position, so as to carry into the next column. For instance, in adding 64.80 to 305.20, after the adding racks had moved the proper register wheels, they would indicate 369.00 and the carrying devices must move them to indicate 370.00, which would be done at one operation, by reason of the foregoing arrangement of mechanisms, whose detailed operation will now be described.

It will be understood from the foregoing that the operator has struck the keys indicating the assumed figures 305.20 and has registered and printed the same by pulling the main lever 126 forward and then permitting it to return to its rearmost or initial position, as I have described in detail. In order to add to this number 305.20, the assumed number 64.80, the operator next depresses the keys so numbered and pulls the lever 126 toward him and releases it, whereupon the various operations hereinbefore described in detail, during the registering and printing of the number 305.20 take place and the number 64.80 is now registered and printed on the slip of paper heretofore referred to, below the number 305.20, as is evident. During the rearward movement of the lever 126, as last described, the adding device has operated and the carrying device also has operated in the manner now to be described.

Referring to Figs. 6 and 36 to 41ª, the carrying mechanism comprising the principal parts is best seen therein. In the present instance, the machine is being set to carry during the forward movement of the main lever 126, during which movement the following movements of said carrying mechanism take place. The various register wheels 132 and their gears 131 attached thereto may be turned into various positions during the forward movement of the lever 126, it being understood that the position of the register wheels 132 indicates the amount which has been added or recorded. It will be understood that the register wheels are each provided with a rim or flange 561 having two sets of numerals arranged thus 0, 1, 2, 3, 4, 5, 6, 7, 8, 9, 0, 1, 2, 3, 4, 5, 6, 7, 8, 9, as explained, it being understood that each semicircumference is provided with the series 0, 1, 2, 3, 4, 5, 6, 7, 8, 9, the 0 points being located on the flange 561, so that a 0 point is readily visible to the operator at the front of the machine, when the register wheels are in their 0 or normal position. In the present instance, I have shown one 0 point, as in Fig. 41ª, as being located slightly to the right of the top cam 133, on one semicircumference of the flange 561, it being understood that the other 0 point is located slightly to the left of the lower cam 133, seen in Fig. 41ª, but is omitted therefrom for the sake of clearness of illustration.

In Figs. 6 and 7 I have shown approximately the position which each register wheel assumes when at "7" position, with reference to the slot 563 of the casing 562, which may inclose the front of the machine, it being apparent that the operator can thus readily see the position each register wheel is in at all times. It will be understood that the free ends or terminals 564 of the arms 184 are deflected at a right angle thereto and ride on the peripheral edges 565 of the register wheels 132, at all times, so that a terminal 564 will be raised whenever either of the cams 133 contact therewith, whereby each terminal is caused to contact with the underside of its link 182 and raise the same at the proper periods. In Fig. 6 I have shown the register wheel and its cams in the position it would assume to indicate "7" as stated.

In Fig. 39, I have shown the register wheel 132 as having been rotated from the position seen in Fig. 6, so that the terminal 564 is in the act of being raised by the contiguous cam 133 and the register wheel is passing from "8" to "9" position. The terminal 564 is now in the act of raising the link 182, which latter carries with it the member or latch 181 pivoted thereto, as stated. The link 182 has pivoted thereto at 566, the latch or member 181, which has the stop 567 projecting from its lower portion and contacting normally with the under side of the link 182 (see Fig. 39ª) the latter and the latch 181 being held in proper position relative to each other by the spring 569 and said latch having the working face 568 adapted to co-act with the contiguous pin 180 of the right hand of adjacent link 169, as I have shown in Fig. 39.

Referring now to Fig. 36, it will be seen that the register wheel therein has advanced or turned from the position seen in Fig. 39 to the "9" position and that in Fig. 40, said register wheel has still further advanced from said "9" position into the "0" position. During the travel of the register wheel 132 from the "9" position to the "0" position, the terminal 564 has ridden over the highest position of the cam 133 and has raised the link 182, so that the recess 183 is in engagement with the bar 177, as indicated in Fig. 40, said terminal 564 after riding over the cam 133, dropping by its own weight into the position seen in Fig. 40, as is evident. The links 169 and 182 are arranged in pairs, as seen in Fig. 41 and are loosely or independently pivoted at 170 to the depending link or hanger 171, which is pivotally supported from the point 172. The links 165 depend loosely from their pivotal supports 164 in the arms 163, which are fast to the shaft 162. (See Figs. 1, 44, 76 and 77). Each of the links 169 is provided with a stud 168, which is always in engagement with the hook 167 in the lower end of the links 165. (See Figs. 36 and 37.) The tension of the springs 173 always tends to pull the links 165, the studs 168, the links 169, the lower end of the links 171 and the links 182 toward the stop or bar 174 (see Figs. 36 and 6) any improper movement being prevented by the shoulder 175 contacting with said bar, as seen in Fig. 36. It being now apparent that the tension of the spring 173 will hold the parts 165, 171, 170 and 169 in the position seen in Figs. 6 and 36, it will be seen that as the cam 133 turns from the position seen in Fig. 36 into the position seen in Fig. 40, the loose link 182 will be raised from the position seen in Fig. 36 to the position seen in Fig. 40, whereupon the face 570 will ride to one side of the bar 177 and the latter will snap into the position seen in Fig. 40. While the link 182 is moving into the position seen in Fig. 40, the bar 177 is stationary but the spring 173 yields a little, so as to permit the parts to assume the position seen in Fig. 40, as is evident.

Referring now to Fig. 38, it will be seen that as the link 182 is raised from the position seen therein, to the position seen in Figs. 39 and 40, the pivotal piece or latch 181 also raises, until it assumes the position seen in Fig. 39, it being understood that after certain combinations have been registered and the carrying is being effected, the pin 180 is over the latch 181, in which case said latch 181 yields downwardly until the pin 180 has assumed the position seen in Fig. 39.

Referring now to Figs. 33, 35ª and 70, it will be seen that the rack 103 is attached to the rack carriage 94 and moves in unison therewith, according to the oscillations of the main lever 126. When the lever 126 is pulled toward the operator, the rack 103 engages the pinion 104, which revolves idly during the forward movement (toward the operator) of the rack carriage. The parts are so arranged as will be apparent from Figs. 70ª to 70ᵇ, that as shown, as the main lever 126 begins its rearward movement, the dog 571 will engage the shoulder 572 of the disk 573 which is loose on the stud 222. The dog 571 is pivoted in the recess 574 of the cam 278, it being understood that the pivot 547 of the dog 571 is secured to the cam 279, the recess 574 extending clear through said cam 278, the latter being secured to the cam 279 by any suitable means. It will be apparent that the cams 278 and 279 may be made integral or in one piece, but I prefer in practice to make them separate and unite them so that they revolve in unison or as one piece. The disk 573 is fast to the gear 104, so that said gear and disk turn loose on the stud 222, as do also the cams 278 and 279.

When the parts just described are in assembled position, as seen in Figs. 70, 70ª and 70ᵈ, it will be apparent that as stated, during the forward movement of the rack carriage, rack 103 and main lever 126, the gear 104 will revolve idly, but when the operator releases the lever 126 and the same is pulled to its rearmost or initial position, the direction of movement of the rack 103 and direction of rotation of the gear 104 will be reversed and said gear and disk 573 rotating in unison in the direction of the arrow seen in Fig. 70ª, the shoulder 572 will engage the end of the dog 571, which is held in proper position by the spring 575, whereupon the cams 278 and 279, which carry the dog 271, will rotate in unison and in the same direction as said gear and disk, the above parts now rotating in the direction of the arrow a in Fig. 70ª. It will be apparent that gear 104 is so proportioned that during the forward movement of the rack 103, the rack carriage, the operating lever and its adjuncts, said gear will, in the present instance, make one complete revolution and during the period that said rack 103, rack carriage and lever 126 move to their rear or initial position, said gear 104 will make one complete revolution in the reverse direction.

Referring now to Figs. 70 and 77, it will be seen that the outside cam 279 actuates the lever 281 at the proper intervals, whereby the link 284 is pulled downwardly, as the lever 126 begins its rearward movement, whereby the rock arm 286 is pulled downwardly and the shaft 162 makes a slight oscillation, thereby depressing the rod 164, (as will be seen in Fig. 44) whereupon the links 165 will move downwardly into the position seen in Fig. 37. The end of the lever 281 is held in proper contact with the cam 279 by the tension of the spring 576, seen in Figs. 6, 6ª and 6ᵇ, the same having one end attached to the link 158 and its other end secured to a fixed point as 577. The tension of the springs 173 also assists to hold the end of the lever 281 against its cam. It will thus be seen that as the lever 126 begins its rearward movement, the terminals 166 of the links 165 assume the position seen in Fig. 37 and are in mesh with the appropriate teeth of the gears 131, it being understood that all the links 165, which in the present instance are eight in number, are caused to move into the position seen in Fig. 37, as the lever 126 begins its rearward movement. It will be apparent that according to the capacity of the machine, the links 165 and their co-acting gears 131, can be increased or diminished, according to requirements, but it is apparent that the right hand or unit gear 131 does not require a co-acting link 165, since there will be nothing to carry into the units column.

Referring now to Figs. 6, 6ª, 6ᵇ and 44ᵇ, it will be seen from the latter figure that the shaft 145 has on one end thereof, the lever 146 and on the other end, the arm 578, the upper end of said arm and lever being joined by the bar or rod 147, said shaft and bar extending across the machine and said shaft having its ends journaled in suitable bearings, the arm 579 of the said lever 146 having the lower end of the link 158 pivoted thereto at 157, as best seen in Figs. 6ª, 6ᵇ and 44ᵇ. The lever 146 is actuated by the devices, one being by the depression of the totaling lever 516, which causes the shaft 130 and its adjuncts to move rearwardly toward the shaft 129 or from the position seen in Fig. 6ª to the position seen in Fig. 6ᵇ, whereupon it will appear that as the forward or sliding portion of the center frame, composed of the parts 10 and 14 and their adjuncts, move inwardly or away from the operator, the shafts 130 and 145 move to the left of the position seen in Fig. 6ª, and the contact of the bar 147 with the members 156 of the pawls 151, which are loose upon the shaft 145, will rock said pawls from the position seen in Fig. 6ª into the position seen in Fig. 6ᵇ. The second means for operating the lever 146 comprises the downward pull on the link 284 (see Fig. 70) which operates the parts 286, 162, 163, 161 and 158, whereby the lever 146 is rocked from the position seen in Fig. 6ª to the position seen in Fig. 6ᵇ, the pawls 151 becoming disengaged from the accumulator idlers 128, as already explained.

Referring now to Figs. 40ª, 70 and 77, it will be seen, as the cam 278 rotates, it will actuate the arm 280 bearing thereon, said arm being fast to the shaft 179, whereby the latter and the arms 178 and bar 177 rock in unison, the co-action of said bar 177 and the links 182 having already been explained, in connection with Figs. 36 and 40. It will here be understood that when the parts, seen in Fig. 37, are in the position there shown, the parts seen in Fig. 40, may appear as shown therein and the lever 126 is making its rearward movement, whereupon the rocking of the arm 280 causes the bar 177 to rock toward the operator and the terminal 166 being as shown in Fig. 37, the gear 131 will be rotated a distance of one tooth.

Referring now to Figs. 36, 40, 40ª and 40ᵇ, it will be seen that the bar 177 is provided with a series of guide grooves 579, in which the ends of the links 182 are guided, while the ends of the links 169 are guided in the grooves 580, as will be understood from Fig. 40ᵇ. Any of the register wheels which have rotated from the "9" to "0" position have raised the link 182 into the position seen in Fig. 40, as already explained. When the bar 177 is engaging the recess 183, as seen in Fig. 40, and the latch 181 of the adjacent carrying device to the left (assuming the operator is in the front of the machine) is in contact with the pin 180 as seen in Fig. 39, the machine may be assumed to be in the act of carrying, because the bar 177 is being drawn forward, thereby moving the link 182 toward the operator and by reason of the connection 170 with its link 169, the latter will be moved forward and with it its stud 168 and link 165. Through the pin 180 coming in contact with the latch 181 of the adjacent carrying device to the left, the latter will also be made to carry, providing its corresponding register wheel is in the "9" position, thereby raising the link 182 into the position shown in Fig. 36. If a register wheel has not rotated far enough to bring a cam 133 into contact with its terminal 564, it is evident that the link 182 has not been raised, but will appear as seen in Fig. 38, whereupon the bar 177 will slide idly in the slot 176 of the link 169, as will be apparent from Figs. 6 and 36.

It will be seen from the foregoing, having reference to Figs. 36, 37 and 70, that the movements of the parts are so timed that the part 284 descends, 177 moves forward, then 284 raises, then 177 moves backwardly and during its backward movement it jumps slightly to the left of the position seen in Figs. 36 and 40, thereby permitting the links 182, which may be temporarily in the position shown in Fig. 40 to drop. As the cam 278 completes its revolution, it brings the bar 177 forward into the position seen in Figs. 36 and 40. The links 165 are normally retained in the position seen in Fig. 36 by the springs 576, as best seen in Figs. 6$^a$ and 6$^b$, as explained, assisted by the spring 173.

*The operation of the totaling mechanism.—* In the foregoing detailed description of the operation of the machine, it has been assumed that the operator has depressed the keys numbered 305.20, has pulled the main lever 126 toward him and released it and has then depressed the keys numbered 64.80 and has again drawn the main lever 126 forwardly and released it. The adding and carrying operations having been fully described in detail, it is apparent that the next step is the operation of the totaling mechanism which will now be described. The totaling is effected by the operator depressing the totaling lever 515, by placing his thumb or finger on the finger piece 516, whereupon the ribbon mechanism is simultaneously moved forward toward the operator by the rocking of the shaft 513 (see Figs. 65, 75, 80 and 81), the forward movement of the rock arm 516 and the forward movement of the link 518, which latter imparts a pull on the stud 520, thereby move forwardly or toward the operator, the hanger 469 and the parts 470, which carry the ribbon mechanism and its adjuncts, the parts now appearing as seen in Figs. 80 and 81.

The ribbon carriage normally appears in the position seen in Fig. 65, wherein the black part of the ribbon 499 does the printing while registering the number to be added, but it will be apparent that when the ribbon carriage and ribbon 496 are moved to their forward position or toward the operator, as above described, by depressing the totaling lever, the red part 498 of the ribbon will be in the path of the type wheels, so that the totals will be indicated in red. It will be apparent that the ribbon need not be black and red, but that any contrasting colors may be employed.

The center frame composed of the parts 10, 11, 13 and 14 and their adjuncts are locked in their extreme forward position by engagement of the free end 529 of the catch 528 with the pin 530, as will be understood from Figs. 65 and 81.

As the lever 515 is depressed and the shaft 513 rocked, a pull will be exerted upon the arms 521 (see Figs. 65 and 75), the links 522 and the pins 524, whereupon the catch 528 will rock from the position seen in Fig. 65 to the position seen in Fig. 81, thereby being disengaged from the pin 530, as explained, and the pin 581 will prevent any improper movement of the catch 528. As soon as the catch 528 strikes the pin 581, a further depression of the lever 515, through the intermediate mechanism, will cause the portion of the center frame composed of the parts 10, 11, 13 and 14, within which are contained the registering wheels, the carrying mechanism and their adjuncts, to move rearwardly or away from the operator. The continued rearward movement of these parts will cause the lever 308 (which is pivoted at 582, to a lug on the plate 11) to rock on its fulcrum 309, (see Fig. 80) it being understood that the fulcrum 309 consists of a pin dropped in a slot in the stationary member 93, whereby said fulcrum is prevented from forward or backward movement. The rearward movement of the side 11 of the center frame will cause the lever 308 to rock in the direction of the arrow, seen in Fig. 68$^b$, by reason of its connection at 582, (see Fig. 80) whereupon the pin 311 will raise the hook 324, so that the latter will be moved to the position seen dotted in Fig. 68$^b$ and also to the position seen in full lines in Fig. 80. Simultaneously with the above movements, the link 306 will be moved rearwardly and will turn the lever 303 on its axis 304, from the position seen in Fig. 68 to the position seen in Fig. 80, whereby the lifter or terminal 302 will be rocked and the link 299 will drop by gravity into the position seen in Fig. 80, said link 299 being now in engagement with the pin 301. Simultaneously with the rearward movement of the above parts, the link 583, best seen in Figs. 68$^e$ and 81, is moved rearwardly or away from the operator, thereby rocking the bell crank lever 584 on its fulcrum 585, whereby the arm 586 on said lever is rocked from the position seen in Fig. 68$^e$, upwardly into the position seen in Fig. 80, so that its terminal 587 is now above the upper edge of the cam 589, the latter being carried on the arm 590 of the segment 268 and moving in unison therewith. The operator now pulls the main lever 126 toward him and releases the totaling lever 515, which temporarily remains down or in the position seen in Figs. 80 and 81. The forward movement of the lever 126, through the medium of the intermediate connections, imparts a pull on the lever 267, thereby pulling the arm 265 toward the operator and moving the segment 263 in the direction of the arrow a seen in Fig. 68, so that the parts now appear as seen in Fig. 81, lever 126 not having quite reached its extreme forward position.

The parts, during the movement of the lever 126 toward the operator, now assuming the position seen in Fig. 81, it will be seen that the engagement of the terminal 587 with the cam 589, prevents the arm 586 from dropping from the position seen in Fig. 81, until said cam 589 has moved sufficiently to the left of the position seen in Fig. 81 to permit said terminal to drop below said cam, which is effected when the lever 126 reaches its extreme forward position, whereupon the link 583 is permitted to move toward the operator carrying with it, the movable portion of the center frame already referred to, the forward movement of the movable portion of the center frame to which I have just referred, being effected by the tension of the spring 331 acting on the shaft 513 and its adjuncts, as will be understood from Fig. 75, as has already been explained.

It will be understood that when the handle 126 commences to be pulled toward the operator, the lower end of the lever 265 is also pulled toward the operator carrying with it the pin 301, which is in contact with the end of the lever 299, whereupon it will be seen that the contact of the pin 301 with the contiguous end of the lever 299 will cause the same to move toward the operator and simultaneously rock the segment 296 upon its axis 295, thereby imparting rotation to the pinion 297 which is mounted on the shaft 142, it being of course understood that said shaft 142 serves as a bearing for the register wheels 132, which are loose thereon, the parts now appearing as seen in Fig. 81.

Referring now to Figs. 6 and 42, it will be seen that the sweep bar 137 is movably mounted on the arms 141, which are fast on the shaft 142, it being further apparent that any actuation of the sweep bar 142 by the pinion 297 will be imparted to said sweep bar and its adjuncts. The extremities 185 of the sweep bar, seen in Fig. 42, are normally in the recess 186 of the frames 11 and 14, as will be understood from Figs. 6 and 79. When the pinion 297 is actuated in the manner described, it will be apparent that the sweep bar will be rotated from the initial position seen in Fig. 6 to the position seen in Fig. 7, the commencement of the movement of said sweep bar being indicated in said Fig. 7. When the terminals 135, seen in Figs. 6 and 42, are in their normal position, as indicated in Fig. 6, it will be apparent that said terminals are sufficiently near the center of the registering wheels, so as to permit the lug 134 on each of said wheels, to revolve without contacting with any of said terminals 135. When, however, the sweep bar is actuated in the manner already described, the lugs 135 are moved toward the outer periphery of the registering wheels, so that as said sweep bar travels in the manner indicated in Fig. 7, said terminals 135 will engage a lug 134 of each register wheel in whatever position the latter may assume and will turn said register wheels to zero position, as shown in the act of doing, in Figs. 7 and 81.

It will be seen that the ends 185 of the sweep bar 137 extend over the front curved edges of the frames 11 and 14 (see Fig. 81) and that said sweep bar is guided in its travel by the contact of said ends 185 with said peripheries, it being apparent that the forward edge of the recess 186 is curved or inclined sufficiently, so as to permit said ends 185 to readily ride out of said recesses 186, when the sweep bar begins its initial movement. It will further be obvious from the foregoing, that the sweep bar 137 is at rest in the position indicated in Figs. 6 and 68 during the operation of setting up, registering and printing the numbers to be added and that its function is through the medium of the engagement of the terminals 135 with the lugs 134 to turn the register wheels into zero position from whatever position they may be in, which can only be accomplished after the depression of the totaling lever 515 and during the forward movement of the main lever 126.

It will be obvious that the sweep bar will, in every instance, travel sufficiently from its lowest position to its extreme or highest position sufficiently far to bring all the register wheels to zero, and after the main lever 126 has completed its forward stroke and the terminal 587 has moved forwardly from its position in Fig. 81, off of the cam 589, the sweep bar is returned to its initial position, seen in Figs. 6 and 68, through the medium of the spring 591.

*The operation of printing the total.*—When the totaling lever 515 is depressed, as already explained, the accumulator idlers 128 move rearwardly or away from the operator and mesh with the printing idlers 127, as will be understood from Fig. 6ᵇ. Simultaneously with the movement of the idlers 128 and their adjuncts, to the left of the position seen in Fig. 6ᵃ into the position seen in Fig. 6ᵇ, the shaft 145 will be moved to the left and with it the bar 147, whereby the pawls 151 will be raised from the position seen in Fig. 6ᵃ into the position seen in Fig. 6ᵇ and the idlers 128 and 127 are free to rotate.

It will be apparent from the foregoing, that the idlers 127 and 128 are now in mesh and capable of free rotation and that the gears 131 and the register wheels 132 are rotatable in unison therewith. It will also be apparent from the foregoing, that as the sweep bar 137 rotates from the position seen in Fig. 6 into, for example, the position seen in Fig. 7, it will, through the engagement of the terminals 135 with the lugs 134, engage such of said lugs as are in the paths of said terminals and rotate said lugs and the register wheels 132 in the direction indicated by the arrow, Fig. 7. This rotation of each register wheel, which is actuated by the sweep bar, will rotate the appropriate gears 131, whereupon the idlers 128 and 127 will also be rotated, it being remembered that the idlers 127 and 128 are now in the position seen in Fig. 6$^b$ and the rotation of the idler 127 will be imparted to the segment 187 and thence to the segment 188 and bell crank lever 189 and the segment 191 will now operate the appropriate type wheels 200 and place them in the proper position to print the total. The operation of printing the total now takes place and is effected in the same manner as has already been described, with reference to the printing of items.

*The printing of sub-totals.*—The printing of sub-totals can be readily effected by my machine, as it frequently is desirable for the operator to ascertain, in the act of adding a long column of figures, the total at various points, which is effected in the following manner: We will assume that a series of numbers have been set up, registered and printed and at the desired period, the operator depresses the totaling lever 515, as already described and pulls the main lever 126 into its extreme forward position. By the depression of the totaling lever 515 and the forward and backward movement of the main lever 126, the total is printed, but instead of the operator removing his finger from the totaling lever, as heretofore described, the totaling lever is retained in its depressed position until the main lever 126 is in its extreme rearward position, after which the operator proceeds with setting up, registering and printing the numbers which it is desired to add to the total already given. While the totaling lever 515 is depressed, it will be apparent that as long as it is in its depressed position, the idlers 127 and 128 will be in mesh, the latter idlers being also in mesh all the time with the gears 181, as has been explained. It will also be apparent that while the idlers 127 and 128 are in mesh, as are also the gears 131, through the medium of the segment 187 and the rack 188 and the connections therefrom to the printing mechanism, as seen in the upper left hand portion of Fig. 6, the printing operations will take place in the manner already described during the return movement of the lever 126 to its rearmost or initial position. It will further be understood that as the printing mechanism is returned to its normal position, as seen in Fig. 6, through the medium of the sweep bar 250, as has already been described, by following out the line of movement through the gearing 188, 187, 127, 128 and 131, it will be apparent that the register wheels 132 will be actuated to the desired extent, it being remembered that the idlers 127 and 128 are now in mesh.

It will be apparent from the foregoing that after the operation of taking the sub-total has been effected, the parts will appear as seen in Fig. 80, the lever 126 being in its rearmost or initial position and the proper movements of the parts having been effected after the rotation in the proper direction of the shaft 513, which is turned by the spring 531, as has already been explained, it being, of course, understood that the rotation of the shaft 513 moves the totaling lever 515 from the position seen in Fig. 80 to the position seen in Fig. 65. As soon as the totaling lever rocks into its initial position or the position seen in Fig. 65, it will be understood that the movable portion of the center frame moves toward the operator, thereby rocking the lever 308 on its fulcrum 309, from the position seen in Fig. 80 into the position seen in full lines in Fig. 68 and Fig. 68$^b$, wherefrom it will be seen that the hook 324 has dropped into engagement with the pin 323 and the link 306 has actuated the elbow lever 303, so as to raise the terminal 302 and thereby the arm 299, out of engagement with the pin 301, the parts now appearing as seen in Fig. 68$^c$, whereby the main shaft 125 and its adjuncts are enabled, when the lever 126 is operated, to actuate the rack carriage instead of the totaling mechanism.

It will be seen from the foregoing that in the operation of printing final totals, the accumulator idlers 128 are moved out of mesh with the idlers 127, after the accumulator or register wheels have been returned to 0, and before the printing idlers 127 have been returned to their initial position. In the printing of the sub-totals, however, the idlers 127 and 128 are returned in mesh, until the printing devices are returned to their initial position, thereby returning the accumulator wheels to the position they occupied before the totaling operation.

*The operation of the repeating mechanism.*—It often happens that it is necessary to add the same item a number of times without unnecessary manipulation of the machine and in my present invention, I have devised a novel means for effecting this, whereby the depression of a single lever throws the few necessary operative parts of the machine into position, so that the same row of figures or items, after once being set up, can be registered and printed an indefinite number of times by merely actuating the main lever 126. The mechanism by which I accomplish this end is shown in Figs. 68 and 82, the former figure showing at the lower right hand portion, the position the different parts assume when the operator is setting up, registering and printing different rows of numbers, while in Fig. 82 I have shown the position the parts assume when it is desired to repeat indefinitely the same numbers or rows of figures.

Bearing in mind, as already explained, the function of the pin carriage and pins, it will be remembered that the row of figures which it is desired to repeat is physically or mechanically represented in the machine by the position of the pin carriage and the pins thereof. It is now only essential that means be provided for preventing the return of the pin carriage, until the number to be repeated has been registered, printed and added the requisite number of times. To do this, I depress the finger piece 320, from the position seen in Fig. 68, to the position seen in Fig. 82. This depression causes the lever 318, to rock on its fulcrum 319, whereby the pin 317 rocks the lever 315, into the position seen in Fig. 82. Before the depression of the finger piece 320, the shoulder 349 was in engagement with the pin 350, as seen in Fig. 68. By the downward pull on the lever 313, the pin 352 engages the hook 351 and pulls the lever 348 into the position seen in Fig. 82, so that the pin 350 can ride freely over the shoulder 349, when the arm 269 and the main shaft 125 are rocked.

As has heretofore been explained, the pin carriage is returned to its normal position shown in Fig. 10, by the bell crank lever 553 and its connections (see Fig. 83) which have been brought into operative position through the medium of the forked arm 326ª, which is loose on the main shaft 125. This arm 326ª is normally operated by the lever 269 through its pin 350 and the link 348. Since this link 348 is thrown out of operation by the depression of the finger piece 320, the pin carriage will not be returned and the number set up therein will be added and printed as many times as the main shaft 125 has been rocked by the main operating lever 126 and the various parts operated thereby. It will now be necessary to return the pin carriage to its normal position, which can be effected in three ways, viz: The finger piece 320 may be raised into its upward or normal position, as seen in Fig. 81, before the lever 126 is pulled the last time, or it may be done by the error mechanism heretofore described and comprising the lever 362 and its operating means or if the adding and repeating operation is complete and the result is required, it will be done automatically by the totaling operation, in a manner now to be described. As already explained, the lever 310 will be rocked from the position seen in Fig. 82, to that shown in Fig. 80, when the accumulator parts are brought in position to take the total. As the lever 310 is rocked and the pin 311 raised, it will, by reason of its connection with the hook 312, raise the link 313 and through its stud 352 in the slot 351 of the link 348, raise the latter, so that the shoulder 349 engages the pin 350, as shown in Fig. 68. Hence, as the main lever 126 is rocked, and therefore the main shaft 125 and the arm 269, the pin carriage will be returned, as already described.

*The operation of multiplication.*—As multiplication is but a repetition of addition, it can be effected as just described. When, however, it is desired to multiply a number by another of more than one order, a shorter method should be employed, than the one above indicated, which I will now describe. The multiplicand should be set up by the keys, the same as in addition and the finger piece 320 depressed. The operator then pulls the lever 126 forward as many times as is indicated by the right hand figure of the multiplier, then strikes the 0 key and proceeds to pull the lever 126 as many times as is indicated by the second figure of the multiplier from the right. He then strikes the 0 key and proceeds with the third figure of the multiplier and so on, till the left hand figure has been treated in like manner. The result may then be obtained as already described in addition. To illustrate, I will assume that it is desired to multiply 386.45 by 137. The operator sets up the number 386.45 as already explained. He then pulls the lever 126 seven times, then strikes the 0 key, thereby moving the pin carriage one point to the left.

The pin carriage has now been made to represent 3864.50. He then pulls the operating lever three times, thereby adding 3864.50 three times which is equivalent to adding the original number thirty times, since the number now being added is ten times as great. Then, by again striking the 0 key, the pin carriage moves still another point to the left and the number now represented therein is 38645.00 or 100 times as great as the original number and by again pulling the main operating lever 126, once, this latter number is added. He has, therefore, practically added 386.45, one hundred and thirty-seven times or multiplied it by 137, and the result can now be printed, as heretofore explained. This arrangement provides a very rapid method of multiplication that cannot be employed in any other machine with which I am familiar. It will be apparent to one skilled in the art, that it would not be possible to employ this method in any machine not having a traveling carriage, in which a number can be set up or represented. It will further be noted that in my construction, the principal movements are positive. In other adding machines with which I am familiar, such movements have been largely dependent upon springs. This is especially objectionable in the carrying devices, as there is not and cannot be any record to show whether they worked properly or not, and in case of their failure to do so, there would be an error, of which the operator could not be notified. And since the main operating lever, as 126, must furnish all the energy used in the entire machine, energy must be stored thereby in any springs that are in turn to operate the various parts. As is evident, if springs are to be employed in any operation, more energy must be stored in them than is actually required, to move the parts, in order that the proper operation may be assured. There is, therefore, much more energy required on the operating lever than would be required were the motions all positive. I have therefore used positive motions wherever possible. The adding and positioning of the printing mechanism requires a great variety of movement and it has therefore been occasioned in most cases, through the agency of racks, or their equivalents, moved by springs until such movement has been arrested by stops set up or positioned by the keys. By the novel construction of the adding racks employed, in my present invention, a positive motion is imparted to said racks, thereby reducing the energy required in the adding and printing devices, to a minimum and insuring their proper movement. I desire to also call special attention to the convenient manner in which I can position the printing platen, when a wide piece of paper is used, instead of a strip and it is desired to print a number of columns thereon, since it is only necessary for the operator to insert his finger in the eye 457 and rock the lever 448, so as to move the pin 451, out of the coacting slot 458 whereby the desired lateral adjustment of the necessary parts can be instantly effected.

Another use to which my machine may be put is the calculation of interest, freight and express charges, taxes, etc. I will now illustrate one method of doing this, in the case of taxes. This method varies but little from the one explained in simple multiplication. Assuming that it is desired to find the tax on an assessment of $3468.45, at the rate of $1.85 per hundred dollars. This might be done by striking in the full amount 3468.45 and multiplying by 185 in the manner already explained, but it would be evident that this would carry the calculation to six decimal points, which is unnecessary. I will now explain how this might be shortened. The operator first strikes in the keys in this order 3, 4, 6 and 8, omitting for the present the two right hand figures. He then pulls the main operating lever five times, which adds the number 34.68 five times. He now strikes the next number 4, which makes the number represented on the pin carriage 346.84 and adds this number eight times, by pulling the main operating lever eight times.
He then strikes the right hand number, which in the present case is 5, and thereby makes the number set up on the pin carriage 3468.45, and adding this by pulling the main operating lever once, he is ready to take the total or result, as already explained. The result would of course, in my present construction be printed with two decimal points, while the calculation was made to four decimal points. This can be easily rectified by the operator bearing this in mind and moving his decimal two points to the left. This carries the calculation to four decimal points and is therefore absolutely correct to three decimal points, which is close enough for practice. It will be evident that this method could not be employed with any machine not having a traveling carriage, in which numbers can be set up or represented and it will be further evident that this method might be employed in a great variety of work besides that here mentioned.

It will be understood that in its broad aspects, my novel construction of computing machine is differentiated from those structures of the prior art wherein the printing mechanism consists of straight type bars which are actuated by more or less direct contact with the pins or stops employed to the traveling carriage, since in my invention, I employ the intermediate gearing and actuating mechanism, which is operated upon the elevation or depression of the adding racks. It will further be understood that my present invention is differentiated from all prior devices wherein is employed a spring or other form of energy for actuating the main shaft or its adjuncts, since I particularly desire to dispense, so far as possible, with the employment of such springs or other similar or analogous forms of energy. It will further be apparent that my present invention is differentiated from those prior devices wherein a plurality of racks are employed, which are actuated by the tension of a spring or springs, it being evident that in my device the adding racks are mounted in a novel construction of carriage, whereby a positive and proper degree of actuation is imparted to said adding racks, upon the propel motion being imparted to the adding rack carriage.

So far as I am aware, I am the first in the art to employ the construction of pin carriage and particular type of pins used therein, as also the means for retaining proper pins temporarily in elevated position, by means of pawls of a novel construction, which are positively actuated at proper periods. So far as I am aware, I am also the first to employ, in conjunction with the pin carriage, an adding rack carriage containing racks therein, pivotally supported and operated in the manner described and the manner of imparting movement from said adding racks, through the medium of the printing idlers and the accumulator idlers to the printing mechanism, the accumulator mechanism, the carrying mechanism and their adjuncts is also novel with me.

I am aware that it has heretofore been proposed to employ a carriage having a series of stops therein, whose function is to prohibit and limit the movement of a longitudinally movable type carrier, having rack teeth on its under side and characters indicative of numerals on its top surface, the construction of said prior device being such that the end of each of said type carriers directly impacts as desired with said stop, which latter serves to directly and positively retain said type carrier in desired position, the printing being effected by type hammers which impress the paper direct upon said type carriers. In my present device, the pins I employ have no such function or coöperation with the type carrying devices, since my pins are employed to elevate a desired rack into mesh with printing and accumulating mechanism, whereupon the further movement of said racks actuates said mechanisms to the desired extent, it being apparent that the printing of the items is effected by a device wholly apart and distinct from the mechanism which temporarily contacts with an elevated pin.

I am aware that it has heretofore been proposed to employ in a computing machine a series of gear sectors pivotally supported and provided with a downward projection at their side, which is adapted to engage with stops set up in a movable carriage, said gear sectors having connected therewith and capable of independent movement with respect thereto, a series of type segments in which the type are carried, such type being actuated by a series of spring actuated hammers, means being also provided for actuating the stop carriage and the stops therein. My present invention is clearly differentiated from such a construction, since I employ a movable pin carriage adapted to coöperate with my novel construction of independent racks in a movable rack carriage, whereby a novel movement is imparted to each of my adding racks, which may be engaged by a pin, such rack being elevated during its lateral movement and moved into direct engagement with the printing and accumulating mechanism.

In the prior art device referred to, no adding rack carriage having independently movable adding racks therein is employed so that my present invention is widely differentiated therefrom in this and numerous other particulars.

Having thus described my invention, what I claim as new and desire to secure by Letters Patent, is—

1. In a computing machine, the combination of item setting mechanism, an adding rack carriage, adding racks therein adapted to receive a longitudinal and independent upward movement with respect to said carriage during the forward movement of said racks, means for actuating said adding rack carriage, item printing mechanism, and connections intermediate said rack carriage and printing mechanism.

2. In a computing machine, an item setting mechanism, an adding rack carriage, adding racks therein adapted to receive a longitudinal and independent upward movement with respect to said carriage during the forward movement of said racks, means for actuating said adding rack carriage, accumulator mechanism, and connections intermediate said rack carriage and accumulator mechanism.

3. In a computing machine, item setting devices, accumulating devices, an adding rack carriage, adding racks pivotally supported therein and adapted to receive a longitudinal and independent upward movement with respect to said carriage during the forward movement of said racks and means for transferring the items set up by the item setting devices from said racks to the accumulating devices.

4. In a computing machine, item setting devices, accumulating devices, a rack carriage having adding racks therein, adapted to receive a longitudinal and independent upward movement with respect to said carriage during the forward movement of said racks located intermediate said setting devices and accumulating devices, and means for causing said devices to perform a cycle.

5. In a computing machine, item devices, key controlled locking devices for the same, an adding rack carriage, having adding racks pivotally mounted therein adapted to receive a longitudinal and independent upward movement with respect to said carriage during the forward movement of said racks, accumulating devices, connections intermediate the latter and said racks whereby items set up on said item devices may be transferred to said accumulating devices, and means for unlocking said locking devices.

6. In a computing machine, means for setting up an item, an adding rack carriage, adding racks therein, said racks being adapted to receive a longitudinal and an independent upward movement with respect to said carriage during the forward movement of said racks, means for accumulating said item and means for restoring said carriage, racks and item devices to their initial or normal position.

7. In a computing machine, means for setting up an item, an adding rack carriage, adding racks therein, said racks being adapted to receive a longitudinal and an independent upward movement with respect to said carriage during the forward movement of said racks, means for accumulating and printing said item, and means for restoring the item devices and accumulating and printing means to their normal position.

8. In a computing machine, item devices, an adding rack carriage, adding racks therefor, said racks being adapted to receive a longitudinal and an independent upward movement with respect to said carriage during the forward movement of said racks, accumulating devices, devices for transferring items from said adding racks to said accumulating devices, and means for locking said item devices during the operation of said devices.

9. In a computing machine, item setting devices, an adding rack carriage, a series of adding racks therein, said racks being movably supported from the walls of said rack carriage, a corresponding number of pins therefor, means for releasing said racks, means for actuating said pins, said adding racks and the adding carriage, means for locking said racks, and means for restoring said pins to normal position.

10. In a computing machine, a rack carriage, racks therein, said racks being movably supported from the walls of said rack carriage, numeral keys, pins actuated by said numeral keys for limiting the movement of said racks, means for releasing said racks, means for accumulating the items set up, means for locking said racks and means for retracting said pins.

11. In a computing machine, a laterally movable pin carriage, a series of pins therein, a series of keys for elevating said pins, means for moving said carriage one point as each key is operated, a series of type carrying parts, an adding rack carriage, means for actuating said rack carriage, a series of adding racks in said rack carriage adapted to be operated by said pins, all of said racks having the same extent of movement for any number set up by said pins and connecting mechanism intermediate said racks and said type carrying parts.

12. In a computing machine, a movable pin carriage, a series of pins therein, a series of keys adapted to actuate said pins, means for moving said carriage laterally one space or row as each key is operated, a series of type carrying parts, an adding rack carriage, means for actuating said rack carriage, a series of racks in said rack carriage adapted to be operated by said pins when the latter are in elevated position, accumulating devices, connecting mechanism intermediate said racks and said type carrying parts, and connecting mechanism intermediate said racks and accumulating devices.

13. In a computing machine, a movable pin carriage, a series of pins arranged therein, keys for moving said pins, devices for moving said carriage when ever a key is operated, an adding rack carriage, a series of adding racks pivotally supported therein adapted to co-act with said pins when the latter are in operative position, a series of type carrying parts, connecting mechanism intermediate said racks and type carrying parts and means for locking the latter in their extreme positions.

14. In a computing machine, item setting devices, an adding rack carriage, a series of adding racks pivotally supported therein, a series of printing devices, a series of accumulating devices, and separate connecting mechanism leading from said racks to said printing devices and accumulating devices respectively.

15. In a computing machine, a pin carriage, a series of pins within said carriage, a series of ten keys numbered from 1 to 0 for moving said pins, an adding rack carriage, a series of adding racks pivotally supported therein, means for moving said adding rack carriage and racks at an angle to the line of movement of said pin carriage, a series of printing devices, a series of accumulating devices, mechanism intermediate said racks and said printing devices and mechanism intermediate said racks and accumulating devices.

16. In a computing machine, item setting mechanism having pins therein, an adding rack carriage, a series of adding racks therein, means for imparting a longitudinal movement to said racks and for causing an independent upward movement of said racks with respect to said carriage, and for moving said racks against prepositioned pins of said item setting mechanism.

17. In a computing machine, item setting mechanism having pins therein, an adding rack carriage, a series of adding racks pivotally supported therein, means for moving said racks against prepositioned pins of said item setting mechanism, printing mechanism, connections intermediate said racks and printing mechanism, and totalizing devices for totaling the items.

18. In a computing machine, a movable pin carriage, an escapement device therefor, a series of adding racks, means for actuating said racks, so as to impart a longitudinal and independent upward movement thereto a series of pins carried by said pin carriage, and adapted to be prepositioned to limit the movement of any desired rack or racks, a printing mechanism, and connections from said racks to said printing mechanism.

19. In a computing machine, item setting mechanism having pins therein, an adding rack carriage, a series of adding racks pivotally supported therein, means for moving said racks against prepositioned pins of said item setting mechanism, printing mechanism connections intermediate said racks and printing mechanism, accumulating devices, connections intermediate said racks and accumulating devices, and totalizing devices for totaling the items.

20. In a computing machine, a movable pin carriage, a series of adding racks, means for actuating said racks, so as to impart a longitudinal and upward movement thereto, a series of pins carried by said pin carriage, and adapted to be prepositioned to limit the movement of any desired rack or racks, a printing mechanism, connections from said racks to said printing mechanism, an accumulating mechanism, and connections from said racks to said accumulating mechanism.

21. In a computing machine, a movable pin carriage, a series of adding racks, means for imparting a longitudinal and upward movement to said racks, a series of pins carried by said pin carriage, and adapted to be prepositioned to limit the movement of any desired rack or racks, a printing mechanism, connections from said racks to said printing mechanism, an accumulating mechanism, connections from said racks to said accumulating mechanism, totalizing devices, and connections from said totalizing devices to said accumulating mechanism, whereby the latter and the connections to said printing mechanism are caused to operate in unison during the act of taking a total.

22. In a computing machine, a frame work comprising sides, a front transverse strip, key stems mounted in the latter, keys on said stems, a lower front strip also joining said sides, an internal tie piece also joining said sides, key shafts rotatably mounted in said lower strip and tie piece, arms securing said key stems to said key shafts, a setting lever shaft, a laterally movable pin carriage, pins in said carriage, pin elevating devices mounted on said setting lever shafts and connections from said key shafts to said pin elevating devices.

23. In a computing machine, a frame work having sides, a front transverse strip, key stems mounted in the latter, keys on said stems, a lower front strip joining said sides, an internal tie piece also joining said sides, key shafts mounted in said lower strip and tie piece, arms securing said key stems to said shafts, a setting lever shaft, a pin carriage movable transversely to said shafts, pins in said pin carriage, pin elevating devices loosely mounted on said setting lever shaft, connections from said key shafts to said pin elevating devices and tension devices for holding said pin elevating devices normally out of engagement with said pins.

24. In a computing machine, a setting lever shaft, a pin carriage mounted over said shaft, pins in said carriage, a series of angular pin elevating devices loosely mounted on said shaft, a series of shafts rotatably mounted and connected with said pin elevating devices, and a series of keys connected with said series of rotatable shafts.

25. In a computing machine, a setting lever shaft, a pin carriage mounted over said shaft, pins in said carriage, stops on the upper and lower portions of said pins for limiting the extent of movement thereof, a series of pin elevating devices loosely mounted on said shaft, a series of shafts rotatably mounted and connected with said pin elevating devices, a series of keys connected with said rotatable shafts, and an escapement device intermediate said pin carriage and setting lever shaft, the movement of the latter operating said escapement device.

26. In a computing machine, a movable carriage, pins arranged therein in longitudinal rows, keys for effecting the raising of said pins, means for moving said carriage laterally one point as each key is operated, a series of movable type carrying parts, mechanism intermediate said pin carriage and type carrying parts and including racks for operating the latter, said racks being adapted to be raised by said pins at any time during the forward movement of said racks, and means for locking said type carrying parts in their highest and lowest positions.

27. In a computing machine, a movable carriage, a series of pins therein arranged in rows, stops on the upper and lower portions of said pins for limiting the movement thereof, a series of ten keys numbered from 1 to 0, a series of key shafts, connecting devices intermediate said keys and key shafts, a setting lever shaft, pin elevating devices mounted on said setting lever shaft, connections intermediate said key shafts and setting lever shafts and means for printing items corresponding to the elevated pins, said means including movable racks adapted to be arrested by said pins and elevated at any time during the forward movement of said racks.

28. In a computing machine, a movable carriage, a series of pins therein arranged in rows, stops on the upper and lower portions of said pins for limiting the movement thereof, a series of ten keys numbered from 1 to 0, a series of key shafts rotatably mounted, connecting devices intermediate said keys and key shafts, arms fixed on said key shafts, a setting lever shaft, a tension device therefor, pin elevating devices loosely mounted on said setting lever shaft, links connected with said arms and said devices, means for printing the items corresponding to the elevated pins and means for adding said items.

29. In a computing machine, an adding rack carriage, racks therein, a movable pin carriage, a polygonal shaped pin non-rotatably mounted therein for arresting the movement of said adding racks and effecting their elevation on the further movement of said racks and composed of a body portion, stops on the upper and lower portion thereof for limiting the movement of said pin, and a shoulder on the upper portion of said body and on a different side from that on which said stops are located.

30. In a computing machine, a pin carriage, means for actuating said carriage, rows of polygonal shaped pins non-rotatably mounted in said carriage and having a shoulder on their upper portions, and pawls mounted in said carriage and adapted to contact with said pins, said pawls comprising a body portion extending across said pin carriage and said body portion having depending arms pivotally secured to the walls of said pin carriage.

31. In a computing machine, a pin carriage, comprising a frame, having side and end walls, means for actuating said carriage, a support for said carriage, ways common to said carriage and support, rows of pins mounted in said carriage and having a shoulder with an inclined top thereon, a series of pawls mounted in said carriage and adapted to contact with said pins, said pawls each having a body portion extending across said frame and provided with arms pivoted to said side walls, and means for elevating said pins.

32. In a computing machine, a pin carriage, means for actuating said carriage, rows of pins in said carriage each having a shoulder at the upper portion thereof provided with an inclined top thereon, pawls mounted in said carriage and adapted to contact with said pins, each of said pawls having a body portion extending across said carriage and provided with arms pivoted to said carriage, means for elevating said pins and means for unlocking said pawls therefrom.

33. In a computing machine, a pin carriage, operating means therefor, pins arranged in rows therein, a series of keys, actuating devices for said pins operated by said keys, spring actuated pawls each having a body extending across said carriage, said body having arms depending therefrom and pivoted to said pin carriage for each row of said pins and means for actuating said pawls.

34. In a computing machine, a pin carriage, pins arranged in rows therein, said pins having stops thereon for limiting their upper and lower movements, said pins being also provided with shoulders having inclined top portions, a pawl for each row of pins adapted to normally contact with said top portions but to rock beneath a shoulder, when a pin is elevated, means for elevating a desired pin or pins, printing devices and mechanism intermediate said pins and printing devices for effecting the operation of the latter after a pin is raised.

35. In a computing machine, a frame work having ten key shafts rotatably mounted therein, a series of nine keys numbered one to nine mounted on said key shafts, a setting lever shaft, a series of pins, a series of nine pin operating devices mounted loosely on said setting lever shaft, connections from said key shafts to said pin operating devices, a zero key mounted on one of said key shafts, a connection from said zero key shaft to said setting lever shaft, a printing mechanism and connections intermediate said pins and printing mechanism for operating the latter.

36. In a computing machine, a frame work having ten key shafts rotatably mounted therein, a series of nine keys numbered one to nine mounted on said key shafts, a setting lever shaft, a series of pins, a series of nine pin operating devices mounted loosely on said setting lever shaft, connections from said key shafts to said pin operating devices, a zero key mounted on one of said key shafts, a connection from said zero key shaft to said setting lever shaft, a printing mechanism, connections intermediate said pins and printing mechanism for operating the latter, a series of accumulating devices, and connecting mechanism intermediate said pins and accumulating devices.

37. In a computing machine, a frame work having ten key shafts rotatably mounted therein, a series of nine keys numbered one to nine mounted on said key shafts, a setting lever shaft, a series of pins, a series of nine pin operating devices mounted loosely on said setting lever shaft, connections from said key shafts to said pin operating devices, a zero key mounted on one of said key shafts, a connection from said zero key shaft to said setting lever shaft, a printing mechanism, connections intermediate said pins and printing mechanism for operating the latter, a series of accumulating devices, connecting mechanism intermediate said pins and accumulating devices, totalizing devices and connections intermediate said totalizing devices and accumulating devices.

38. In a computing machine, a pin carriage, composed of side and end walls, top and bottom plates therefor, said plates having alining openings therein, pins in said openings, studs secured to opposite inner walls of said carriage, pawls having arms thereon pivotally mounted on said studs within said walls, and springs for holding said pawls against said pins.

39. In a computing machine, a pin carriage, composed of side and end walls, top and bottom plates therefor, said plates having alining openings therein, pins in said openings, studs secured to the opposite walls of said carriage, pawls having arms thereon mounted on said studs, springs for holding said pawls against said pins, and an unlocking bar carried by said carriage and having means thereon for engaging said pawls.

40. In a computing machine, a pin carriage, composed of side and end walls, top and bottom plates therefor, said plates having alining openings therein, pins in said openings, studs secured to the opposite walls of said carriage, pawls having arms thereon mounted on said studs, springs for holding said pawls against said pins, an unlocking bar carried by said carriage and having means thereon for engaging said pawls, means for elevating said pins and means for actuating said unlocking bar.

41. In a computing machine, a pin carriage having side and end walls, one of the latter having rack teeth thereon, top and bottom plates secured to said walls, and having alining openings therein, pins in said openings, a setting lever shaft, pin elevating devices mounted on said shaft, means for rocking the latter and an escapement device, actuated in unison with said setting lever shaft and adapted to engage said rack teeth.

42. In a computing machine, a pin carriage having side and end walls, one of the latter having rack teeth thereon, top and bottom plates secured to said walls and having alining openings therein, pins in said openings, a setting lever shaft, pin elevating devices mounted on said shaft, means for rocking the latter, an escapement device actuated in unison with said setting lever shaft and adapted to engage said rack teeth, and means for operating said pin elevating devices.

43. In a computing machine, a pin carriage, pins arranged in rows thereon, a series of keys, means operated by said keys for imparting a step by step movement to said pin carriage, actuating devices for said pins operated by said keys, spring actuated pawls pivotally supported within said carriage for each row of pins for retaining said pins in position, means including an unlocking bar carried by said carriage for actuating said pawls in unison so as to effect the descent of said pins, and means for elevating said pins.

44. In a computing machine, a movable pin carriage composed of a frame having sides and end walls, top and bottom plates secured thereto, openings in said plates, pins in said openings, means for actuating said pins, stops and shoulders on said pins, pawls pivotally supported within said walls for engaging the shoulders of said pins and locking the latter in elevated position, an escapement device for said pin carriage and means including an unlocking bar carried by said carriage for actuating said pawls.

45. In a computing machine, a pin carriage composed of a frame having sides and end walls, one of the latter having rock teeth thereon, an escapement device co-acting with said rack teeth, guides for said pin carriage, top and bottom plates secured to said walls, said top plates having lateral extensions thereon adapted to ride on said guides and thus support said carriage, said plates having alining openings therein, pins in said openings and means for actuating said pins and carriage.

46. In a computing machine, a pin carriage composed of a frame having sides and end walls, one of the latter having rack teeth thereon, an escapement device co-acting with said rack teeth, guides for said pin carriage, top and bottom plates secured to said walls, said top plates having lateral extensions thereon adapted to ride on said guides and thus support said carriage, said plates having openings therein, pins in said openings, means for actuating said pins, pawls pivotally supported within said walls for retaining said pins temporarily in elevated position, means for advancing said pin carriage, each time a pin is actuated, and means for locking said pin carriage.

47. In a computing machine, a transversely movable pin carriage, pins therein arranged in rows, means for raising and retracting said pins, means for moving said carriage laterally one point or row as each pin is operated, said means comprising a setting lever shaft, an arm fast on said shaft, a plurality of lugs pivotally supported and operated by said arm, and a series of rack teeth on said pin carriage engaged by said lugs.

48. In a computing machine, a transversely movable pin carriage, pins therein arranged in rows, means for raising said pins, means for moving said carriage laterally one point or row as each pin is operated, said means comprising a setting lever shaft, an arm fast on said shaft, a plurality of lugs pivotally supported and operated by said arm, a series of rack teeth on said pin carriage engaged by said lugs, and a tension device for holding said pin carriage in position.

49. In a computing machine, a transversely movable pin carriage, pins therein arranged in rows, means for raising said pins, means for moving said pin carriage laterally one point or row as each key is operated, said means comprising a setting lever shaft, an arm fast on said shaft, a plurality of lugs pivotally supported and an arm secured to the frame of the machine and pivotally connected to said lugs.

50. In a computing machine, a transversely movable pin carriage, pins therein arranged in rows, means for raising said pins, means for moving said pin carriage laterally one point or row as each key is operated, said means comprising a setting lever shaft, an arm fast on said shaft, a plurality of lugs pivotally supported, an arm secured to the frame of the machine and pivotally connected to said lugs, and stops for limiting the movement of said arm.

51. In a computing machine, a transversely movable pin carriage, pins therein arranged in rows, means for raising said pins, means for moving said pin carriage laterally one point or row as each key is operated, said means comprising a setting lever shaft, an arm fast on said shaft, a plurality of lugs pivotally supported, an arm secured to the frame of the machine and pivotally connected to said lugs, stops for limiting the movement of said arm, and tension devices for holding said pin carriage in position.

52. In a computing machine, a pin carriage, rows of pins therein, means for actuating said pins and carriage, registering and printing devices co-acting with said pin carriage, an escapement device for the latter and a tail piece on said pin carriage and adapted to render said escapement device temporarily inoperative when said carriage reaches its extreme position.

53. In a computing machine, a pin carriage, pins therein, means for raising and retracting said pins, means for actuating said carriage, an adding rack carriage, a series of adding racks therein movably supported within said rack carriage, said racks being capable of movement independently of said rack carriage and means for moving said adding rack carriage at an angle to said pin carriage.

54. In a computing machine, the combination of a pin carriage, pins therein, an adding rack carriage, a series of adding racks pivotally supported therein, and means for moving said carriages at a right angle to each other.

55. In a computing machine, the combination of a pin carriage, pins therein, means for actuating said pins, an adding rack carriage, a series of adding racks therein, connections intermediate with said rack carriage and racks whereby the latter are capable of independent movement with respect to said rack carriage, means for moving said carriages at an angle to each other, printing mechanism and connections intermediate said adding racks and printing mechanism.

56. In a computing machine, the combination of a pin carriage, pins therein, an adding rack carriage, a series of adding racks therein, said racks being capable of independent movement with respect to said rack carriage, means for moving said carriages at an angle to each other, printing mechanism, connections from said adding racks to said printing mechanism, accumulating devices and connections from said accumulating devices to said adding racks.

57. In a computing machine, a pin carriage, pins therein, means for actuating said pins, an escapement device for said pin carriage, an adding rack carriage supported above said pin carriage, a series of adding racks supported in said rack carriage, connections intermediate said rack carriage and racks for enabling said racks to be actuated and independently of said rack carriage, and means for moving said adding rack carriage at a right angle to said pin carriage.

58. In a computing machine, a pin carriage, pins therein, means for raising said pins, means for locking said pins in raised position, means for unlocking and retracting said pins, an adding rack carriage, adding racks therein, each of said racks being independently movable with respect to said rack carriage, means for causing an adding rack to be arrested by one of said pins and means for moving said carriages at a right angle to each other.

59. In a computing machine, a pin carriage, rows of pins therein, an escapement device for said carriage, and means carried by the latter for rendering said escapement device temporarily inoperative, when the capacity of the machine has been reached.

60. In a computing machine, a series of vertically movable pins, a series of pin locking devices acting to lock in operative position any pin which may have been moved to operative position, an adding rack carriage, a series of adding racks movably supported therein, said racks being capable of movement independently of said rack carriage, means for actuating said rack carriage, and means on said racks adapted to engage a pin or pins when in operative position during the actuation of said rack carriage.

61. In a computing machine, a series of vertically movable pins, a series of pin locking devices acting to lock in operative position any pin which may have been actuated, a rack carriage having adding racks therein adapted to co-act with said pins, said pins causing racks to be elevated during the forward movement of the latter, means for moving the racks forwardly, cycle performing mechanism for elevating said pins and moving the elevated pins into the path of predetermined racks, and means for unlocking said pins.

62. In a computing machine, a pin carriage, rows of pins therein, a series of pawls for locking said pins in operative position, means for actuating said pins and pin carriage, registering and printing devices co-acting with said pin carriage, an escapement device for said pin carriage and means for rendering said escapement device temporarily inoperative, when the capacity of the machine has been reached.

63. In a computing machine, a pin carriage, rows of pins therein, means for actuating said pins and pin carriage, registering, printing and adding devices co-acting with said pin carriage, an escapement device for said pin carriage and means for rendering said escapement device temporarily inoperative, when the capacity of the machine has been reached.

64. In a computing machine, a pin carriage, pins therein, means for actuating said pins and moving said carriage, an adding rack carriage located above said pin carriage, a series of racks therein, devices pivotally attached to said racks and co-acting with said pins when the latter are raised to lift said racks, means for moving said carriages at an angle to each other, printing mechanism and connections from said racks to said printing mechanism.

65. In a computing machine, an adding rack carriage, means for actuating the latter, a series of adding racks movably mounted in said carriage, means for causing said racks to be elevated during the actuating of said carriage, printing mechanism located above said carriage, a series of printing idlers adapted to be engaged by said racks when the latter are raised, and connections from said idlers to said printing mechanism.

66. In a computing machine, an adding rack carriage, means for actuating the latter, a series of adding racks movably mounted in said carriage, means for causing said racks to be elevated during the actuation of said carriage, accumulating mechanism located above said carriage, a series of accumulator idlers adapted to be engaged by said racks when the latter are in elevated position, and connections from said idlers to said accumulator mechanism.

67. In a computing machine, an adding rack carriage, means for actuating the latter, a series of adding racks movably mounted therein, means for causing said racks to be elevated during the actuation of said carriage, accumulating mechanism located above said rack carriage, printing mechanism located above said rack carriage, a series of printing idlers engaged by said racks when the latter are raised, a series of accumulator idlers also engaged by said racks when the latter are raised, connections from said printing idlers to said printing mechanism and connections from said accumulator idlers to said accumulating mechanism.

68. In a computing machine, an adding rack carriage, means for actuating the latter, a series of adding racks movably mounted therein, means for causing said racks to be elevated during the actuation of said carriage, accumulating mechanism located above said rack carriage, printing mechanism located above said rack carriage, a series of printing idlers engaged by said racks when the latter are raised, a series of accumulator idlers also engaged by said racks when the latter are raised, connections from said printing idlers to said printing mechanism, connections from said accumulator idlers to said accumulating mechanism, and means for locking and unlocking said idlers.

69. In a computing machine, a rack carriage having guides therefor on its front and rear portions, means for imparting a reciprocating movement to said rack carriage, racks movably mounted in said rack carriage, means for causing a rack or racks to be elevated during the movement of said carriage, printing mechanism and devices actuated by said rack for operating said printing mechanism.

70. In a computing machine, a rack carriage, guides therefor on its front and rear portions, means for imparting a reciprocating movement to said rack carriage, adding racks movably mounted in said carriage, means for causing a rack or racks to be elevated during the movement of said carriage, accumulating devices and mechanism actuated by said racks when in elevated position for operating said accumulating devices.

71. In a computing machine, a rack carriage, guides therefor on its front and rear portions, means for imparting a reciprocating movement to said rack carriage, adding rack movably mounted in said rack carriage, means for causing a rack or racks to be elevated during the movement of said rack carriage, a printing mechanism, mechanism actuated by said racks when in elevated position for operating said printing mechanism, accumulating mechanism and connections operated by said racks when elevated for operating said accumulating mechanism.

72. In a computing machine, a rack carriage, guides therefor on its front and rear portions, means for imparting a reciprocating movement to said rack carriage, adding racks, movably mounted in said rack carriage, means for causing a rack or racks to be elevated during the movement of said rack carriage, a printing mechanism, mechanism actuated by said racks when in elevated position for operating said printing mechanism, accumulating mechanism, connections operated by said racks when elevated for operating said accumulating mechanism, and means on said racks for effecting the unlocking of a portion of the accumulating mechanism when a rack or racks is raised.

73. In a computing machine, a rack carriage comprising sides and end portions, guides at the front and rear of said rack carriage, means for imparting a reciprocating motion to said carriage, rods extending transversely of said rack carriage, pivotal connections mounted on said rod, racks attached to said pivotal connections, means for causing one or more of said racks to be elevated during the reciprocation of the rack carriage, printing mechanism and connections intermediate said racks and printing mechanism for effecting the operation of the latter upon the elevation of the rack or racks.

74. In a computing machine, a rack carriage comprising sides and end portions, guides at the front and rear of said rack carriage, means for imparting a reciprocating motion to said carriage, rods extending transversely of said rack carriage, pivotal connections mounted on said rods, racks attached to said pivotal connections, means for causing one or more of said racks to be elevated during the reciprocation of the rack carriage, printing mechanism, connections intermediate said racks and printing mechanism for effecting the operation of the latter upon the elevation of a rack or racks, accumulating devices and connections intermediate the latter and said racks whereby said accumulating devices are operated upon the elevation of a rack or racks.

75. In a computing machine, a rack carriage comprising sides and end portions, guides at the front and rear of said rack carriage, means for imparting a reciprocating motion to said carriage, rods extending transversely of said rack carriage, pivotal connections mounted on said rods, racks attached to said pivotal connections, means for causing one or more of said racks to be elevated during the reciprocation of the rack carriage, printing mechanism, connections intermediate said racks and printing mechanism for effecting the operation of the latter upon the elevation of a rack or racks, accumulating devices, connections intermediate the latter and said racks whereby said accumulating devices are operated upon the elevation of a rack or racks, and totalizing devices for enabling the totaling of the items indicated by said printing mechanism.

76. In a computing machine, a rack carriage comprising sides and end portions, rods carried by said rack carriage, a series of adding racks arranged in rows and movably mounted upon said rods, means for causing the reciprocation of said rack carriage, means for raising a rack or racks during the movement of said rack carriage, plates carried by each of said racks, a series of accumulator idlers arranged in alinement with said adding racks, means operated by the raising of said racks and plates for unlocking said accumulator idlers, accumulating devices and connections from said accumulator idlers to said accumulating devices.

77. In a computing machine, a rack carriage comprising sides and end portions, rods carried by said rack carriage, a series of adding racks arranged in rows and movably mounted upon said rods, means for causing the reciprocation of said rack carriage, means for raising a rack or racks during the movement of said rack carriage, plates carried by each of said racks, a series of accumulator idlers arranged in alinement with said adding racks, means operated by the raising of said racks and plates for unlocking said accumulator idlers, accumulating devices, connections from said accumulator idlers to said accumulating devices, a series of printing idlers, a printing mechanism and connections intermediate said printing idlers and printing mechanism.

78. In a computing machine, a rack carriage comprising sides and end portions, rods carried by said rack carriage, a series of adding racks arranged in rows and movably mounted upon said rods, means for causing the reciprocation of said rack carriage, means for raising a rack or racks during the movement of said rack carriage, plates carried by each of said racks, a series of accumulator idlers arranged in alinement with said adding racks, means operated by the raising of said racks and plates for unlocking said accumulator idlers, accumulating devices, connections from said accumulator idlers to said accumulating devices, a series of printing idlers, a printing mechanism, connections intermediate said printing idlers and printing mechanism, and totalizing devices for totaling the items indicated by said printing mechanism.

79. In a computing machine, a pin carriage, pins movably supported therein, means for actuating said pins and carriage, a rack carriage movable at an angle to said pin carriage, a series of adding racks movably mounted in said rack carriage, devices intermediate said pins and adding racks for effecting the elevation of the latter, when a pin or pins are in elevated position, accumulating mechanism, printing mechanism, and connections from said racks to said mechanisms, whereby the latter are operative when said adding racks are raised.

80. In a computing machine, a pin carriage, pins movably supported therein, means for actuating said pins and carriage, a rack carriage movable at an angle to said pin carriage, means for actuating said rack carriage, a series of adding racks movably mounted in said rack carriage, devices intermediate said pins and racks for effecting the elevation of the latter when a pin or pins is in elevated position, printing mechanism, accumulating mechanism, connections from said racks to said mechanisms, whereby the latter are operative when a rack or racks are raised, and means for locking and unlocking said printing and accumulating mechanism.

81. In a computing machine, a rack carriage, means for actuating the same, a plurality of adding racks arranged in series therein, means for elevating said racks during the actuating of said rack carriage, means for causing said racks to be retained in their elevated and lowest positions, a series of printing idlers arranged above said racks, printing mechanism actuated by said printing idlers, a series of accumulator idlers also arranged above said racks, a series of accumulator wheels and gears thereon, said gears being in mesh with said accumulator idlers.

82. In a computing machine, a rack carriage, means for actuating the same, a series of adding racks arranged therein, means for effecting the elevation of said racks during the actuation of said rack carriage, means for causing said racks to be retained in their elevated and lowest positions, a series of printing idlers arranged above said racks, printing mechanism actuated by said printing idlers, a series of accumulator idlers also arranged above said racks, a series of register wheels, gears secured thereon, said gears being in mesh with said accumulator idlers, and means for locking and unlocking said printing and accumulator idlers at the desired periods.

83. In a computing machine, a rack carriage, means for actuating the same, a series of adding racks arranged therein, means for effecting the elevation of one or more of said racks during the movement of said rack carriage, a series of printing idlers, a shaft on which said idlers are mounted, said idlers being adapted to mesh with said adding racks when the latter are raised, a series of accumulator idlers mounted above said racks and adapted to mesh with the latter when in raised position, a shaft on which said accumulator idlers are mounted, and means for moving the shaft of said accumulator idlers toward or away from said printing idlers.

84. In a computing machine, a rack carriage, means for actuating the same, a series of adding racks arranged therein, means for effecting the elevation of one or more of said racks during the movement of said rack carriage, a series of printing idlers, a shaft on which said idlers are mounted, said idlers being adapted to mesh with said adding racks when the latter are raised, a series of accumulator idlers mounted above said racks and adapted to mesh with the latter when in raised position, a shaft on which said accumulator idlers are mounted, means for moving the shaft of said accumulator idlers toward or away from said printing idlers, a printing mechanism, and connections intermediate said printing idlers and printing mechanism.

85. In a computing machine, a pin carriage, a series of pins therein, means for actuating said pins, and carriage, a rack carriage, a series of adding racks movably supported therein, means for actuating said rack carriage and adding racks, a series of printing idlers arranged above said racks, a series of printing wheels, mechanism intermediate said printing idlers and printing wheels for actuating the latter, a series of accumulator idlers mounted above said racks and a series of wheels and gears secured to said accumulator wheels and in mesh with said accumulator idlers.

86. In a computing machine, a pin carriage, a series of pins therein, means for actuating said pins, an adding rack carriage, a series of adding racks movably supported therein, means for actuating said rack carriage and adding racks, a series of printing idlers arranged above said racks, a plurality of printing wheels, mechanism intermediate said printing idlers and printing wheels for actuating the latter, a series of accumulator idlers mounted above said racks, a series of accumulator wheels, gears secured to said wheels and in mesh with said accumulator idlers, and a carrying mechanism adapted to co-act with said accumulator wheels.

87. In a computing machine, a pin carriage, a series of pins therein, means for actuating said pins, an adding rack carriage, a series of adding racks therein, means for actuating said rack carriage and adding racks, a series of printing idlers arranged above said racks, a plurality of printing wheels, mechanism intermediate said printing idlers and printing wheels for actuating the latter, a series of accumulator idlers mounted above said racks, a series of accumulator wheels, gears secured to said wheels and in mesh with said accumulator idlers, a carrying mechanism, adapted to co-act with said accumulator wheels, means for causing said printing idlers and accumulator idlers to be normally out of mesh and means for throwing said idlers into mesh during the act of taking a total.

88. In a computing machine, item setting mechanism, a rack carriage, a series of adding racks therein, means for actuating said rack carriage and for effecting the elevation of a rack or racks therein, a series of printing idlers mounted above said adding racks, printing mechanism actuated by said printing idlers, a series of accumulator idlers mounted above said adding racks, a series of accumulator wheels mounted in suitable bearings, gears attached to said wheels and in mesh with said accumulator idlers, a cam on said wheels, a series of arms loosely supported and having terminals adapted to engage and be raised by said cams and a carrying mechanism operated by said cams and arms.

89. In a computing machine, item setting mechanism, a rack carriage, a series of adding racks therein, means for actuating said rack carriage, and for effecting the elevation of a rack or racks, a series of printing idlers mounted above said adding racks, printing mechanism actuated by said printing idlers, a series of accumulator idlers mounted above said adding racks, a series of accumulator wheels mounted in suitable bearings attached to said wheels and in mesh with said accumulator idlers, a cam on said register wheels, a series of arms loosely supported and having terminals adapted to engage said cams, a carrying mechanism operated by said cams and arms, and means for locking and unlocking said printing idlers and accumulator idlers.

90. In a computing machine, item setting devices, an adding rack carriage, adding racks pivotally mounted therein, means for actuating said adding rack and racks, a series of printing idlers adapted to be in mesh with said racks when raised, a series of accumulator idlers adapted to be in mesh with said racks when raised, means for locking and unlocking said idlers, printing mechanism operated by said printing idlers, accumulating devices operated by said accumulator idlers and means for causing said printing idlers and accumulator idlers to be in mesh during the taking of the total, said idlers being normally out of mesh.

91. In a computing machine, a traveling carriage, devices on the latter for physically indicating the items to be added, means for actuating said carriage, an adding rack carriage, adding racks pivotally mounted therein, means for actuating said adding rack carriage and racks at a right angle to said first mentioned carriage, a series of printing idlers adapted to be in mesh with said racks when raised, a series of accumulator idlers adapted to also be in mesh with said racks when raised, means for locking and unlocking said idlers, printing mechanism operated by said printing idlers, accumulating devices operated by said accumulator idlers, and means for causing said printing idlers and accumulator idlers to be in mesh during the taking of a total, said idlers being normally out of mesh.

92. In a computing machine, type mechanism a frame for said type mechanism, comprising a plurality of members, locking devices for retaining said members in assembled position, a series of type bars, a rod joining opposite portions of one of said members and forming a support for said type bars, a guiding device carried by said frame for guiding said type bars, tension devices for said type bars, and means for operating the latter.

93. In a computing machine, a detachable type bar frame comprising a plurality of members, interlocking devices common to said members, whereby they may be held in assembled position, a rod extending transversely to one of said members, a series of type bars movably mounted on said rod, type wheels carried on said bars, a guide bar for holding said type bars in proper position with respect to each other, and means for operating said type bars.

94. In a computing machine, a type bar frame, comprising a plurality of members, interlocking devices common to said members whereby they may be held in assembled position, a rod extending transversely to one of said members, a series of type bars movably mounted on said rod, type wheels carried on said bars, a guide bar carried by one of said frames for holding said type bars in proper position with respect to each other, tension devices for said type bars, whereby the latter may be held normally in proper position, and means for operating said type bars.

95. In a computing machine, a type bar frame comprising a plurality of members, interlocking devices for holding said members in assembled position, a pin carried by one of said members, an elbow lever having a hook thereon carried by the other of said members and adapted to engage said pin, a series of type bars pivotally supported, type wheels therefor, a transverse bar having grooves in its under portion, said grooves serving as guides for said type wheel bars, tension devices for said type bars and means for operating the latter.

96. In a computing machine, a detachable type bar frame, comprising a plurality of members, interlocking devices for holding said members in assembled position, a shaft carried by one of said members and having arms thereon, a rod joining said arms, a handle on one of said arms, the latter terminating in an elbow lever provided with a hook, and a pin on the other of said members adapted to be engaged by said hook.

97. In a computing machine, a detachable type bar frame comprising a plurality of members, means for securing said members in assembled position, a rod carried by one of said members a series of type bars mounted on said rod, guiding and spacing devices for said type bars, type wheels mounted on said type bars, tension devices for the latter, lugs on the upper portions of said type bars, and a stop co-acting with said lugs for limiting the upward movement of said type bars.

98. In a computing machine, a type bar frame comprising a detachable portion having a rod secured therein, type bars loosely mounted on said rod, guiding devices for said type bars, type wheels for said type bars, the latter terminating in end portions having springs attached thereto and downwardly extending arms, a series of cams for actuating said arms, means for rotating said type wheels, means for locking said bars in their lowest positions, means for releasing said bars and means for locking said wheels after said bars are released.

99. In a computing machine, a type bar frame comprising a detachable portion having a rod secured therein, type bars loosely mounted on said rod, guiding devices for said type bars, type wheels for said type bars, the latter terminating in arms having springs at tached thereto, other downwardly extending arms, cams for actuating said arms, means for rotating said type wheels, means for locking and unlocking said bars, and spring actuated pawls carried by said bars and thrown into operation on the release of said bars for locking said wheels.

100. In a computing machine, a series of type wheels, means for setting and locking the same, a platen frame movably supported, a shaft having a platen thereon rotatably mounted in said frame and a manually operated locking pin on the front of said frame for securing the latter in any desired position with respect to said type wheels, said pin being adapted to engage recesses in the frame of the machine.

101. In a computing machine, a laterally movable platen frame, composed of front and rear portions, end pieces bridging the same, a shaft mounted in said platen frames, a platen carried by said shaft, a locking pin mounted on the front portion of said frame, an arm carrying said pin, a manually operated lever pivoted to said arm and fulcrumed on said frame and a tension device for said lever and pin.

102. In a computing machine, a frame work having top rails, a platen frame capable of lateral movement thereon, blocks intermediate said platen frame and top rails, an arm carrying a pin movably mounted on the front of said platen frame, means for manipulating said arm and a series of recesses in the upper front rail of said frame work adapted to be engaged by said pin, whereby said platen and its frame can be locked in the desired position.

103. In a computing machine, a supporting device for the platen and its frame, comprising upper front and rear rails; a platen frame movably mounted on said rails and having end pieces provided with journal bearings, means for locking said platen frame in position, a platen, a shaft carrying said platen and mounted in said bearings, a movable arm pivoted in said end pieces, and having the ends of the platen shaft mounted therein, a groove in said end pieces and an arm having trunnions mounted in said grooves, whereby said platen may be temporarily raised and retained in elevated position.

104. In a computing machine, a key locking mechanism comprising a main shaft, key stems, projections on the latter a guide therefor and means actuated by said main shaft for locking said key stems with respect to said guide, said means comprising a shaft adjacent said stems, a tension device for said latter shaft, and fingers on said latter shaft adapted to engage said projections.

105. In a computing machine, a key locking mechanism, comprising key stems, a guide therefor, a key locking shaft, having fingers thereon, a tension device for said key locking shaft, a main shaft, connections from said main shaft to said key locking shaft, and projections on said key stems adapted to be retained between the top of said fingers and the bottom of said guide.

106. In a computing machine, a key locking mechanism comprising a main shaft, an arm fixed thereon and having a stud, a key locking shaft a tension device therefor, connections intermediate said stud and said key locking shaft, key stems having projections thereon, and fingers on said key locking shaft adapted to engage said projections and prevent the latter and said stems from downward movement.

107. In a computing machine, a key locking mechanism, comprising a main shaft, an arm carried thereby and provided with a stud, a key locking shaft, an arm fast on the latter, a link pivoted to the arm on said key locking shaft and having a hook engaging the stud on said main shaft arm, a tension device for said key locking shaft, key stems having projections thereon, a guide for said key stems, and fingers on said key locking shaft adapted to retain said projections between their tops and the bottom of said guide.

108. In a computing machine, a key locking mechanism comprising a laterally extending guide, key stems movable thereon, projections carried by said key stems, and adapted to contact with the under side of said guide, and thus limit the upward movement of said stems, a locking shaft, a tension device for the latter, means for actuating said shaft, fingers on said shaft adapted to engage the under side of said projections and retain the latter between their tops and the under side of said guide, an arm fixed on said shaft, a link pivoted to said arm and provided with a hook, in combination with a main shaft, and an arm fixed thereon and provided with means adapted to engage said hook.

109. In a computing machine, a main shaft, a series of adding devices, a printing mechanism, accumulating devices, connections from said main shaft for actuating the adding, printing and accumulating devices, an arm attached to said main shaft, a ratchet wheel rotatably supported and provided with a pawl, a link connecting said arm to said ratchet wheel, and means for avoiding a dead center in the connections between said main shaft and said ratchet wheel, whereby said main shaft is compelled to rotate to the desired extent during the completion of a cycle.

110. In a computing machine, item setting devices, accumulating devices and a rack carriage having adding racks movably mounted therein, all of said adding racks having the same extent of movement in setting up any number said adding rack carriage being located intermediately of said item setting devices and accumulating devices.

111. In a computing machine, item setting devices, accumulating devices, a rack carriage located intermediate of said item setting devices racks in said carriage all of which have the same extent of movement in setting up any number and accumulating devices, and means for actuating said rack carriage in a substantially rectilinear path.

112. In a computing machine, a device for restoring the pin carriage to initial position comprising a pin carriage, a series of pins therein, means for actuating said carriage and pins, a spring actuated lever suitably fulcrumed and connected to said pin carriage, another lever suitably fulcrumed and having a projection therein adapted to engage said pin carriage lever, and means for actuating said pin, pin carriage lever and pin carriage when it is desired to return the latter to initial position.

113. In a computing machine, a pin carriage having a series of pins therein, a plurality of levers suitably fulcrumed, a link connecting one of said levers to said pin carriage, a lever fulcrumed to said pin carriage, a connection from said lever to one of said first mentioned levers, pin unlocking devices actuated by the lever fulcrumed to said pin carriage, and independent means for actuating said levers and pin carriage when it is desired to restore the latter to normal position.

114. In a computing machine, a pin carriage, a link 359 pivoted thereto, a lever 354 suitably fulcrumed and connected to said link, a lever 339 suitably fulcrumed, a lever 72, a link 340 having one end connected to said lever 72 and the other end pivoted to said lever 339, a pin unlocking device actuated by said lever 72, an arm 368 suitably fulcrumed, a pin projecting from said arm, and means for actuating said arm, pin and levers 339 and 354 in unison.

115. In a computing machine, a pin carriage having a series of pins therein, means for elevating and retracting said pins, a pin unlocking device, a lever 72 fulcrumed to said pin carriage and adapted to operate said pin unlocking device, a link 340 having one end secured to said lever 72, a lever 339 to which the other end of said link is secured, a link 359 secured to said pin carriage, a lever 354 pivoted to said link 359, and means for actuating said levers 354 and 339 and said pin carriage independently when it is desired to restore said pin carriage to normal position in case a wrong key has been depressed.

116. In a computing machine, printing mechanism including printing idlers, a rack carriage, racks movably mounted therein, actuating means for said rack carriage, a pin carriage, actuating means therefor, and pins in said pin carriage adapted to coact with predetermined racks to move such racks into direct engagement with said idlers.

117. In a computing machine, accumulating mechanism including accummulator idlers, a rack carriage, actuating means therefor, racks movably supported in said carriage, a series of pins, and means for causing predetermined pins to move predetermined racks into direct engagement with said idlers.

118. In a computing machine, a ribbon mechanism having thereon a single ribbon provided with contrasting colors, as red and black, a movable frame in which said ribbon mechanism is supported, means for intermittently feeding the ribbon, means embodying a movably mounted shield controlled by the ribbon for automatically reversing the feed thereof, a platen, a totaling lever and connections comprising the shaft 513, arm 516, link 518, pin 520 and hanger 469 leading from said totaling lever to said ribbon frame whereby the red or contrasting portion of said ribbon is moved into operative position in the act of taking a total.

119. In a computing machine, a repeating mechanism, comprising item setting mechanism, the latter consisting of a traveling pin carriage, pins in said carriage and means for actuating said pins and carriage, a lever 318, connections intermediate said lever and said item setting mechanism whereby the latter will be located in fixed position, a main shaft, a printing mechanism, connections intermediate said main shaft and printing mechanism, whereby the items indicated by the item setting mechanism may be indefinitely repeated during the depression of said lever 318.

120. In a computing machine, a repeating mechanism comprising a pin carriage, a series of pins therein, means for actuating said pins and pin carriage, an adding rack carriage, adding racks movably supported therein and means for preventing the return of the pin carriage until the number to be repeated has been registered, printed and added.

121. In a computing machine, a pin carriage, a series of pins therein, means for actuating said pin carriage and pins, registering means, printing mechanism, adding devices comprising an adding rack carriage, and adding racks movably mounted therein, connections intermediate said registering, printing and adding mechanism, and means for causing said pin carriage to remain in fixed position during the act of repeating.

122. In a computing machine, a pin carriage having a series of pins therein, means for actuating said pin carriage and pins, a printing mechanism, an adding rack carriage, adding racks movably supported therein, mechanism intermediate said racks and printing mechanism, means for causing said pin carriage and pins to temporarily remain in fixed position, and repeating means for transferring the items indicated by the position of said pin carriage and pins to said printing mechanism.

123. In a computing machine, item setting mechanism, a series of printing idlers, a series of accumulator idlers, normally out of mesh, a printing mechanism, connections from said printing idlers to said printing mechanism, accumulating devices, connections from said accumulator idlers to said accumulating devices, a totaling lever, and connections from said totaling lever to said accumulator idlers whereby the latter are thrown into mesh with said printing idlers in the act of taking a total.

124. In a computing machine, a pin carriage, a series of pins therein, means for actuating said pin carriage and pins, an adding rack carriage, adding racks therein means for actuating said adding rack carriage, a printing mechanism, connections from said adding racks to said printing mechanism, means for causing said pin carriage and pins to temporarily remain in fixed position, and repeating means for transferring the items indicated by the position of said pin carriage, pins and adding racks to said printing mechanism.

125. In a computing machine, a plurality of adding racks, supporting devices therefor, connections intermediate said racks and supporting devices, and means for imparting a longitudinal movement and an independent upward movement to said racks with respect to their supporting devices during the forward travel of said racks.

126. In a computing machine, a plurality of adding racks, supporting devices therefor, connections intermediate said racks and supporting devices, said racks being adapted to receive a longitudinal and an independent upward movement with respect to their supporting device, and means carried by said supporting devices for limiting the backward movement of said racks.

127. In a computing machine, a plurality of adding racks, an adding rack carriage, connections intermediate said racks and carriage, and means for causing a longitudinal and an independent upward movement to be imparted to said racks with respect to said carriage during the forward movement of said racks.

128. In a computing machine, a plurality of adding racks, an adding rack carriage, connections intermediate said racks and carriage, means for imparting a longitudinal movement to said racks and means for causing an upward and backward movement relative to said carriage to be imparted to said racks during their forward movement.

129. In a computing machine, a plurality of adding racks, an adding rack carriage, connections intermediate said racks and carriage, means for imparting a longitudinal movement to said racks, means for causing an upward and backward movement of said racks to be imparted to the latter relative to said carriage, and means on said carriage for limiting the backward movement of said racks.

130. In a computing machine, a plurality of adding racks, an adding rack carriage, pivotal connections intermediate said carriage and racks, means for imparting a longitudinal movement to said racks and means for causing an independent upward movement of said racks to be imparted to the latter with respect to said carriage during the movement of said racks in one direction.

131. In a computing machine, a plurality of adding racks, an adding rack carriage therefor, side and end walls for said carriage, connections intermediate said racks and walls for causing a longitudinal and an independent upward movement to be imparted to said racks with respect to said carriage during the forward movement of said racks, and means for operating said carriage whereby each of said racks has the same longitudinal travel.

132. In a computing machine, a plurality of adding racks, an adding rack carriage therefor, said carriage having side and end walls and connections intermediate said racks and side walls for causing a longitudinal movement and an independent upward movement to be imparted to said racks with respect to said carriage, the rear end wall of said rack carriage serving as a stop to limit the movement of said racks.

133. In a computing machine, a pin carriage, pins therein, means for raising and retracting said pins, means for actuating said carriage in a lateral direction, an adding rack carriage, a series of adding racks therein, and means for moving said adding rack carriage in a lateral plane and at an angle to the lateral movement of said pin carriage.

134. In a computing machine, a pin carriage, pins therein, means for actuating said pins, means for actuating said carriage, an adding rack carriage located above said pin carriage, adding racks movably supported therein, and means for moving said adding rack carriage in a lateral plane and at an angle to said pin carriage.

135. In a computing machine, the combination of item setting mechanism, item printing mechanism, an adding rack carriage located intermediately of said mechanisms, and adding racks movably supported in said rack carriage, said racks and carriage being moved the same distance independent of the items set up by said item setting mechanism.

136. In a computing machine, the combination of item setting mechanism, accumulating mechanism, an adding rack carriage located intermediately of said mechanisms and adding racks movably secured within said carriage, said racks and carriage being moved the same distance independent of the items set up by said item setting mechanism.

137. In a computing machine, item setting mechanism, printing mechanism, an adding rack carriage located intermediately of said mechanisms, a series of movable racks in said carriage adapted to coact with said item setting mechanism, said racks and carriage being moved the same distance independent of the items set up by said item setting mechanism, a series of accumulating devices, connections from said racks to said accumulating devices, and connections from said racks to said printing mechanism.

138. In a computing machine, item setting mechanism, printing mechanism, an adding rack carriage located intermediately of said mechanisms, a series of movable racks in said carriage adapted to coact with said item setting mechanism, said racks and carriage being moved the same distance independent of the items set up by said item setting mechanism, a series of accumulating devices, connections from said racks to said accumulating devices and connections from said racks to said printing mechanism in combination with totalizing mechanism.

139. In a computing machine, a pin carriage, pins therein, means for raising and retracting said pins, means for actuating said carriage, an adding rack carriage, a series of adding racks movably supported therein, means for moving said adding rack carriage laterally at an angle to said pin carriage, an escapement for said pin carriage, and means carried by said pin carriage for rendering said escapement device temporarily inoperative when the capacity of the machine has been reached.

140. In a computing machine, the combination of a pin carriage, pins therein, an adding rack carriage, a series of adding racks therein, means for moving said carriages at an angle to each other, an escapement device for said pin carriage, and means carried by the latter for rendering said escapement device temporarily inoperative when the capacity of the machine has been reached.

141. In a computing machine, a pin carriage, rows of pins therein, an escapement device for said pin carriage, means carried by the latter for rendering said escapement device temporarily inoperative when the capacity of the machine has been reached, an adding rack carriage, a series of adding racks therein, and means for actuating said carriages.

142. In a computing machine, item setting mechanism including a traveling pin carriage, an escapement device therefor and means carried by said pin carriage for rendering said escapement device temporarily inoperative, when the capacity of the machine has been reached.

143. In a computing machine, item setting mechanism carried by said carriage, registering and printing devices coacting with said mechanism, an escapement device for said item setting mechanism, and means for rendering said escapement device temporarily inoperative when the capacity of the machine has been reached.

144. In a computing machine, a printing mechanism, a series of printing idlers, a laterally movable rack carriage, a series of adding racks pivotally mounted in said carriage, means for actuating said carriage and elevating said racks, and connections from said idlers to said printing mechanism.

145. In a computing machine, an accumulating mechanism, a series of accumulator idlers, connections from said idlers to said accumulator mechanism, an adding rack carriage, adding racks movably mounted on said carriage, and means for actuating said carriage and elevating said racks.

146. In a computing machine, a series of printing idlers, a series of accumulator idlers, printing mechanism, connections from said printing idlers to said printing mechanism, accumulating mechanism, connections from said accumulator idlers to said accumulating mechanism, an adding rack carriage, adding racks movably mounted therein, and means for actuating said carriage and elevating said racks.

147. In a computing machine, a series of printing idlers, a series of accumulator idlers, printing mechanism, connections from said printing idlers to said printing mechanism, accumulating mechanism, connections from said accumulator idlers to said accumulating mechanism, an adding rack carriage, adding racks movably mounted therein, and means for actuating said carriage and elevating said racks in combination with means for locking and unlocking said idlers.

148. In a computing machine, a series of printing idlers, a series of accumulator idlers, printing mechanism, connections from said printing idlers to said printing mechanism, accumulating mechanism, connections from said accumulator idlers to said accumulating mechanism, an adding rack carriage, adding racks movably mounted therein and means for actuating said carriage and elevating said racks, in combination with means for throwing said idlers into and out of mesh.

149. In a computing machine, a series of printing idlers, a series of accumulator idlers, printing mechanism, connections from said printing idlers to said printing mechanism, accumulating mechanism, connections from said accumulator idlers to said accumulating mechanism, an adding rack carriage, adding racks movably mounted therein and means for actuating said carriage and elevating said racks in combination with means for locking and unlocking said idlers, and means for throwing said idlers into and out of mesh.

150. In a computing machine, printing mechanism, accumulating mechanism, series of printing idlers, a shaft therefor, a series of accumulator idlers, a shaft therefor, means for moving one of said shafts toward or away from the other, a series of adding racks, and means for reciprocating and elevating said racks.

151. In a computing machine, printing mechanism, accumulating mechanism, a series of printing idlers, a shaft therefor, a series of accumulator idlers, a shaft therefor, means for moving one of said shafts toward or away from the other, a series of adding racks, and means for reciprocating and elevating said racks in combination with means for locking and unlocking said idlers.

152. In a computing machine, a series of adding racks pivotally supported, means for actuating and elevating said racks, a series of printing idlers adapted to mesh with said racks, printing devices, mechanism intermediate said printing idlers and printing devices for actuating the latter, a series of accumulator idlers, a series of accumulator wheels, gears on the latter in mesh with said accumulator idlers, and means for throwing said idlers into and out of mesh.

153. In a computing machine, an adding rack carriage, a series of adding racks movably mounted therein, means for actuating said carriage and racks, a series of printing idlers, a series of accumulator idlers, printing mechanism actuated by said printing idlers, accumulating mechanism actuated by said accumulator idlers, and means for throwing said idlers into and out of mesh.

154. In a computing machine, an adding rack carriage, a series of adding racks movably mounted therein, means for actuating said carriage and racks, a series of printing idlers, a series of accumulator idlers, printing mechanism actuated by said printing idlers, accumulating mechanism actuated by said accumulator idlers, and means for throwing said idlers into and out of mesh in combination with a carrying mechanism adapted to coact with said accumulating mechanism.

155. In a computing machine, a series of printing idlers, printing mechanism actuated thereby, a series of accumulator idlers, accumulating mechanism actuated thereby, means for actuating said idlers, and means for throwing said idlers directly into mesh with each other during the act of taking a total.

156. In a computing machine, a series of printing idlers, printing mechanism actuated thereby, a series of accumulator idlers, accumulating mechanism actuated thereby, means for actuating said idlers, and means for throwing said idlers directly into mesh with each other during the act of taking a total, in combination with a carrying mechanism adapted to coact with said accumulating mechanism.

157. In a computing machine, a series of printing idlers, printing mechanism actuated thereby, a series of accumulator idlers, accumulating mechanism actuated thereby, means for actuating said idlers, cams carried by said accumulating mechanism, a series of arms adapted to be actuated by said cams and a carrying mechanism actuated by said cams and arms.

158. In a computing machine, a series of printing idlers, printing mechanism actuated thereby, a series of accumulator idlers, accumulating mechanism actuated thereby, means for actuating said idlers, cams carried by said accumulating mechanism, a series of arms adapted to be actuated by said cams and a carrying mechanism actuated by said cams and arms in combination with means for locking and unlocking said idlers.

159. In a computing machine, a series of printing idlers, printing mechanism actuated thereby, a series of accumulator idlers, accumulating mechanism actuated thereby, means for actuating said idlers, cams carried by said accumulating mechanism, a series of arms adapted to be actuated by said cams and a carrying mechanism actuated by said cams and arms in combination with means for throwing said idlers into and out of mesh.

160. In a computing machine, a series of printing idlers, printing mechanism actuated thereby, a series of accumulator idlers, accumulating mechanism actuated thereby, means for actuating said idlers, cams carried by said accumulating mechanism, a series of arms adapted to be actuated by said cams and a carrying mechanism actuated by said cams and arms in combination with means for locking and unlocking said idlers and means for throwing said idlers into and out of mesh.

161. In a computing machine, a series of adding racks, means for actuating said racks, a series of printing idlers, printing mechanism actuated thereby, a series of accumulator idlers, accumulating mechanism actuated thereby, means for actuating said idlers, cams carried by said accumulating mechanism, a series of arms adapted to be actuated by said cams and a carrying mechanism actuated by said cams and arms.

162. In a computing machine, type mechanism, a frame for said type mechanism, comprising a plurality of members, locking devices therefor, a series of pivotally supported type bars, a guide for the latter, tension devices for said type bars, type wheels rotatably mounted on said bars and means for operating the latter.

163. In a computing machine, a type bar frame, comprising a plurality of members, interlocking devices therefor, a series of type bars pivotally supported, type wheels therefor, a guide for said type wheel bars, and means for actuating said bars and wheels.

164. In a computing machine, a type bar frame, comprising a plurality of members, interlocking devices therefor, a series of type bars pivotally supported, type wheels therefor, a guide for said type wheel bars, and means for actuating said bars and wheels in combination with means for locking said wheels when in operative position to print.

165. In a computing machine, a type bar frame, comprising a plurality of members, interlocking devices therefor, a series of type bars pivotally supported, type wheels therefor, a guide for said type wheel bars, and means for actuating said bars and wheels in combination with means for locking and unlocking said type wheels.

166. In a computing machine, a series of type wheel bars movably supported, guiding devices therefor, type wheels for said bars, tension devices for the latter, means for actuating said bars, means for rotating said type wheels, and means for locking and unlocking said bars.

167. In a computing machine, a series of type wheel bars movably supported, guiding devices therefor, type wheels for said bars, tension devices for the latter, means for actuating said bars, means for rotating said type wheels, and means for locking and unlocking said bars in combination with means for locking said type wheels after said bars are released.

168. In a computing machine, a pin carriage, means for actuating the latter, a spring actuated lever suitably fulcrumed and connected to the pin carriage, a second lever having a connection adapted to engage said pin carriage lever, and means for actuating said pin carriage and pin carriage lever when it is desired to restore said pin carriage to initial position.

169. In a computing machine, a pin carriage, a series of pins therein, a plurality of levers, connections from the latter to said pin carriage, pin locking devices and pin unlocking devices actuated by one of said levers.

170. In a computing machine, a pin carriage, a series of pins therein, a plurality of levers, connections from the latter to said pin carriage, and pin unlocking devices actuated by one of said levers in combination with independent means for actuating said levers and pin carriage, when it is desired to restore the latter to normal position.

171. The combination of a transversely movable pin carriage, pins arranged therein, keys for raising said pins, means for moving said carriage laterally one space or row as each key is operated, an adding rack carriage located in proximity to said pin carriage, adding racks in said rack carriage, means for moving said racks into engagement with one of said pins when the latter is in elevated condition to elevate said racks, and type carrying parts actuated by said racks when the latter are in elevated position.

172. The combination of a transversely movable pin carriage, pins arranged therein, keys for raising said pins, means for moving said carriage laterally one space or row as each key is operated, an adding rack carriage located in proximity to said pin carriage, adding racks in said rack carriage, means for moving said racks into engagement with one of said pins when the latter is in elevated condition, whereby said rack is elevated, and printing mechanism actuated by said racks on the further movement of the latter, after they have been elevated.

173. The combination in a computing machine, of a transversely movable pin carriage, pins arranged therein, keys for raising said pins, means for moving said carriage laterally as each key is operated, an adding rack carriage located in proximity to said pin carriage, adding racks in said rack carriage, means for moving said racks into engagement with said pins when the latter are in elevated condition to elevate said racks, all of said racks, whether in normal condition or in elevated condition, being moved the same distance, and printing mechanism actuated by said adding racks when in elevated position.

174. The combination in a computing machine, of type carrying parts, a movable pin carriage, pins arranged therein, keys for raising said pins, an adding rack carriage located in proximity to said pin carriage, adding racks in said rack carriage, means for moving said racks into engagement with pins elevated by said keys to elevate said racks, whereby the movement of a rack in elevated condition will position said type carrying parts, and means for actuating said type carrying parts.

175. In a computing machine, type carrying parts, a movable pin carriage, pins therein, keys for raising said pins, means for moving said carriage one space as each key is operated, an adding rack carriage, adding racks therein, means for moving said rack carriage and the racks therein, whereby said racks will be raised by any of the elevated pins, and printing mechanism having idlers into mesh with which a rack is directly thrown by an elevated pin.

176. The combination in a computing machine, of a pin carriage, pins therein, keys for raising said pins, means for moving said carriage laterally as each key is operated, an adding rack carriage located in proximity to said pin carriage, adding racks in said rack carriage, all of which have the same extent of movement in registering any number, means for moving said racks into engagement with an elevated pin, whereby said racks will be elevated, and type carrying parts, the throw of which is limited by the movement of said racks when in elevated condition.

177. The combination in a computing machine, of a pin carriage, pins therein, keys for raising said pins, means for moving said carriage laterally as each key is operated, an adding rack carriage located in proximity to said pin carriage, adding racks in said rack carriage, all of which have the same extent of movement, in registering any number, means for moving said racks into engagement with an elevated pin, whereby said racks will be elevated, type carrying parts, the throw of which is limited by the movement of said racks when in elevated condition, and accumulating mechanism actuated by said racks when in elevated condition.

178. The combination in a computing machine, of a pin carriage, pins therein, keys for raising said pins, means for moving said carriage laterally as each key is operated, an adding rack carriage located in proximity to said pin carriage, adding racks in said rack carriage, all of which have the same extent of movement in registering any number, means for moving said racks into engagement with an elevated pin, whereby said racks will be elevated, type carrying parts, the throw of which is limited by the movement of said racks when in elevated condition, and accumulating mechanism actuated by said racks when in elevated condition, and means for moving said accumulating mechanism into mesh with said printing mechanism.

179. The combination in a computing machine, of movable type carriers, a transversely movable pin carriage, pins arranged therein, keys for elevating said pins, devices for moving the carriage whenever a key is operated, an adding rack carriage movable at an angle to said pin carriage, adding racks therein, all of which have the same extent of movement in registering any number, means for moving said rack carriage, whereby the racks are elevated on engaging with an elevated pin, the movement of said racks when elevated controlling the throw of said type carriers, type supported on said type carrying parts, and means for causing said type to print.

180. In a computing machine, a series of adding racks, all of which have the same extent of movement in registering any number, means for moving said racks, means for causing a predetermined rack to be arrested and elevated at a predetermined time during its forward movement, and printing mechanism, the throw of which is limited by the movement of said rack when in elevated condition.

181. In a computing machine, a series of adding racks, all of which have the same extent of movement in registering any number, means for moving said racks, means for causing a predetermined rack to be arrested and elevated at a predetermined time during its forward movement, and accumulating mechanism, the movement of which is controlled by the movement of said rack when in elevated condition.

182. In a computing machine having recording devices, the combination with a traveling carriage, and a key controlled escapement controlling the same, of a key, connections leading therefrom for moving said carriage positively to idle position and without movement of the recording devices, as when error is made by the operator, a movable rack carriage intermediate said recording devices and said traveling carriage, racks movably carried by said rack carriage and independently movable therein, and means for moving said rack carriage to cause the actuation of said registering devices and the return of said pin carriage to idle position.

183. In a computing machine, registering devices, a movable pin carriage, an escapement controlling said carriage, pins in said carriage to determine the scope of the movement of the registering devices, a movable rack carriage intermediate said devices and said pin carriage, racks in said carriage, a key for moving the pin carriage to idle position after any operation without moving the registering devices, and means for moving said rack carriage to cause the actuation of said registering devices and the return of said pin carriage to idle position.

184. In a computing machine, a pin carriage, pins therein, devices for operating the pins and moving the carriage, recording devices, means for operating them after the pin carriage and pins have been moved, said means including a movable rack carriage and racks in said carriage co-acting with said pins, and means for moving said rack carriage to cause the actuation of said recording devices and the return of said pin carriage to idle position means for moving the pin carriage and pins back to idle position without moving the recording devices.

185. In a computing machine, the combination of the type carriers, separately movable controlling members normally disconnected therefrom, a pin carriage movable transversely of the travel of the type carriers and controlling members, and a row of pins in said carriage for each of the controlling devices for limiting their movement and thereby the movement of the type carriers, as required for registering the various numbers to be recorded.

186. In a computing machine, the combination of the type carriers, separately movable controlling members normally disconnected therefrom, a totalizer operated by the controlling members and a pin carriage movable transversely relative to the movement of the controlling members and adapted to limit their movement and thereby the movement of the type carriers as required to indicate the various digits in the numbers to be recorded.

187. In a computing machine, the combination of the type carriers, a pin carriage, pins within said carriage, devices for moving the type carriers and the carriage and pins relatively so that the movement of the carriers will be limited by the pins, said devices including a laterally movable rack carriage and racks independently movable therein, a platen and devices for printing thereon when the type carriers are operated.

188. In a computing machine, type carriers, a pin carriage, pins within said pin carriage, devices for moving the pins and the pin carriage and the type carriers, in combination with means for limiting the movement of the type carriers by the pins as required to register a number, said means including a rack carriage movable at an angle to said pin carriage and racks in said carriage co-acting with said pins, a platen, and devices for printing thereon when the said parts operate.

189. The combination in a computing machine, of type carriers, devices for moving them, said devices including a laterally movable rack carriage and racks movably mounted therein, a pin carriage, pins in the carriage, devices for prearranging the pins and moving the pin carriage so that the movement of the type carriers will be determined by the prearranged pins as required to register any desired number, and a platen arranged to carry paper for recording records indicated by the type carriers when so operated.

190. A computing machine comprising type carriers, separately movable racks for controlling the type carriers, all of said racks having the same extent of movement in registering any number, a pin carriage, pins therein, devices for moving the pin carriage adjacent to the movable controlling racks, devices for moving the type carriers and their controlling racks when a number is to be registered, and means for prearranging the pins in the pin carriers so that such of the controlling racks as move will engage therewith to limit movement of the type carriers and thereby record the required number.

191. In a computing machine, registering devices, means for moving them including a laterally movable rack carriage and racks having an independent movement with respect to said carriage, a pin carriage, pins in the pin carriage, means for operating the pin carriage and the pins to limit movement of the registering devices, means for moving said rack carriage to cause the actuation of said registering devices and the return of said pin carriage to idle position, and means for restoring the pin carriage to normal position without moving the registering devices.

192. In a computing machine, registering devices, a movable rack carriage, racks movably mounted therein, a pin carriage movable at an angle to said rack carriage, pins in said pin carriage, means for disposing the pin carriage and pins to control the registering devices, means for moving said rack carriage to cause the actuation of said registering devices and the return of said pin carriage to idle position, and means for restoring the pin carriage and pins to normal position without moving the registering devices.

193. In a computing machine, type carriers, a movable rack carriage, racks therein controlling movement of said type carriers and having an independent movement in registering any number with respect to said carriage, a pin carriage, pins therein, keys to set the pins, devices for moving the pin carriage and the pins into position to actuate said racks to limit the throw of the type carriers, a totalizer operated by said racks, and a platen to receive records of numbers indicated by the type carriers when operated.

194. In a computing machine, type carriers, separately movable racks controlling them and all of which have the same extent of movement, a movable pin carriage, pins therein, and devices for moving the racks and the pin carriage and pins relatively so that the racks will engage the pins to limit movement of the type carriers.

195. In a computing machine, registering mechanism, a movable pin carriage, a rack carriage movable relatively to said pin carriage, racks in said rack carriage, pins in said pin carriage to actuate said racks to limit the movement of the registering mechanism, means for moving said rack carriage to cause the actuation of said registering devices and the return of said pin carriage to idle position, and means for restoring the pin carriage to idle position without moving the registering mechanism.

196. In a computing machine, registering devices, total wheels operated thereby, a movable rack carriage, racks therein, controlling said registering devices, a pin carriage, pins therein to control said racks and thereby said registering devices, means for moving the pin carriage to any required position, means for moving said rack carriage to cause the actuation of said registering devices and the return of said pin carriage to idle position, and a key or lever to restore the pin carriage to idle position without movement of the registering devices.

197. In a computing machine, registering devices, a lever, means for operating the registering devices when the lever is moved, a movable adding rack carriage, adding racks therein movable relatively to said carriage, a pin carriage, pins therein, means for moving the pin carriage as required, whereby said pins co-act with said racks to limit the throw of the registering devices, said pin carriage being automatically returned to normal position when said registering devices are operated, and means for moving the pin carriage to idle position without movement of the registering devices.

198. In a computing machine, the combination of a platen arranged to carry paper, type carriers, a movable rack carriage, racks movably mounted therein for controlling said type carriers, a pin carriage, pins therein, devices for moving the rack carriage and the pin carriage relatively so that the movement of the type carriers may be limited by said pins co-acting with said racks, and means for printing when movement of the carriage is stopped.

199. In a computing machine, a transversely movable carriage, pins therein, keys for operating them, a transversely movable rack carriage, racks therein controlled by said pins, all of said racks having the same extent of movement, a registering mechanism, the movement of which is limited by said racks, means for moving said rack carriage to actuate said registering mechanism and return the pin carriage to normal position, and means for restoring the pins to idle position without registering a number, as when error is made.

200. In a computing machine, registering devices, a movable pin carriage, pins therein to limit movement of the registering devices, a rack carriage movable at an angle to said pin carriage, racks therein controlled by said pins and controlling said registering devices, means for moving said rack carriage to cause the actuation of said registering devices and the return of said pin carriage to idle position, and means for restoring the pins to idle position without moving the registering devices.

201. In a computing machine, movable type carrying parts, a movable rack carriage, racks therein to limit the movement of the type carrying parts, a pin carriage movable relatively to the rack carriage, pins in said pin carriage, means for moving the pin carriage and pins to control said racks, means for moving said pin carriage and pins to idle position after movement of the type carrying parts to perform their function, and means for moving the pin carriage and pins to idle position without moving the type carrying parts.

202. In a computing machine, movable type carrying parts, a movable rack carriage, racks therein controlling said type carrying parts, a movable pin carriage, pins therein, means for moving said pin carriage and pins to elevate said racks, automatic means for moving said pin carriage and pins to idle position after operation of the type carrying parts to perform their function, and means for moving said pin carriage and pins to idle position without moving the type carrying parts.

203. In a computing machine, a platen arranged to carry paper, type carrying parts, means for moving the type carrying parts to record on the platen, a carriage, means for moving the carriage, and devices intermediate the carriage and type carrying parts to limit movement of the latter, said devices including adding racks, all of which have the same extent of movement in registering any number.

204. In a computing machine, a platen arranged to carry paper, type carriers, means for moving said type carriers to record on the platen by means of the type, a row of pins for each type carrier, a series of keys, means for positioning corresponding pins in different rows of pins by operation of each key, and means to engage the pin positioned to limit movement of the type carriers, said means including a rack carriage movable at an angle to the pin carriage and independently movable racks in the rack carriage controlled by the positioned pins.

205. In a computing machine, a platen arranged to carry paper, type carriers, a row of pins for each type carrier, a series of keys, each key being operable to position one pin in each row, means for moving the type carriers to record by use of the type on said platen, and means to engage the pins which had been positioned to limit the movement of the type carriers, said means including a rack carriage movable at an angle to the pin carriage and racks having independent movement relative to said rack carriage controlled by said pins.

206. In a computing machine, a platen arranged to carry paper, type carriers, a movable carriage, movable parts in the carriage, keys operable to move such movable parts, means for moving the type carrying parts toward the platen to record thereon, and devices intermediate of the movable carriage and the type carriers to limit movement of the latter, said devices including laterally and forwardly movable racks having an independent upward movement during their forward travel.

207. In a computing machine, a platen, type carriers, a pin carriage, pins therein, keys to set the pins, devices for moving the type carriers toward the platen, said devices including a series of independent racks, all of which have the same extent of movement in registering any number and are elevated by said pins, and means for moving the pin carriage relative to the type carriers so that the throw of the type carriers, which move, will be limited by the pins which have been set by the keys.

208. In a computing machine, a movable platen, type carriers, a pin carriage, pins therein, devices for moving the carriage and pins relative to the type carriers, means for limiting the movement of the type carriers by the pins, said means including a rack carriage movable at an angle to the pin carriage and racks in said rack carriage, all of which have the same extent of movement in registering any number, and devices for the printing on the platen by means of the type in the carriers.

209. In a computing machine, the combination of a platen arranged to carry paper, devices for recording numbers thereon, members to control said devices, said members consisting of independent racks, all of which have the same extent of movement in registering any number, total wheels operable by said racks, a pin carriage, pins therein, and means for moving said pin carriage and pins to cause said pins to engage said racks to limit the throw of said devices.

210. In a computing machine, the combination of type carriers, separately movable racks disconnected therefrom and all of which have the same extent of movement in registering any number, a movable pin carriage, pins therein, devices for moving the pin carriage and thereby the pins relative to the racks so that movement of the latter will be controlled by the pins, a platen arranged to carry paper, and means for printing thereon when the said parts are operated.

OLIVER D. JOHANTGEN.

Witnesses:
E. HAYWARD FAIRBANKS,
C. D. McVAY.